United States Patent
Dombowsky et al.

(10) Patent No.: US 12,398,561 B2
(45) Date of Patent: Aug. 26, 2025

(54) SYSTEMS AND METHODS FOR COUPLING PREFABRICATED PANELS TOGETHER AND REINFORCING FRAME STRUCTURE

(71) Applicant: NEXIICAN HOLDINGS INC., Dallas, TX (US)

(72) Inventors: Michael Anthony Dombowsky, Moose Jaw (CA); Benedict John Dombowsky, Moose Jaw (CA); Mark Benedict Dombowsky, Moose Jaw (CA); Braden Louis Dombowsky, West Kelowna (CA); Luke Micha Lawrence Dombowsky, Moose Jaw (CA)

(73) Assignee: Nexiican Holdings Inc., Dallas, TX (US)

(*) Notice: Subject to any disclaimer, the term of this patent is extended or adjusted under 35 U.S.C. 154(b) by 0 days.

(21) Appl. No.: 17/220,619

(22) Filed: Apr. 1, 2021

(65) Prior Publication Data

US 2021/0348387 A1    Nov. 11, 2021

Related U.S. Application Data

(60) Provisional application No. 63/081,141, filed on Sep. 21, 2020, provisional application No. 63/003,401, filed on Apr. 1, 2020.

(51) Int. Cl.
*E04C 2/06* (2006.01)
*E04C 2/288* (2006.01)

(52) U.S. Cl.
CPC .............. *E04C 2/06* (2013.01); *E04C 2/288* (2013.01)

(58) Field of Classification Search
CPC ... E04C 2/06; E04C 2/288; E04C 2/38; E04C 2/384; E04C 2/044; E04C 2002/001
See application file for complete search history.

(56) References Cited

U.S. PATENT DOCUMENTS

| | | | | |
|---|---|---|---|---|
| 3,994,105 A | * | 11/1976 | Jamison | B32B 15/043 D25/16 |
| 4,606,165 A | * | 8/1986 | Allan | E04B 1/04 52/583.1 |
| 4,676,035 A | * | 6/1987 | GangaRao | E04B 1/04 52/125.5 |
| 4,841,702 A | * | 6/1989 | Huettemann | E04B 5/04 52/794.1 |
| 5,065,558 A | * | 11/1991 | Boatsman | E04B 1/34315 52/848 |
| 8,567,153 B1 | * | 10/2013 | Francavilla | E04B 2/54 52/309.4 |
| 9,376,815 B1 | * | 6/2016 | Santini | E04C 2/521 |
| 9,624,712 B2 | * | 4/2017 | Bottin | E06B 1/60 |
| 10,508,434 B2 | * | 12/2019 | Morcous | E04B 1/415 |

(Continued)

*Primary Examiner* — Gisele D Ford
(74) *Attorney, Agent, or Firm* — Carter, DeLuca & Farrell LLP

(57) ABSTRACT

Connectors comprise a hollow or extruded body, studs integrated structural reinforcement, and receiving sockets for fastening to adjacent connectors. Connectors are placed at one or more locations on prefabricated panels to couple pre-fabricated panels together in the construction of a building. Connectors may anchor structural reinforcement internal to each panel to assist in distributing forces through the structure of the building. A reinforcing mesh may at least partially wrap around the structural reinforcement of a panel.

26 Claims, 50 Drawing Sheets

(56) References Cited

U.S. PATENT DOCUMENTS

| | | | | |
|---|---|---|---|---|
| 10,584,503 B2* | 3/2020 | Fan | ................ | E04B 1/34315 |
| 10,961,708 B2* | 3/2021 | Dombowsky | ............. | E04B 1/80 |
| 2007/0271857 A1* | 11/2007 | Heather | ................ | B65D 88/022 |
| | | | | 52/79.9 |
| 2014/0137727 A1* | 5/2014 | Riley | ................ | F41H 5/0442 |
| | | | | 89/36.02 |
| 2014/0141160 A1* | 5/2014 | Strachan | ................ | B05D 7/50 |
| | | | | 427/209 |
| 2014/0308079 A1* | 10/2014 | Hamrick | ................ | E04C 2/044 |
| | | | | 405/153 |
| 2018/0208388 A1* | 7/2018 | Austerberry | ............ | E04C 2/384 |
| 2018/0274254 A1* | 9/2018 | Fan | ............ | E04H 1/04 |
| 2019/0284804 A1* | 9/2019 | Ibrahim | ................ | E04C 2/46 |
| 2020/0385982 A1* | 12/2020 | Rivas | ................ | E04C 2/292 |
| 2020/0392731 A1* | 12/2020 | Sloane | ................ | E04C 2/288 |
| 2021/0025156 A1* | 1/2021 | Dombowsky | ............ | E04C 2/382 |
| 2022/0316210 A1* | 10/2022 | Argyrou | ................ | E04C 2/50 |

* cited by examiner

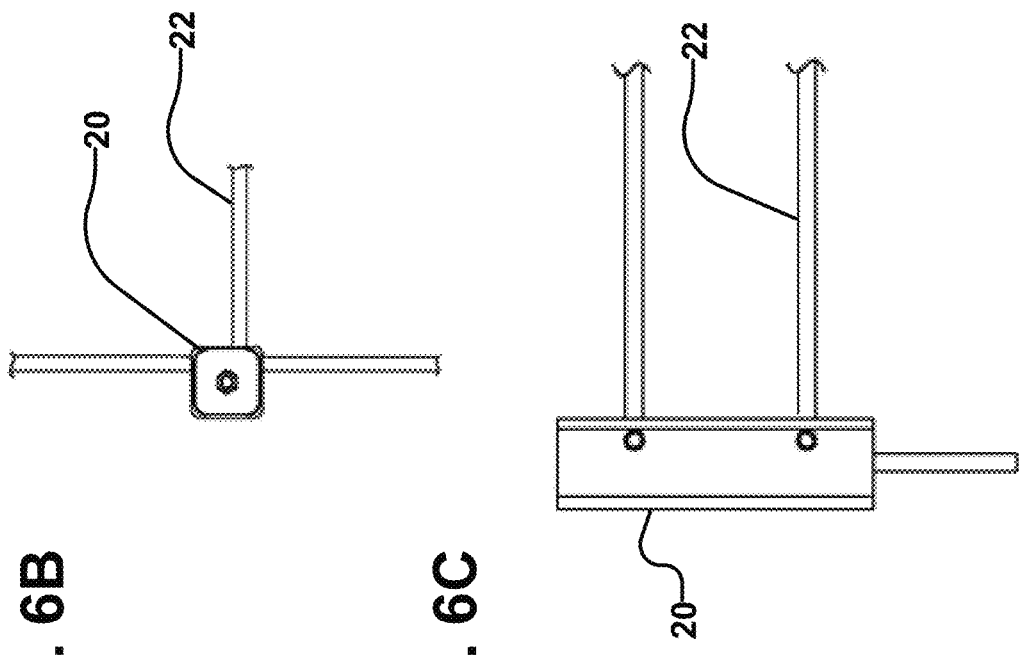
FIG. 6B
FIG. 6C
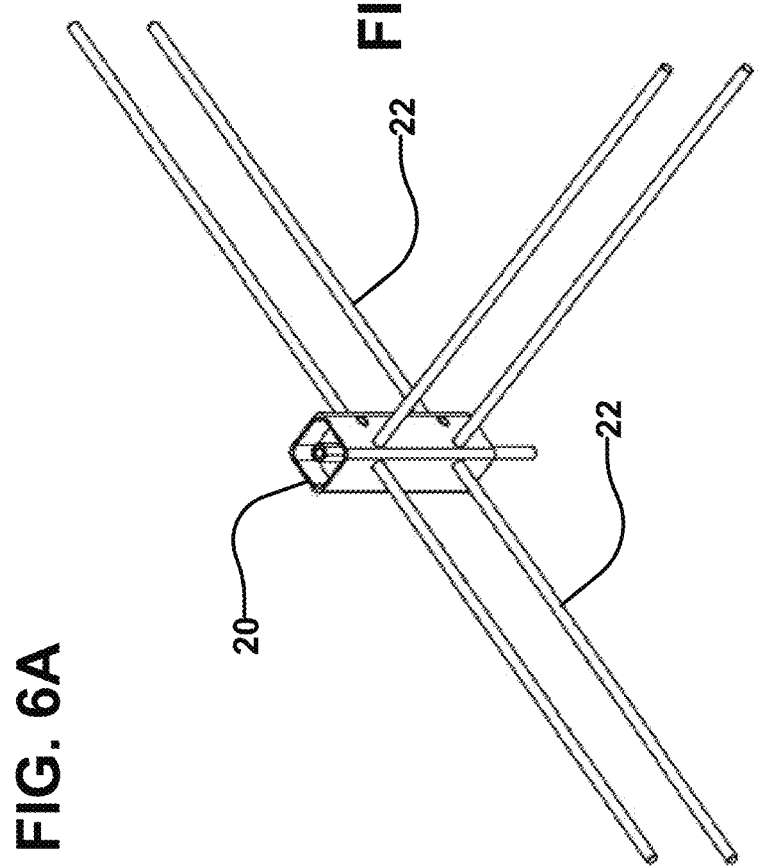
FIG. 6A

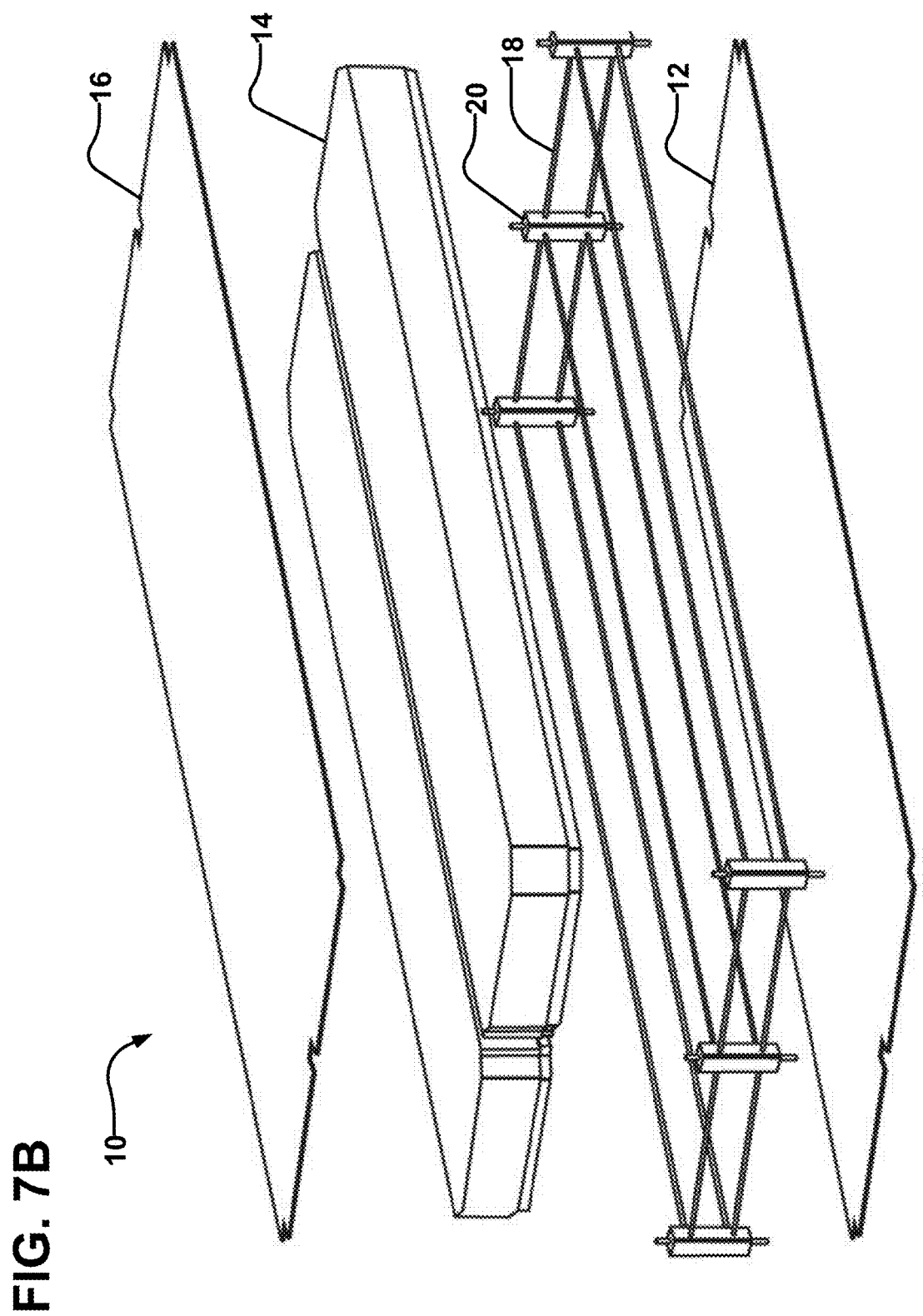

SYSTEMS AND METHODS FOR COUPLING PREFABRICATED PANELS TOGETHER AND REINFORCING FRAME STRUCTURE

CROSS-REFERENCE TO RELATED APPLICATIONS

This application claims the benefit under 35 U.S.C. § 119 of U.S. Application No. 63/003,401 filed 1 Apr. 2020 and entitled SYSTEMS AND METHODS FOR COUPLING PREFABRICATED PANELS TOGETHER and of U.S. Application No. 63/081,141 filed 21 Sep. 2020 and entitled SYSTEMS AND METHODS FOR COUPLING PREFABRICATED PANELS TOGETHER AND REINFORCING FRAME STRUCTURE which are hereby incorporated herein by reference for all purposes.

TECHNICAL FIELD

This invention relates to connectors for coupling adjacent building panels in the construction of buildings and structures, and in particular connectors for coupling cementitious prefabricated building panels such as Cementitious Structural Insulated Panels (CSIPS). The invention also relates to reinforced frame structures for prefabricated building panels.

BACKGROUND

Constructing a building is typically an extensive project involving significant amounts of time and/or resources (labour, energy, materials, etc.).

Reducing the amount of time and/or resources required to construct a building can be desirable. One way the amount of time and/or resources required can be reduced is by constructing the building using prefabricated panels. Additionally, existing prefabricated panels may be difficult to maneuver into place and to couple together. In some methods of construction with prefabricated panels, many connections must be made between the panels to ensure sufficient strength in the resulting structure to resist axial, transverse and shear forces. Poor connections can compromise the structural stability and safety of a building built with prefabricated panels.

There remains a need for sturdy, efficient, practical and cost effective ways to connect prefabricated building panels using systems and methods that improve on existing technologies.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the invention provides a system for connecting adjacent building panels, the system comprising a plurality of panels, each panel comprising two longitudinal ends, two lateral ends, each intersection between a longitudinal end and a lateral end defining a corner. A reinforcing frame extends along the longitudinal ends and along the lateral ends, the frame comprising a plurality of connectors wherein at each corner of the panel a connector is embedded in the frame, and a reinforcing structure extending between at least a pair of the plurality of connectors.

In an aspect of the invention a building panel comprises: opposing first and second longitudinal ends; opposing first and second lateral ends, each of the first and second lateral ends intersecting each of the first and second longitudinal ends at a corner of the panel; and a reinforcing frame extending around the longitudinal ends and the lateral ends, the reinforcing frame comprising: a plurality of connectors, each of the corners of the panel occupied by at least one of the connectors; and a reinforcing structure extending between the plurality of connectors.

In some aspects of a building panel the reinforcing structure comprises hollow steel sections. In some embodiments the reinforcing structure comprises threaded bars. In some embodiments the reinforcing structure comprises a thickened layer of cementitious material. The building panel may comprise a front cementitious layer, a rear cementitious layer and an insulative core. One or more of a plurality of connectors may comprise a hollow connector block wherein one or more walls of the connector block each define a threaded hole for receiving a threaded end of a reinforcing rod. One or more of said walls of the connector block may each define an aperture for connecting said connector block to an adjoining panel.

In an aspect of the invention a method for connecting two or more building panels together comprises: positioning a first panel on a construction site, the first panel comprising a first reinforcing frame, the first reinforcing frame extending along longitudinal and lateral ends of the first panel, the first reinforcing frame comprising at least a first connector situated at a corner of the first panel; positioning a second panel adjacent to the first panel, the second panel comprising a second reinforcing frame, the second reinforcing frame extending along longitudinal and lateral ends of the second panel, the second reinforcing frame comprising at least a second connector situated at a corner of the second panel; aligning the second connector with the first connector; and securing the first and second connectors together with a fastener.

In some embodiments of the invention the method may comprise placing an insert between the first and second connectors. In some embodiments the method may comprise covering an access of at least one of the first and second connectors. Each of the first and second panel may comprise: a front cementitious layer, a rear cementitious layer, and an insulative core. The first panel may form a floor panel and the second panel may form a wall panel. The wall panel may be secured to the floor panel by fastening a first connector on the wall panel to a second connector on the floor panel.

Another aspect of the invention provides reinforcing members for strengthening a structural frame of a panel. In some embodiments a reinforcing mesh at least partially surrounds structural members of a reinforcing frame. In some embodiments the reinforcing mesh has a generally "J" shaped cross-section.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIG. 6A is an isometric view of a connector and pairs of reinforcement structures according to an embodiment of the invention.

FIG. 6B is a top view of the connector and pairs of reinforcement structures of FIG. 6A.

FIG. 6C is a side view of the connector and pairs of reinforcement structures.

FIG. 7B is an exploded view of a floor panel with a reinforcing frame and connectors according to an embodiment of the invention.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 1:
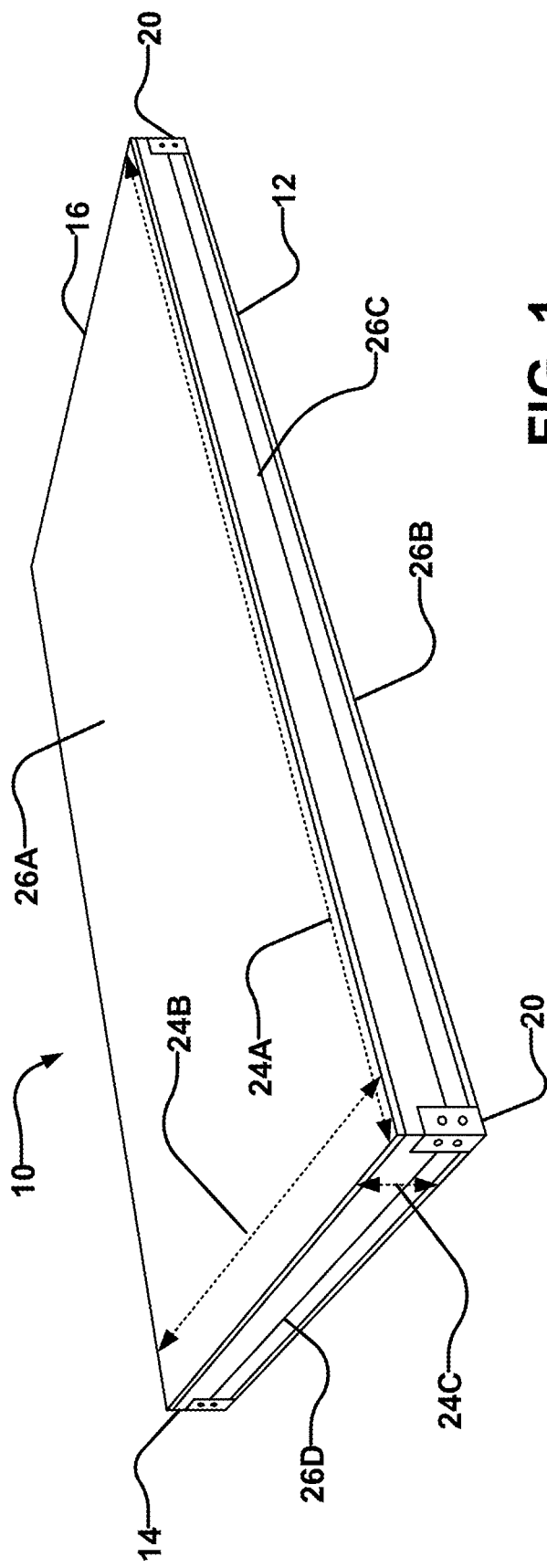
FIG. 1 is a perspective view of a panel with a reinforcing frame and connectors according to an embodiment of the invention.

Referring to FIG. 1 there is shown a panel 10. Panel 10 may comprise a building panel of many possible varieties, such as a structural insulated panel (SIP), a concrete structural insulated panel (CSIP), a timber frame panel, or a lightweight steel frame panel. Panel 10 is illustrated in FIG. 1 as a SIP comprising a first structural layer 12, an insulative core 14 and a second structural layer 16. At each corner of panel 10 there may be a connector 20. Some embodiments of panel 10 may, for example, be fabricated substantially as described in Canadian Patent No. 2994868, which is incorporated herein by reference.

Figure 2:
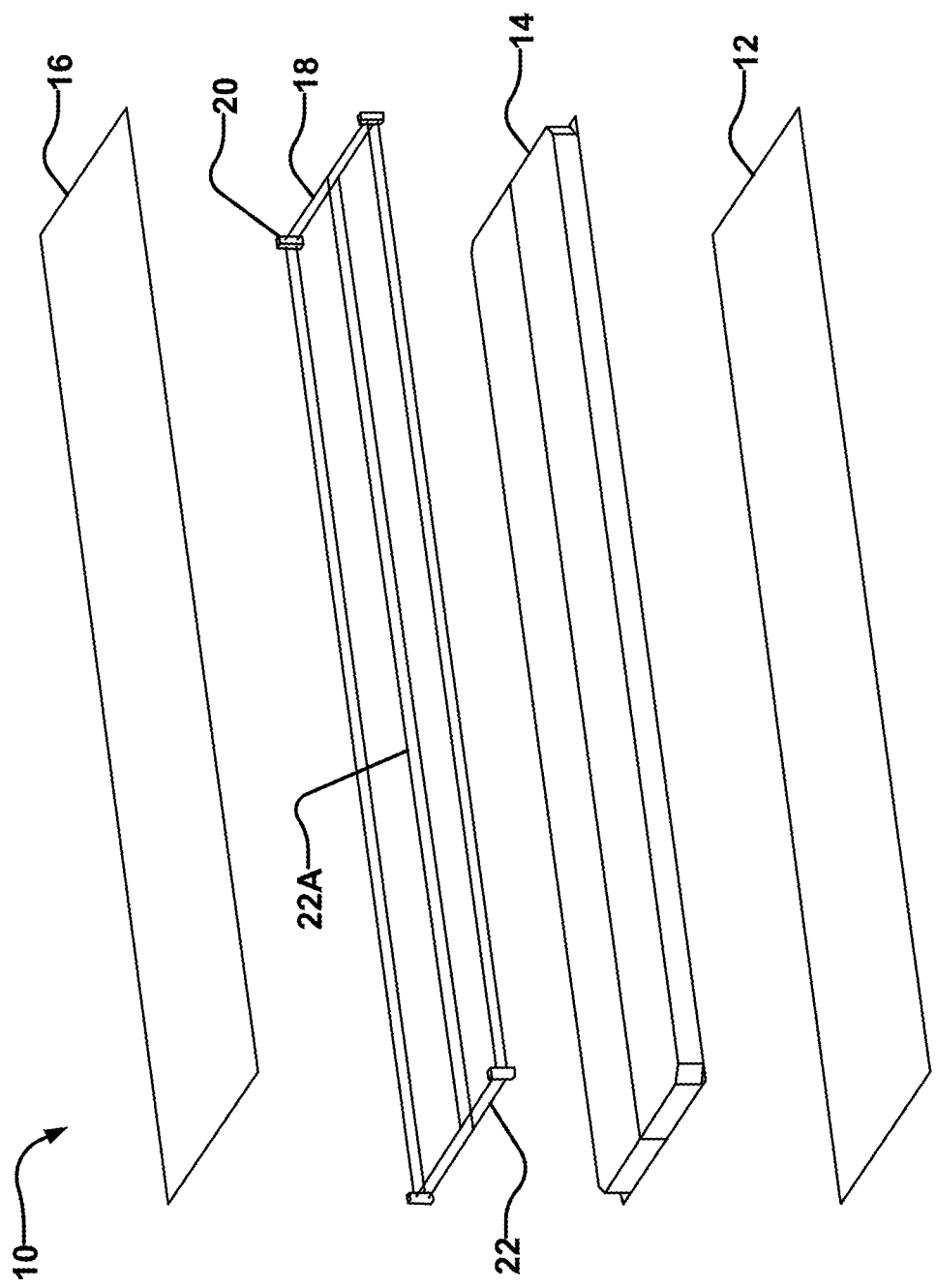
FIG. 2 is an exploded view of a panel with a reinforcing frame and connectors according to an embodiment of the invention.
Figure 3A:
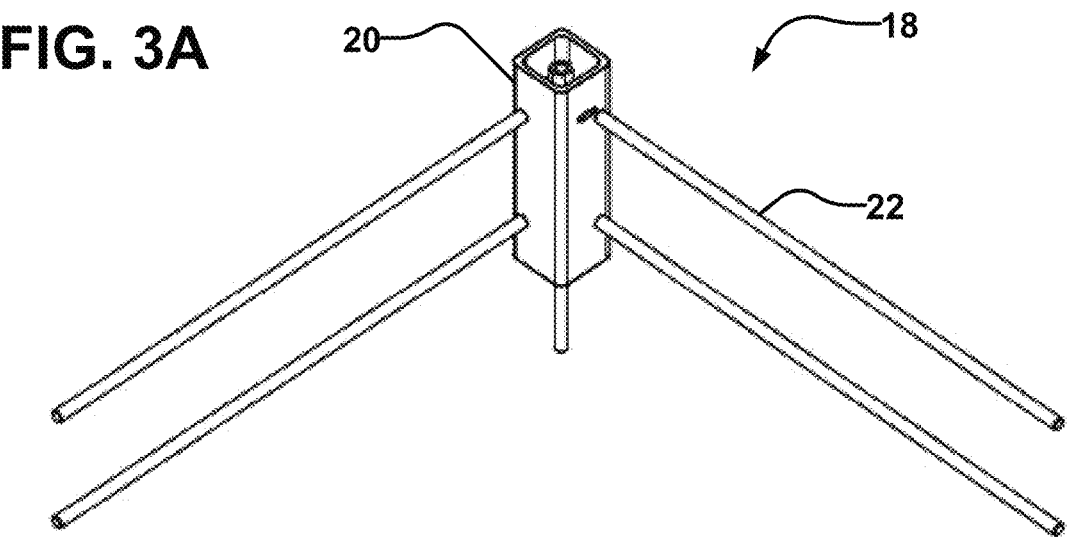
FIG. 3A is an isometric view of a connector and pairs of reinforcement structures according to an embodiment of the invention.
Figure 3B:
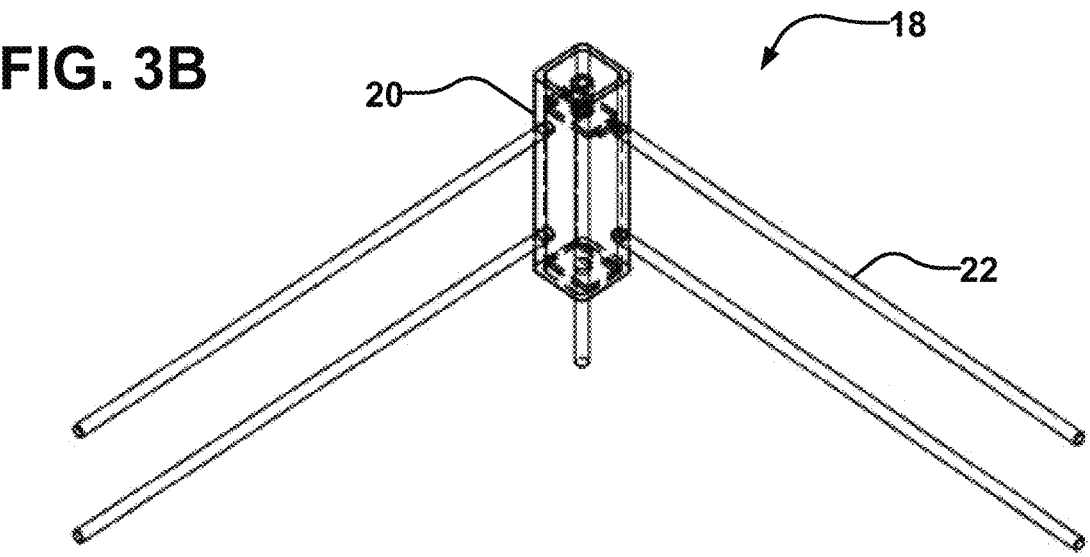
FIG. 3B is an isometric view of a connector and pairs of reinforcement structures according to an embodiment of the invention in which the connector is shown partially transparent.
Figure 3C:
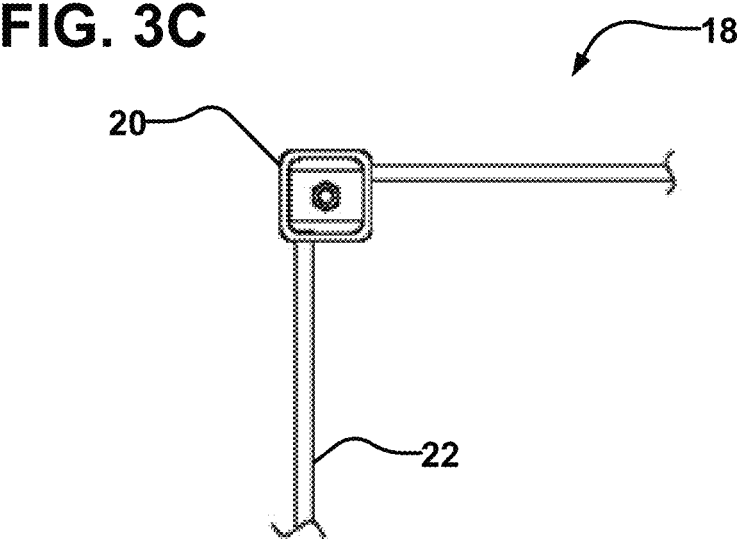
FIG. 3C is a plan view of the connector and pairs of reinforcement structures of FIG. 3A.
Figure 3D:
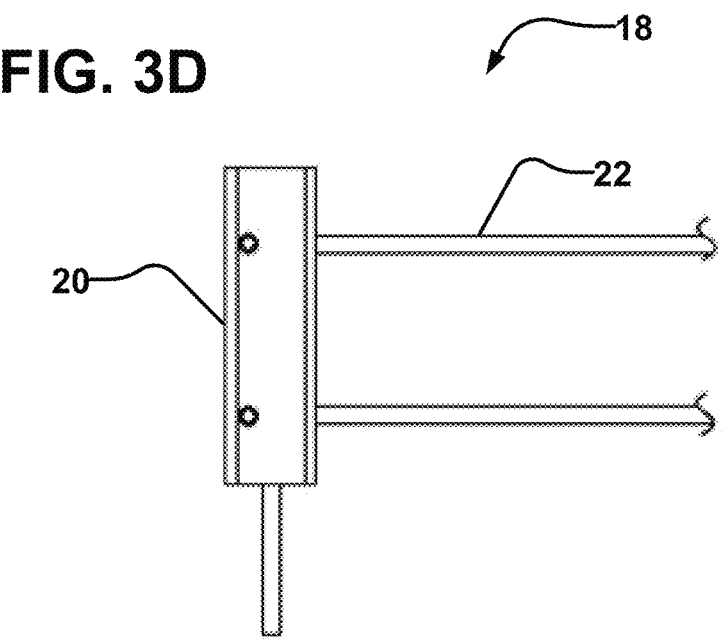
FIG. 3D is a side view of the connector and pairs of reinforcement structures of FIG. 3A.

FIG. 2 is an exploded view of a version of a SIP-type panel. Panel 10 comprises first structural layer 12, insulative core 14 and second structural layer 16. First structural layer 12 and second structural layer 16 are applied to opposing faces of insulative core 14 and may each be adhered to insulative core 14. A reinforcing frame 18 is situated between first structural layer 12 and second structural layer 16. As illustrated, reinforcing frame 18 embeds into insulative core 14, however this is not necessary. In some embodiments, reinforcing frame 18 may embed into first structural layer 12 or second structural layer 16, or reinforcing frame 18 may embed into both insulative core 14 and one of the adjacent structural layers. In some embodiments, insulative core 14 may be formed around reinforcing frame 18. Where structural layers 12, 16 each comprise a cementitious layer, reinforcing frame 18 may be cast into or onto a structural layer during the casting process.

Figure 8:
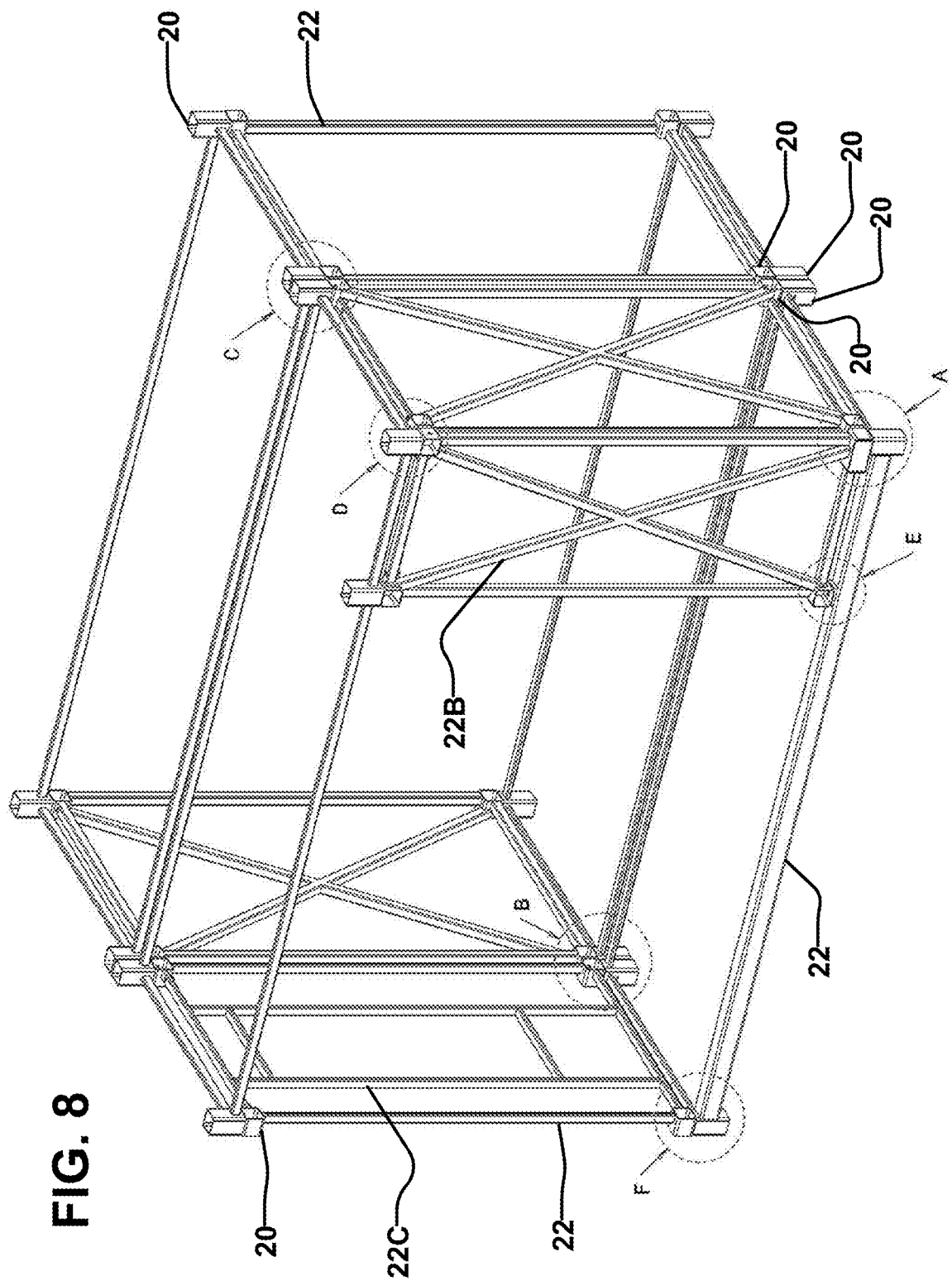
FIG. 8 is an isometric view of a set of reinforcing frames as they might be configured after the assembly of their associated panels in the construction of a room of a structure.

Reinforcing frame 18 comprises connectors 20 and reinforcing structure 22. As illustrated in FIG. 2, reinforcing structure 22 comprises threaded rods. In other embodiments reinforcing structure 22 may comprise other reinforcing elements such as hollow structural sections (HSS) as shown in FIG. 8, rebar or a thickened edge of the material of one or both of first structural layer 12 and second structural layer 16. Reinforcing structure 22 may comprise materials such as steel, aluminum, fiberglass, or other materials providing structural reinforcement. In embodiments in which reinforcing structure 22 comprises a thickened edge of a cementitious material of one of first structural layer 12 and second structural layer 16, then the reinforcing structure 22 and the thickened structural layer may be monolithic and may be cast as a single layer during fabrication. In such embodiments connectors 20 may be embedded into the cementitious reinforcing structure 22 and secured by mesh or rods attached to connectors 20 and extending into the cementitious material.

Panel 10 may comprise any of a variety of types of panel including wall panels, floor panels, roof panels, and foundations panels. Individual panel types may have sub-types of panels. For example, a wall panel may be a wholly interior wall panel with both its faces interior to the structure or may be an exterior wall panel. In general, panels 10 as shown in FIG. 1 may have a length 24A, a width 24B and a depth 24C. Each panel may comprise six faces including a front face 26A, a rear face 26B, opposing longitudinal faces 26C, and opposing lateral faces 26D. While panels 10 illustrated in the figures are generally represented as rectangular cuboids, in some embodiments a panel 10 might have other shapes, such as a panel with an L-shaped cross-section.

Figure 29:
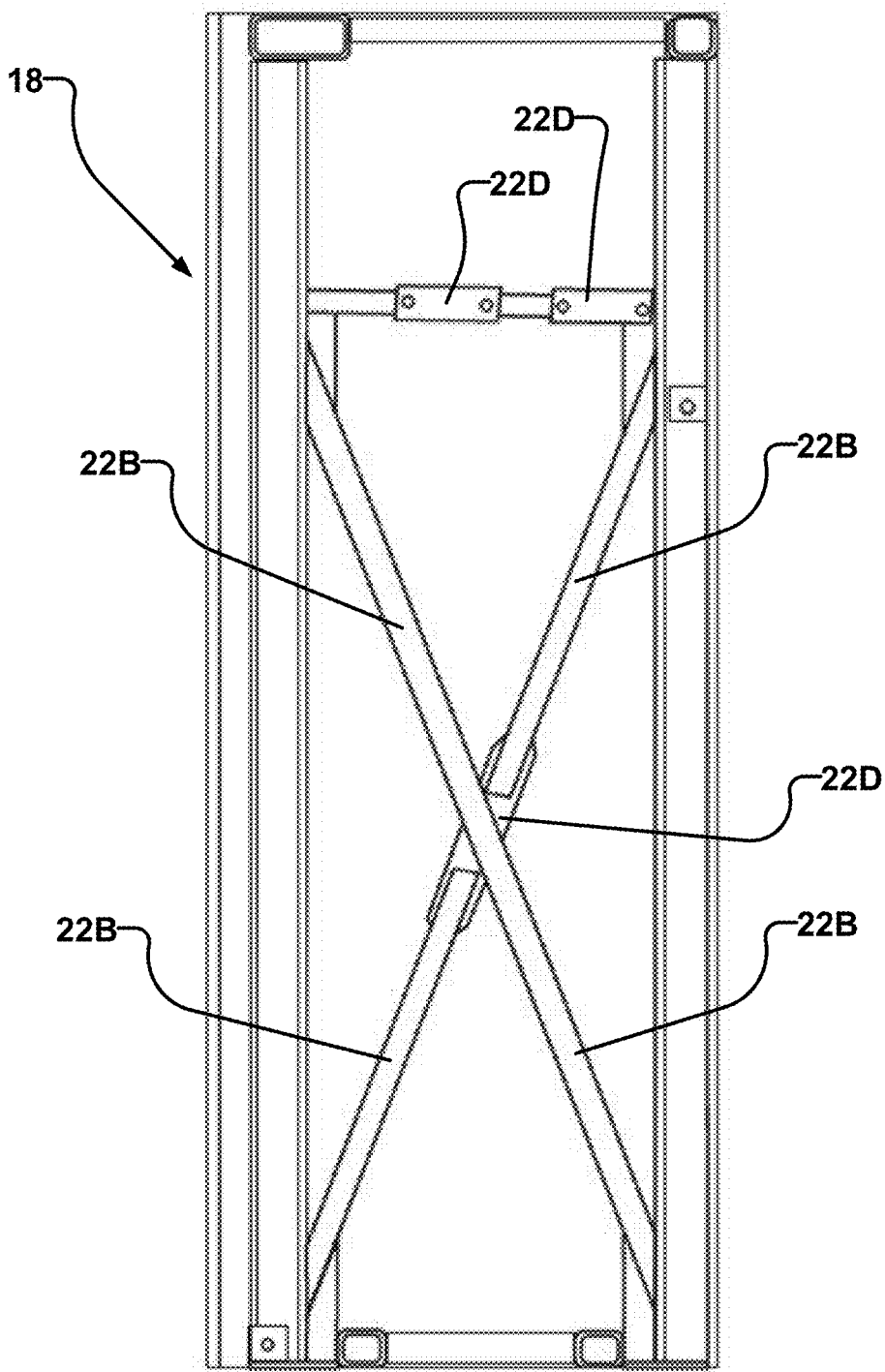
FIG. 29 is a side view of a frame according to an example embodiment of the invention.

Reinforcing structure 22 of reinforcing frame 18 extends at least along longitudinal faces 26C and lateral faces 26D of panel 10 and may comprise horizontal, vertical or diagonal braces, such as brace 22A in FIG. 2 and diagonal cross-braces 22B in FIG. 8. In some embodiments frame 18 may comprise a reinforcing structure 22 which comprises for example braces as shown in FIG. 29. In some such embodiments multiple braces may be joined together with coupling or weld plates 22D. In embodiments of panels 10 with a shape that is not approximated by a rectangular cuboid, reinforcing frame 18 may generally be adapted to follow edges of panel 10 around front face 26A and/or rear face 26B.

Reinforcing frame 18 may be flush with one or more faces or edges of panel 10 or may be set back by some distance in one or more dimensions, partially or wholly covered by a surface on front face 26A or rear face 26B. If, or where, a gap exists between a component of reinforcing frame 18 and an adjacent part of panel 10, that gap may be filled at some stage in the installation of panel 10. For example, gaps may be filled with thermally insulative materials, with sealants, or with other materials as appropriate. In some embodiments, reinforcing structure 22 may incorporate structures for windows, doors and other elements of panels. For example, a window structure 22C is illustrated in FIG. 8.

Figure 7A:
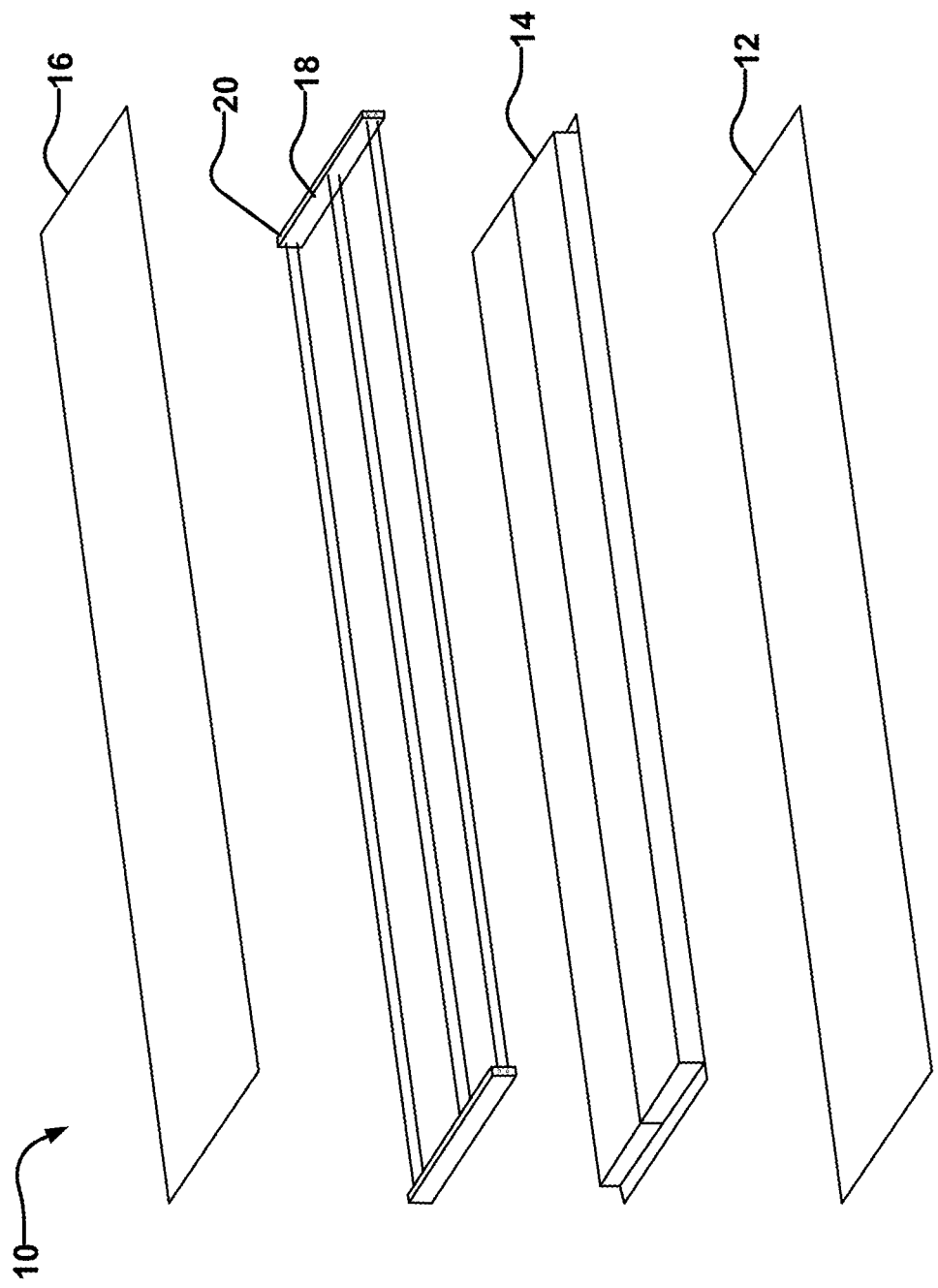
FIG. 7A is an exploded view of a panel with a reinforcing frame and two extended connectors according to an embodiment of the invention.

Connectors 20 may comprise mechanical devices connecting two or more panels or building components together and adjacent connectors 20 of adjoining panels or structures can be welded, fused, bolted or fastened together. In the embodiments shown herein there is at least one connector at each vertex where longitudinal and lateral faces of the panel meet, however this is not strictly necessary. Connectors 20 may be distributed around reinforcing frame 18 and additional connectors 20 may be positioned as necessary to connect adjacent panels. Additionally, a single connector 20 may have an extended shape, as illustrated in FIG. 7A in which connectors 20 each occupy two corners of panel 10. A connector 20 may span any of the length, width or depth of a panel. As a further example, FIG. 7B illustrates a floor panel 10 in which connectors 20 extend through the depth of the panel. In general, connectors may be placed anywhere on reinforcing frame 18 of panel 10 for various applications and may be placed at different locations on given types of panels as required by the circumstances. In some embodiments connectors 20 may comprise: an HSS body; embedment studs either welded or threaded in place which integrate into reinforcement structure 22 comprising steel rods, rebar or all-thread-rod; welded plates capping one or both sides; or plates with threaded receiving nuts to fasten to other connectors. An HSS body may be formed from a material such as steel or from other materials such as extruded aluminum or extruded fiberglass. Connectors 20 comprising an HSS body may have at least one open face so that the interior of the connector 20 can be accessed to install fasteners. In some embodiments, connectors 20 with an HSS body may comprise only a single exposed drilled or tapped hole, with the remainder of the HSS body contained or covered by cementitious material. Connectors 20 with a single exposed hole may be used, for example, at the corners and tops of panels. A connector 20 with a single exposed hole may align with a second connector 20 in an adjacent panel having an open face such that a fastener may be inserted through the open face of the second connector.

In some embodiments, reinforcing frame 18 including both connectors 20 and reinforcing structure 22 may comprise extruded fiberglass. In such embodiments reinforcing structure 22 may comprise extruded and threaded fiberglass round bars in which the threaded fiberglass threads into threaded holes in connectors 20. An extruded fiberglass reinforcing frame 18 may be employed, for example, in construction applications near salt water. In such applications, connection components such as bolts, washers and nuts which might otherwise comprise steel or other metals may comprise fiberglass or other materials with high resistance to corrosion.

Figure 22A:
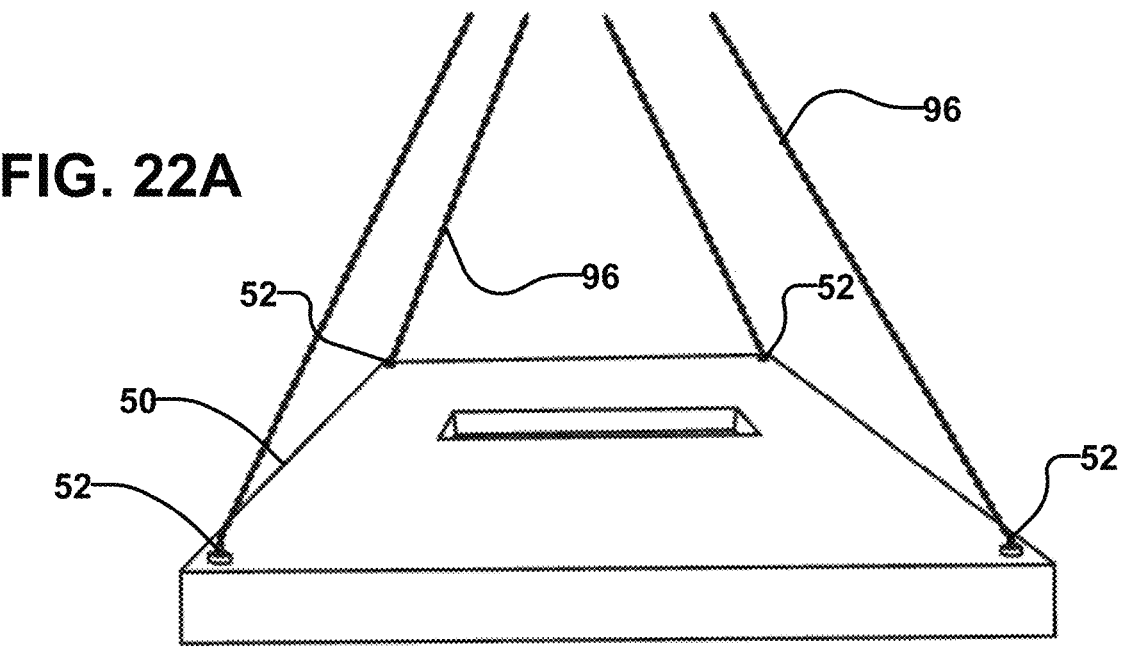
FIG. 22A is a perspective view of a wall panel being lifted by shackles connected to connectors at each of four corners of the wall panel.
Figure 22B:
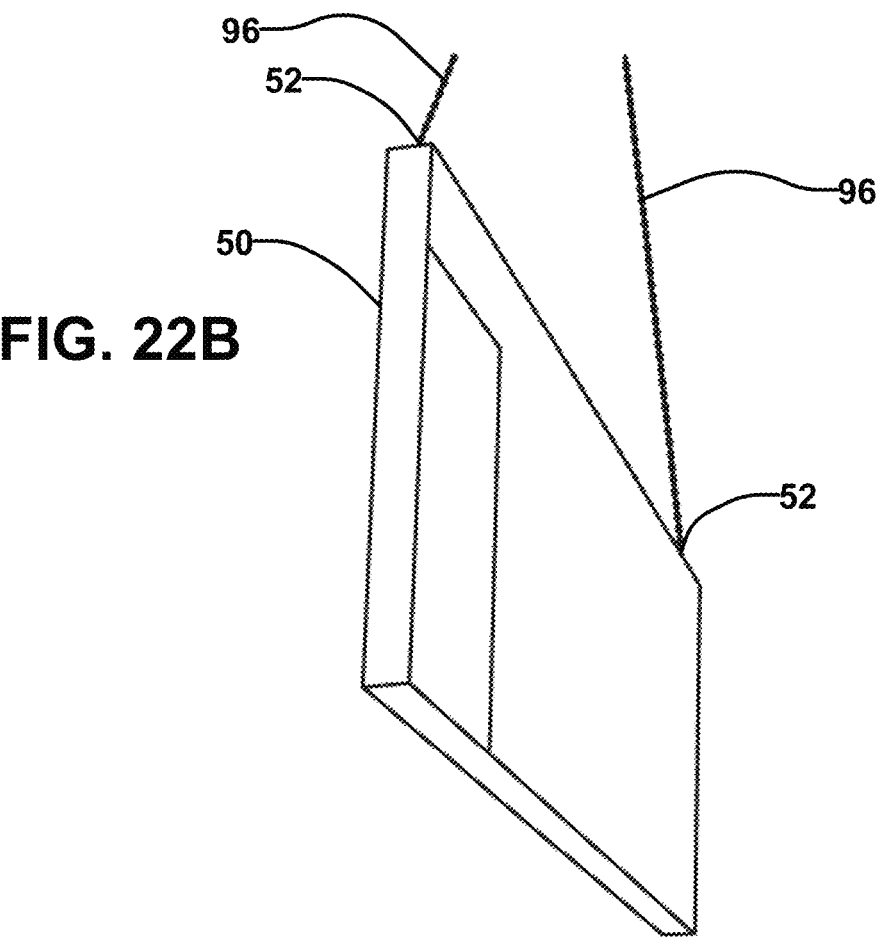
FIG. 22B is a perspective view of a wall panel being lifted by shackles at two corners of the wall panel.

In some embodiments, such as those employed in SIPs with cementitious layers, reinforcing frame 18 may be embedded and integrated structurally into panels as the cementitious layers of panel 10 are cast in place. A welded wire mesh (WWM) may be welded to reinforcing frame 18 and embedded in one or more cementitious layers during fabrication to provide further mechanical attachment of reinforcing frame 18 to cementitious layers of panel 10. Connectors 20 reinforce potentially vulnerable portions of the panel. When connectors are disposed at corners and vertices of panels, they may protect the corners and vertices from damage during any of various stages of the life of the panel, such as during transportation and assembly into a structure. Connectors 20 may serve as lifting anchors for removing panels 10 from casting beds and may also serve as lifting anchors for hoisting panels 10 for logistics, storage, transportation and assembly, as illustrated for example in FIGS. 22A and 22B.

Figure 24:
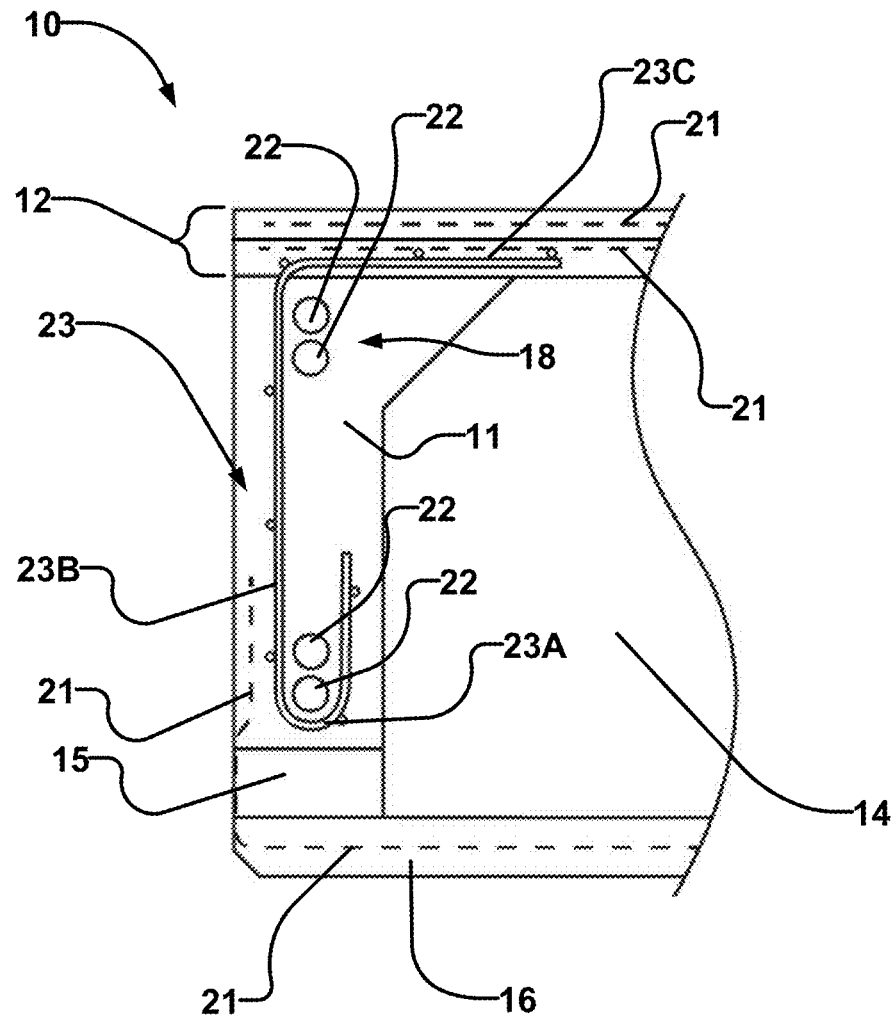
FIG. 24 is a partial cross-sectional view of a panel according to an example embodiment of the invention.
Figure 25A:
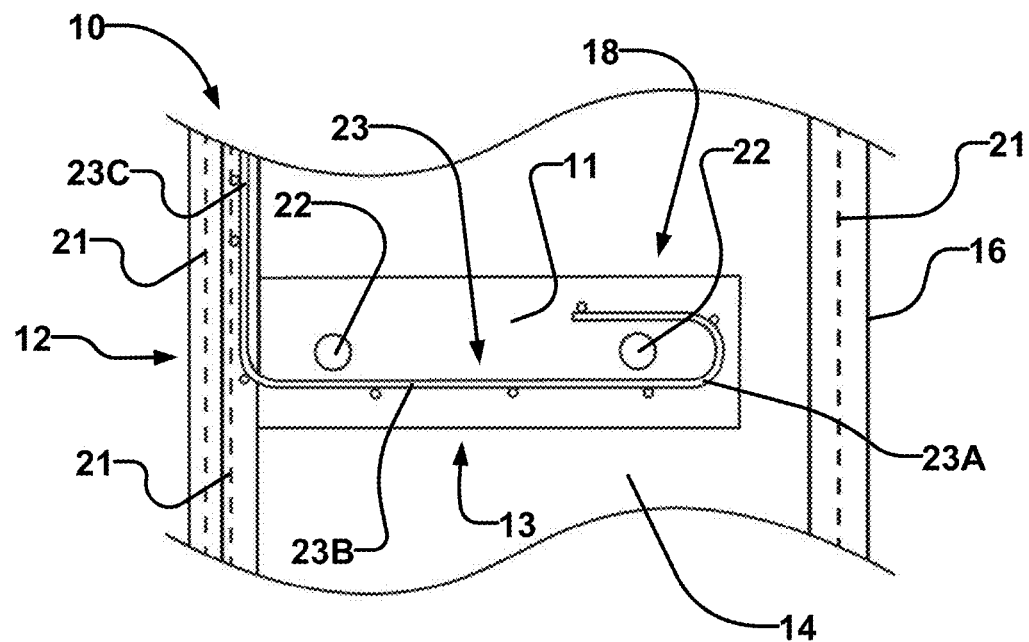
FIG. 25A is a partial cross-sectional view of a panel according to an example embodiment of the invention.
Figure 26A:
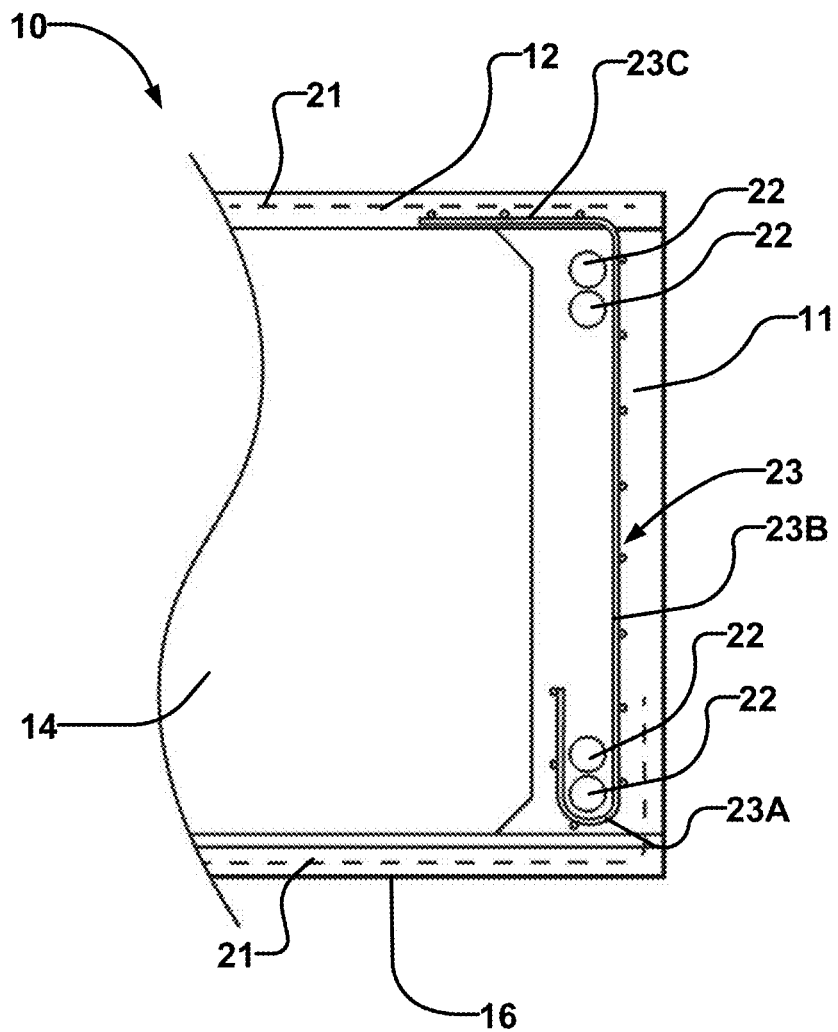
FIG. 26A is a partial cross-sectional view of a panel according to an example embodiment of the invention.

As described above, frame 18 may be at least partially embedded within a cementitious material (e.g. cementitious material 11 as shown in FIGS. 24, 25A, 26A, etc.). The cementitious material in combination with frame 18 may, for example, form reinforced peripheral edges of panel 10 which may structurally support panel 10 within a building (in some cases the reinforced portions of panel 10 may be referred to as a "structural core" of panel 10). In some embodiments at least a portion of frame 18 does not extend along peripheral edges of panel 10 (see e.g. FIG. 26C). In some embodiments a portion of frame 18 is embedded within insulative core 14. Frame 18 may, for example, not extend along at least one peripheral edge of a panel 10 which will form a corner of a building.

The cementitious material (e.g. cementitious material 11) may be the same as or different than the cementitious material(s) of structural layers 12 and/or 16. Reinforcing members (e.g. a reinforcing mesh, reinforcing fibers, etc.) may also be embedded within the cementitious material in which frame 18 is embedded. Such reinforcing members may, for example, strengthen the cementitious material, strengthen the coupling between the cementitious material and elements of the reinforcing structure 22 of frame 18 which are embedded within the cementitious material, prevent (or reduce the likelihood of) cracks developing in the cementitious material, etc.

In some embodiments the reinforcing members increase the compressive strength of the cementitious material (e.g. cementitious material 11) such that the cementitious material has a compressive strength that is equal to or greater than a compressive strength of cement. Additionally, or alternatively, frame 18 and/or elements of reinforcing structure 22 of frame 18 alone or in combination with the reinforcing members may increase the tensile strength of a panel 10.

In some embodiments the reinforcing members are coupled to frame 18 (e.g. welded, tied down, buckled, fastened, etc.) prior to the cementitious material being poured over the portions of frame 18 which are to be embedded within the cementitious material. However, this is not mandatory in all cases.

In some embodiments panel 10 comprises a reinforcing member configured as a shaped reinforcing mesh 23 as shown in FIGS. 23 to 27. In some embodiments reinforcing mesh 23 is shaped to at least partially wrap around at least one element and/or section of frame 18 (e.g. an element of reinforcing structure 22 of frame 18). Having mesh 23 at least partially wrap around an element and/or section of frame 18 may, for example (non-limiting):

- prevent (or reduce the likelihood of) movement of mesh 23 relative to frame 18;
- strengthen the cementitious material (e.g. compressive, shear and/or tensile strength);
- strengthen the coupling between mesh 23 and frame 18;
- eliminate the need to separately fix mesh 23 relative to frame 18 (i.e. placing mesh 23 partially around at least one element of reinforcing structure 22 of frame 18 to couple mesh 23 to frame 18);
- couple elements of reinforcing structure 22 of frame 18 together;
- anchor mesh 23 relative to at least one element of reinforcing structure 22 of frame 18;
- increase shear reinforcing of panel 10 in one or more directions (e.g. mesh 23 may increase shear reinforcing in a generally vertical direction while an element of reinforcing structure 22 increases shear reinforcing in a generally horizontal direction or vice versa);
- strengthen frame 18 (e.g. compressive, shear and/or tensile strength);
- strengthen the structural core of panel 10 (e.g. compressive, shear and/or tensile strength);
- strengthen panel 10 generally (e.g. compressive, shear and/or tensile strength);
- etc.

In some embodiments reinforcing mesh 23 may comprise a wire welded mesh (WWM), fiberglass mesh, carbon fiber mesh, basalt mesh, polyester mesh and/or the like.

As shown in FIGS. 23 to 27, mesh 23 may comprise a generally "J" shaped (or reverse "J" shaped) cross-section. A curved portion 23A of such mesh 23 may wrap around at least one element of frame 18 (e.g. wrap around at least one element of reinforcing structure 22 of frame 18). Curved portion 23A may advantageously prevent transverse movement of reinforcing mesh 23 relative to frame 18. Reducing transverse movement of reinforcing mesh 23 relative to frame 18 may strengthen the bond of frame 18 within the cementitious material. Additionally, or alternatively, reducing transverse movement of reinforcing mesh 23 relative to frame 18 may make it easier, quicker and less costly to manufacture a panel 10 (e.g. positioning curved portion 23A of mesh 23 around an element of reinforcing structure 22 of frame 18 may fix mesh 23 in a desired position relative to frame 18 eliminating the need to separately fix mesh 23 before the cementitious material is poured).

Inside surfaces of curved portion 23A are shaped to receive corresponding elements of reinforcing structure 22 of frame 18. In some embodiments curved portion 23A of mesh 23 is pre-fabricated (e.g. mesh 23 is delivered with curved portion 23A already fabricated). However this is not necessary in all cases. In some embodiments curved portion 23A is made in real time during manufacturing of panel 10

(e.g. a portion of mesh 23 is wrapped around elements of reinforcing structure 22 of frame 18 during manufacturing of a panel 10).

In some embodiments inside surfaces of curved portion 23A frictionally engage corresponding outer surfaces of frame 18 (e.g. corresponding outer surfaces of elements of reinforcing structure 22). In such embodiments curved portion 23A forms a friction fit with elements of the reinforcing structure 22 of frame 18 it surrounds. In some embodiments a gap is present between the inside surfaces of curved portion 23A and corresponding elements of reinforcing structure 22 of frame 18.

Figure 23:
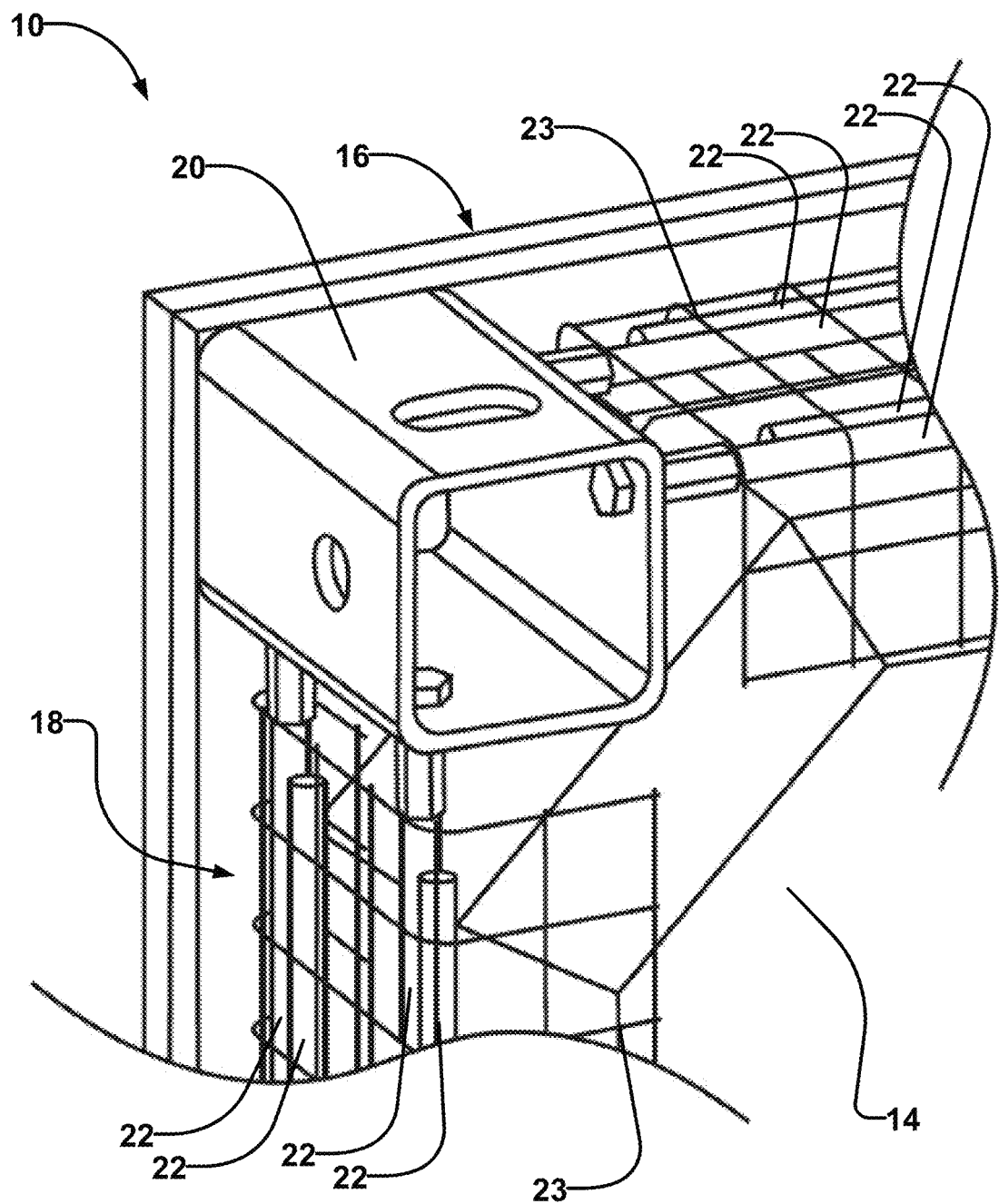
FIG. 23 is a partial cutaway perspective view of a panel according to an example embodiment of the invention.

Curved portion 23A may wrap around a single element of reinforcing structure 22 of frame 18 (see e.g. FIG. 25A) or multiple elements of reinforcing structure 22 of frame 18 (see e.g. FIGS. 23 and 24).

Figure 26B:
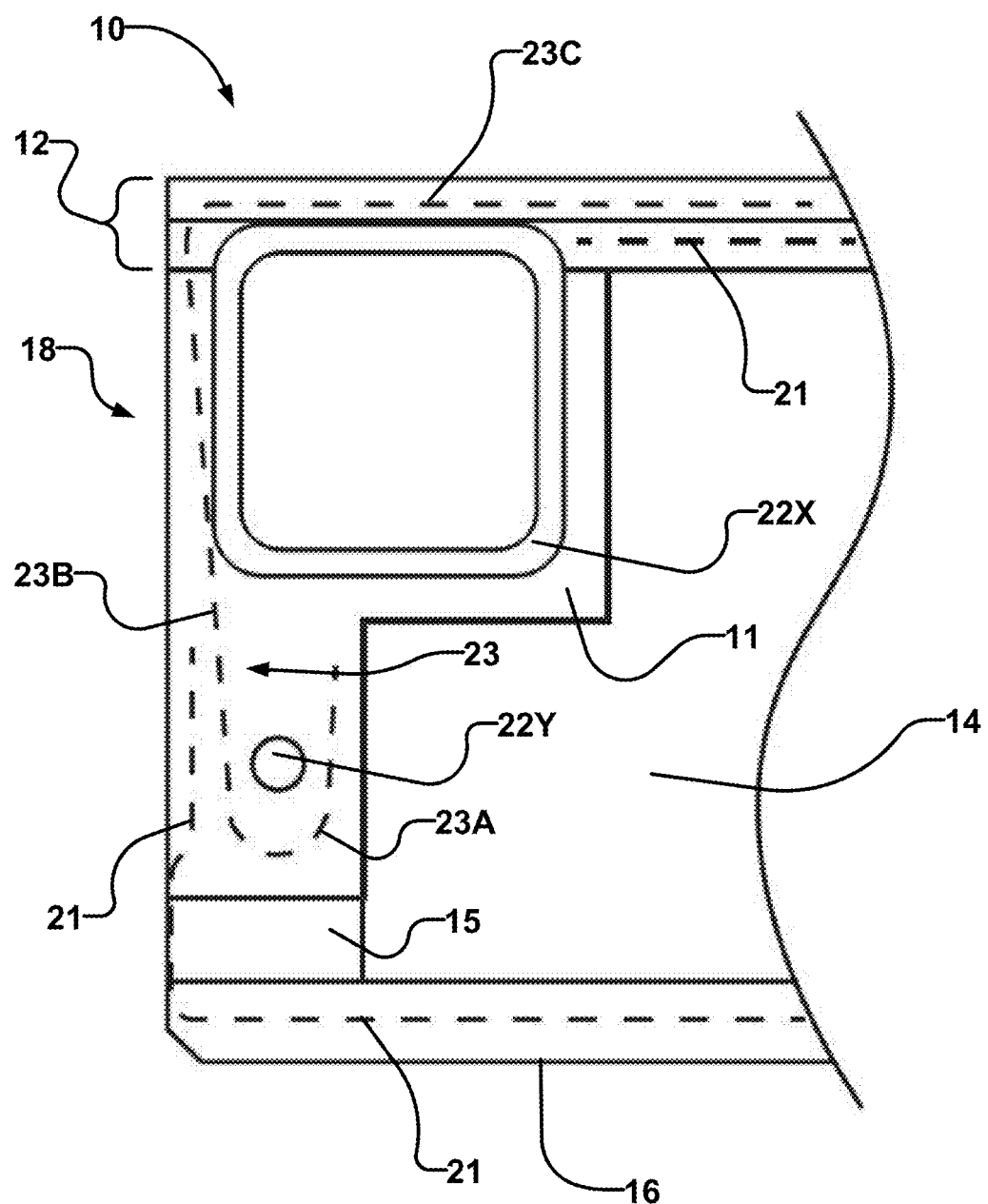
FIG. 26B is a partial cross-sectional view of a panel according to an example embodiment of the invention.
Figure 26C:
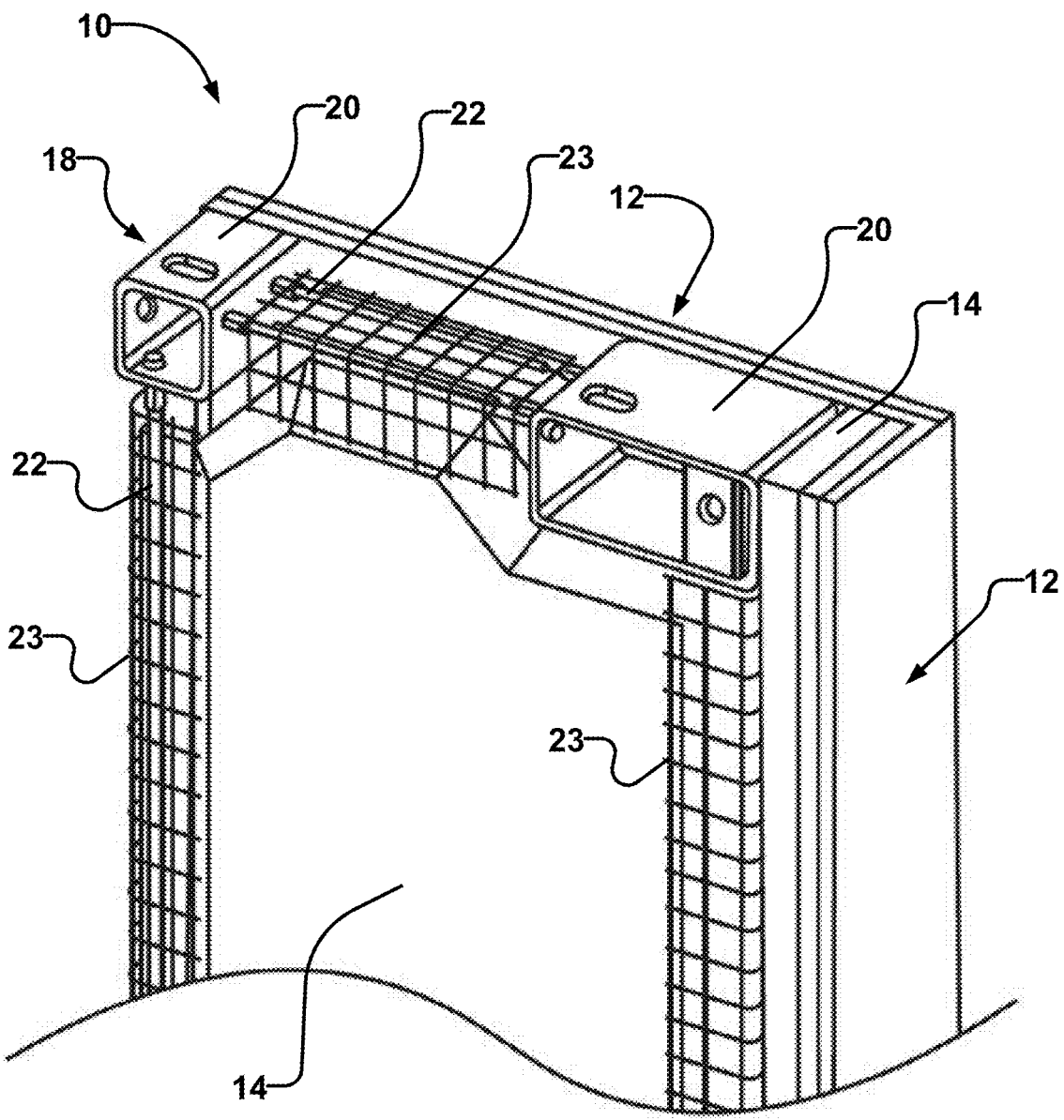
FIG. 26C is a partial cutaway perspective view of a panel according to an example embodiment of the invention.

In some embodiments frame 18 comprises a plurality of different elements of reinforcing structure 22. For example, as shown in FIG. 26B, frame 18 may comprise a hollow structure section (HSS) element 22X and a re-bar or threaded rod element 22Y. Curved portion 23A (or mesh 23 generally) may be configured to wrap around only one type of element of reinforcing structure 22 or multiple different types of elements of reinforcing structure 22. In some embodiments mesh 23 passes over one element of reinforcing structure 22 while passing below another element of reinforcing structure 22.

Curved portion 23A has been shown as having a circular profile. However, this is not necessary in all cases. Curved portion 23A may comprise any shape which facilitates an end of mesh 23 at least partially wrapping around an element of reinforcing structure 22 of frame 18. In some embodiments curved portion 23A is rectangular. In some embodiments curved portion 23A comprises at least one vertex. The at least one vertex may be filleted.

Portion 23B of mesh 23 typically extends from curved portion 23A to cover remaining portions of frame 18. However mesh 23 need not cover all of frame 18. Mesh 23 also need not extend from one edge of panel 10 to an opposing edge of panel 10. Mesh 23 need not pass over outside surfaces of frame 18 in all cases. In some embodiments, portion 23B is generally flat (or planar). Portion 23B may, for example, extend longitudinally outwards from curved portion 23A to an end of the cementitious material. In some embodiments portion 23B extends generally parallel to at least one element of reinforcing structure 22 of frame 18.

In some embodiments shaped reinforcing mesh 23 comprises a third portion 23C which may extend into a structural layer of panel 10 (e.g. structural layer 12, 16, etc.). Third portion 23C may, for example, extend in a direction that is generally perpendicular from portion 23B of mesh 23. Third portion 23C may, for example, strengthen a bond between a structural layer (e.g. structural layer 12, 16, etc.) within which third portion 23C is embedded and another element of panel 10 (e.g. the bond between a structural layer and one or more of insulative core 14, frame 18, the cementitious layer which covers frame 18, a connector 20 and/or the like).

One or both of structural layers 12, 16 may comprise multiple layers. Third portion 23C of mesh 23 may be embedded within only one of the layers (see e.g. FIG. 24) or may be embedded within multiple layers (e.g. third portion 23C is positioned between two layers which form a structural layer). Third portion 23C may be embedded within a layer of the structural layer that is closest to insulative core 14 but this is not mandatory in all cases.

In some embodiments reinforcing members such as mesh 21 may be embedded in one or both of structural layers 12, 16 as shown in, for example, FIGS. 24, 25A, 26A and 26B. Mesh 21 (or other reinforcing member(s) embedded within structural layer(s) 12, 16) may be coupled to mesh 23. Coupling mesh 21 (or other reinforcing member(s) embedded within structural layer(s) 12, 16) to mesh 23 may strengthen (e.g. compressive, shear and/or tensile strength) a bond of the structural layer to other components of panel 10 (e.g. insulative core 14). Additionally, or alternatively, coupling mesh 21 (or other reinforcing member(s) embedded within structural layer(s) 12, 16) to mesh 23 may couple the structural layer within which mesh 21 (or other reinforcing member(s)) is embedded directly to frame 18 or the structural core of panel 10.

Mesh 21 may, for example, be directly coupled to mesh 23 using ties, fasteners, welds, adhesives, and/or the like. In some embodiments cementitious material 11 couples mesh 21 to mesh 23.

In some embodiments mesh 21 comprises a wire welded mesh (WWM), fiberglass mesh, carbon fiber mesh, basalt mesh, polyester mesh and/or the like. In some embodiments mesh 21 comprises a glass fiber mesh. In some embodiments mesh 21 is the same as mesh 23.

Mesh 21 may, for example, extend across components of panel 10 such as thermally insulating material 15 as shown in FIGS. 24 and 26B.

Figure 25B:
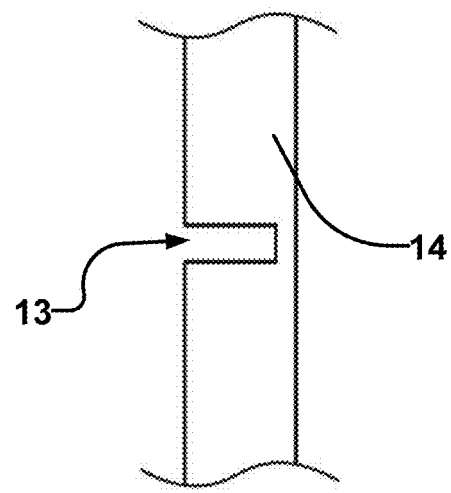
FIG. 25B is a partial side view of an insulative core according to an example embodiment of the invention.

In some embodiments (as shown in FIGS. 25A and 25B) insulative core 14 of panel 10 comprises one or more cavities 13 in which one or more elements of reinforcing structure 22 (e.g. brace(s) 22A) of frame 18 may extend through. Such elements of reinforcing structure 22 may be embedded within a cementitious material (e.g. cementitious material 11). Mesh 23 may at least partially wrap around such element(s) of reinforcing structure 22 as described elsewhere herein and be embedded within the cementitious material to increase the strength (e.g. compressive, shear and/or tensile strength) of such support braces.

Mesh 23 may be coupled to frame 18 in any desired orientation. For example, mesh 23 may cover upper or outer surfaces of frame 18. As another example, mesh 23 may be disposed underneath frame 18 such that mesh 23 is between insulative core 14 and frame 18.

Although reinforcing mesh 23 has been described as being generally "J" shaped in some embodiments, other cross-sectional shapes for mesh 23 are possible. For example, reinforcing mesh 23 may have a cross-section that is generally "I" shaped, "U" shaped", "C" shaped, "L" shaped, etc.

In some embodiments mesh 23 comprises different meshes having two or more different cross-sectional shapes. In some embodiments a generally J-shaped mesh is coupled to a frame 18 (e.g. a J-shaped mesh is at least partially wrapped around an element (or elements) of reinforcing structure 22) prior to elements of reinforcing structure 22 being coupled to connectors 20. In some such embodiments a generally L-shaped mesh is placed over the elements of reinforcing structure 22 and J-shaped mesh once the elements of reinforcing structure 22 and connector(s) 20 have been coupled together. The J-shaped mesh may for example cradle elements of reinforcing structure 22 (e.g. the J-shaped mesh is disposed underneath reinforcing structure 22). Having the J-shaped mesh cradle elements of reinforcing structure 22 advantageously may provide access to elements of reinforcing structure 22 for coupling the elements to connectors 20. The L-shaped mesh may then, for example, be placed over the elements of reinforcing structure 22.

As described elsewhere herein mesh 23 need not be delivered in its desired final shape. A desired cross-sectional shape of mesh 23 may be fabricated in real time as mesh 23 is being coupled to frame 18.

Mesh 23 may comprise a single mesh sheet or multiple mesh sheets coupled together. However mesh 23 need not be a continuous mesh. In some embodiments mesh 23 comprises a plurality of individual components which are shaped in a desired cross-section (e.g. individual generally J-shaped components). The individual components may be placed adjacent one another. The individual components need not be coupled together. The individual components may be spaced evenly or unevenly apart from one another.

In some embodiments, for example, where a volume of cementitious material which will surround a corresponding portion of frame 18 is small (e.g. around a utility outlet, a HVAC outlet, an embedded feature, etc.), mesh 23 may comprise a single individual component that is shaped into a desired cross-section. In such embodiments mesh 23 may comprise a single shaped (e.g. generally J-shaped, generally L-shaped, etc.) metal wire, fiber and/or the like.

Figure 27:
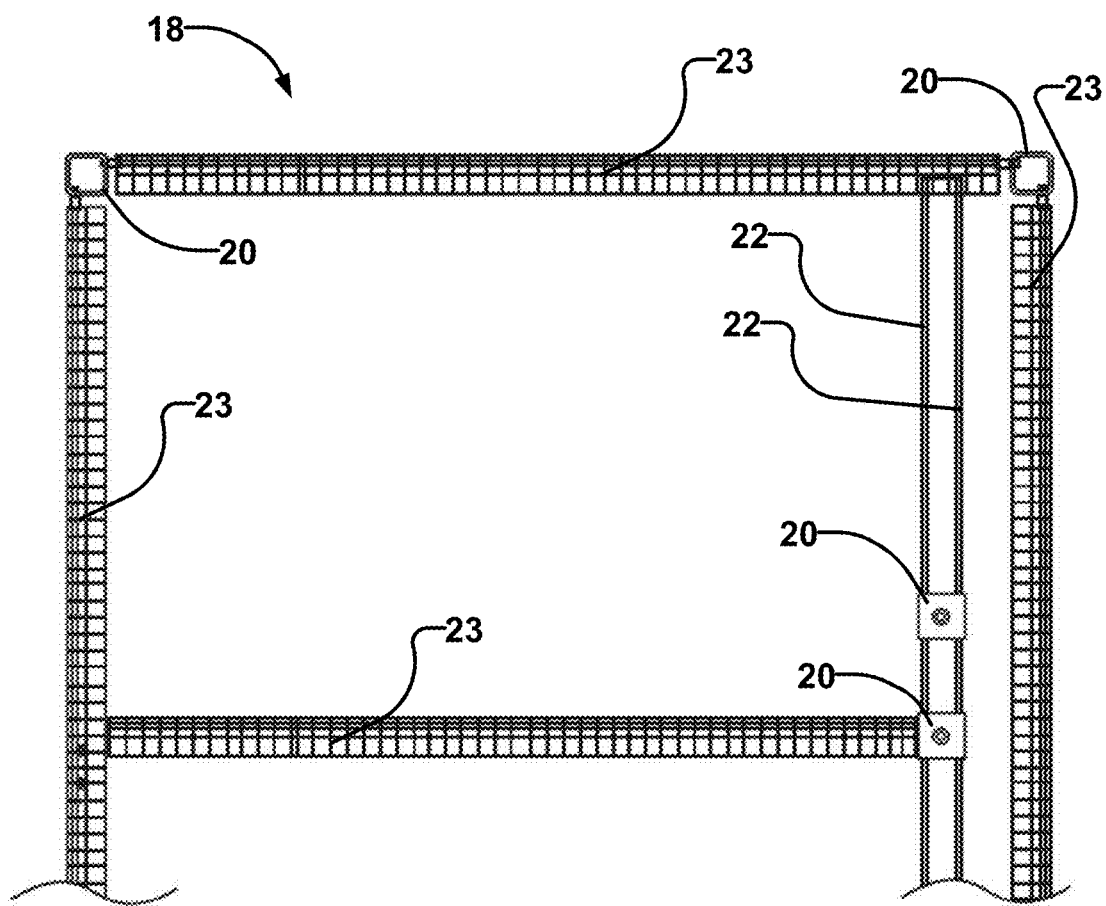
FIG. 27 is a top plan view of a frame according to an example embodiment of the invention.

FIG. 27 is an example top plan view of mesh 23 wrapped around portions or sections of frame 18 (e.g. around elements of reinforcing structure 22 of frame 18). As shown in FIG. 27, mesh 23 may wrap around only some sections or portions of frame 18. In some embodiments some sections or portions of frame 18 may not be embedded in cementitious material, may not require the additional strength provided by mesh 23, etc. In some embodiments leaving sections or portions of frame 18 exposed may assist with coupling such panel to adjacent panels (e.g. a coupling between a roof and wall panel, etc.). In some embodiments omitting mesh 23 from some sections or portions of frame 18 advantageously reduces weight of panel 10, reduces a thickness of panel 10, reduces cost of panel 10, etc.

Figure 28A:
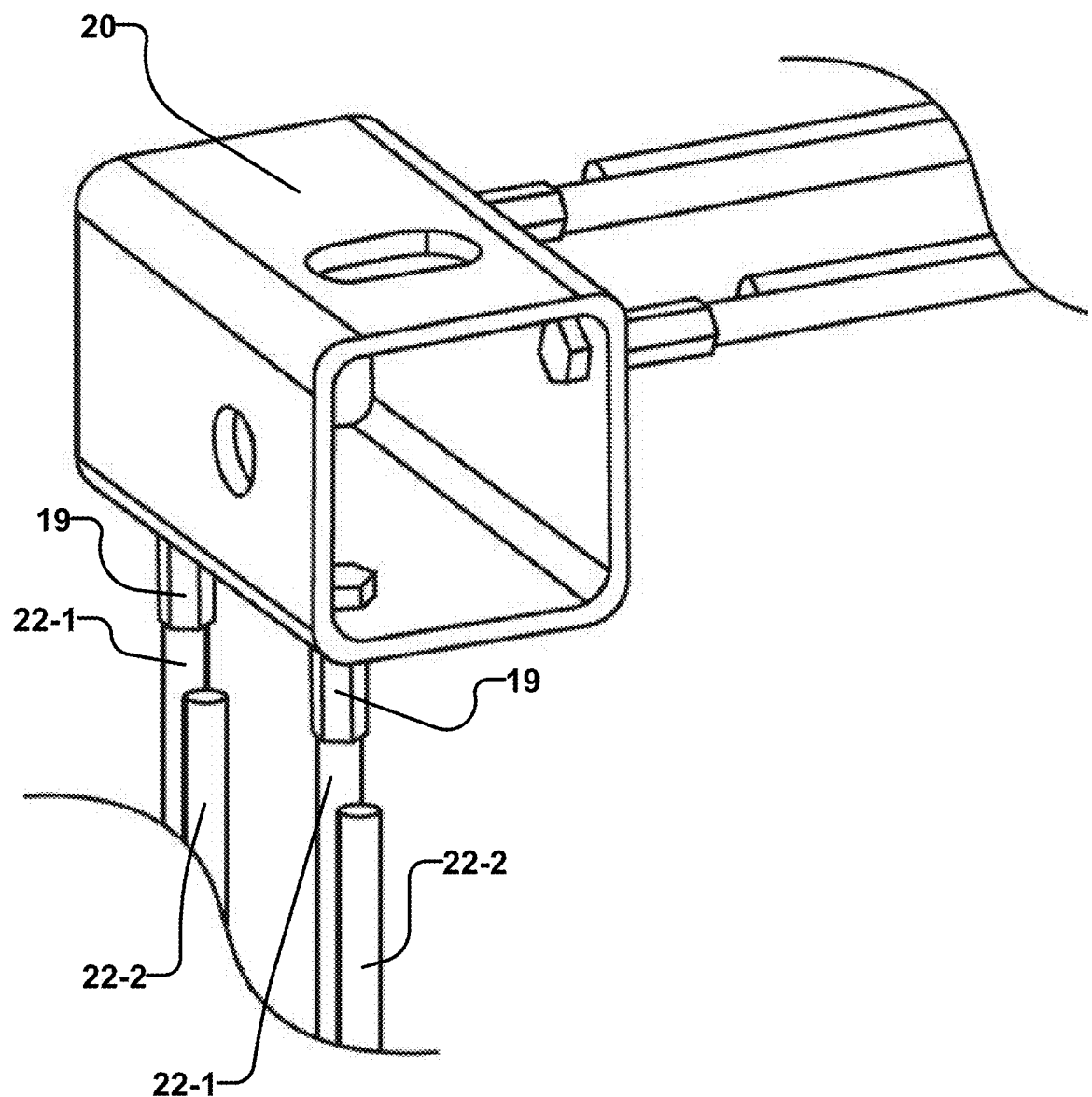
FIGS. 28A and 28B are perspective views of a connector according to an example embodiment of the invention.
Figure 28B:
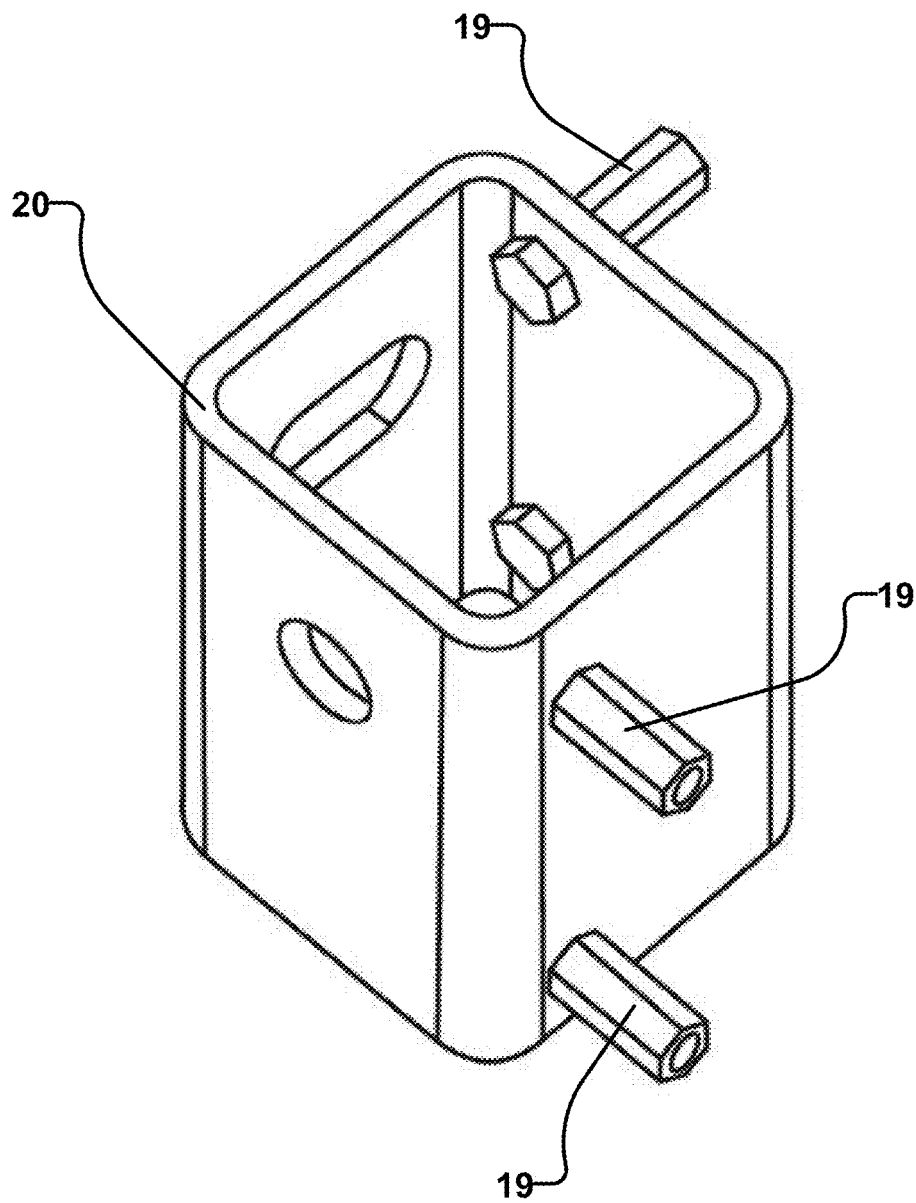

In some embodiments a first pair of elements of reinforcing structure 22-1 extends outwards from a face of connector 20 as shown in FIG. 28A. As described herein, elements of reinforcing structure 22 may be fastened (e.g. elements of reinforcing structure 22 may comprise threaded ends), welded, friction fitted, push fitted, and/or the like to connector 20. An example connector 20 comprising receiving nuts 19 configured to receive elements of reinforcing structure 22 is shown in FIG. 28B. Receiving nuts 19 may be fastened to connector 20 and may comprise threaded cavities shaped to receive threaded ends of elements of reinforcing structure 22.

A second pair of elements of reinforcing structure 22-2 may extend from a face of an adjacent connector 20 (not shown). Mesh 23 may couple reinforcing structures 22-1 and 22-2 together. For example, reinforcing structures 22-1 and 22-2 may extend adjacent one another such that mesh 23 can be at least partially wrapped around at least one element of reinforcing structure 22-1 and at least one element of reinforcing structure 22-2 to secure reinforcing structures 22-1 relative to reinforcing structures 22-2 or vice versa (see e.g. FIGS. 23 and 24).

In some embodiments panel 10 does not comprise a connector 20 in all corners. In some embodiments mesh 23 extends between two edges of panel 10 (e.g. mesh 23 extends through a corner of panel 10). In some embodiments mesh 23 surrounds elements of reinforcing structure 22 of frame 18 from one corner of panel 10 to an adjacent corner 10 (e.g. panel 10 does not comprise connectors 20 in at least two adjacent corners). Having mesh 23 in a corner of panel 10 may increase the strength of the corner (e.g. compressive, shear and/or tensile strength), reduce the likelihood of the corner being damaged during transportation of panel 10, etc.

Figure 10A:
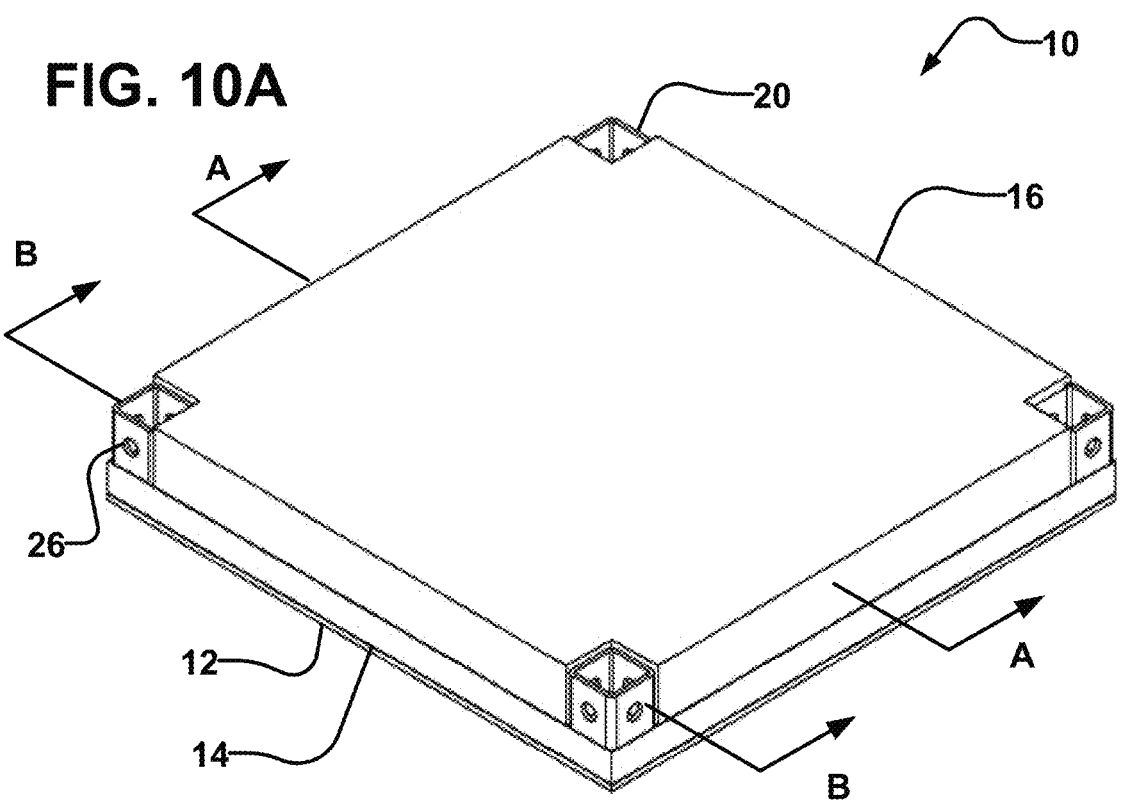
FIG. 10A is an isometric view of part of a Structural Insulated Panel (SIP) contracted in the longitudinal and lateral dimensions to compactly illustrate a reinforcing frame embedded around an insulative core.
Figure 10B:
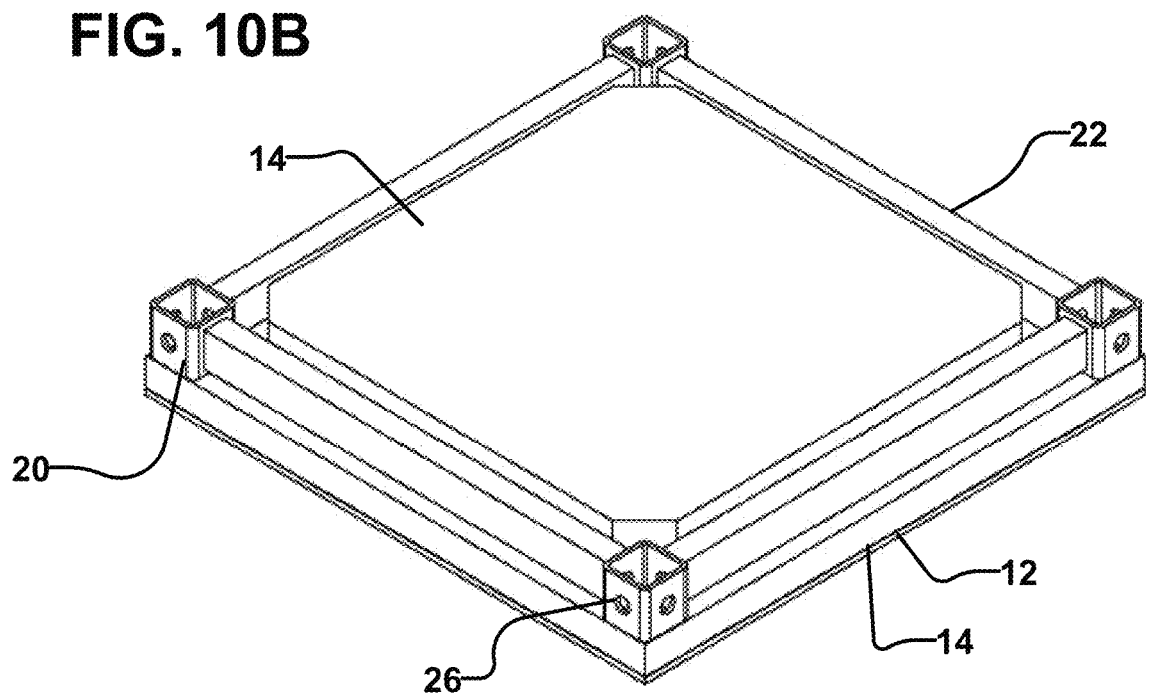
FIG. 10B is an isometric view of the SIP of FIG. 10A without a second structural layer.
Figure 11A:
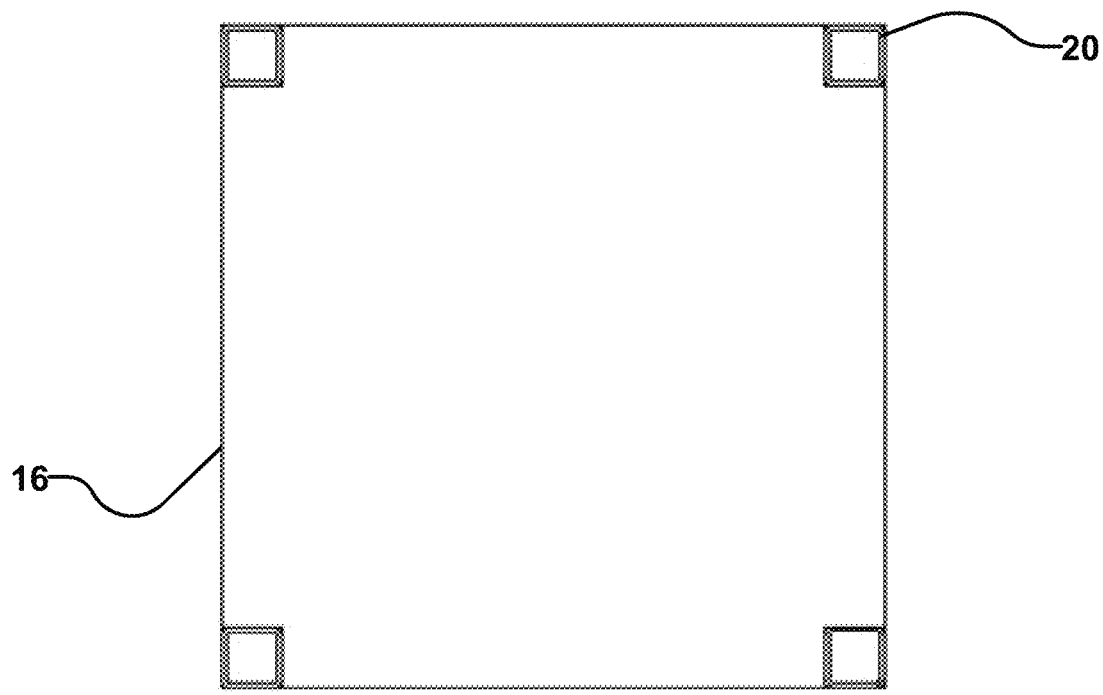
FIG. 11A is a top view of the contracted SIP of FIG. 10A.
Figure 11B:
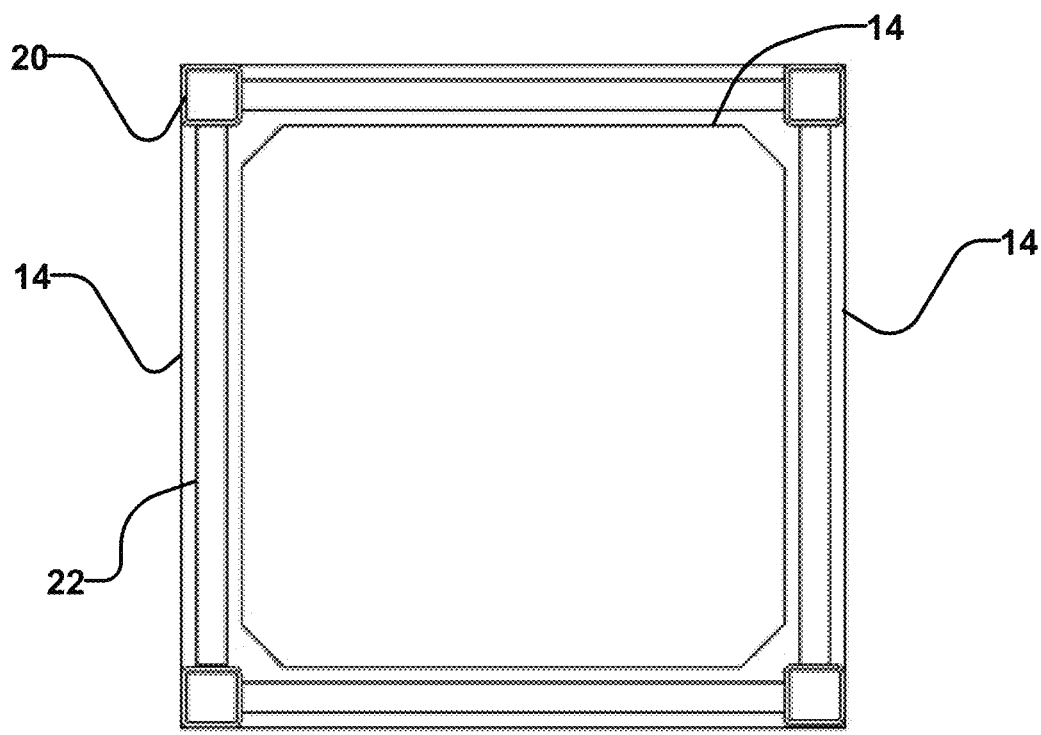
FIG. 11B is a top view of the contracted SIP of FIG. 10B.
Figure 12:
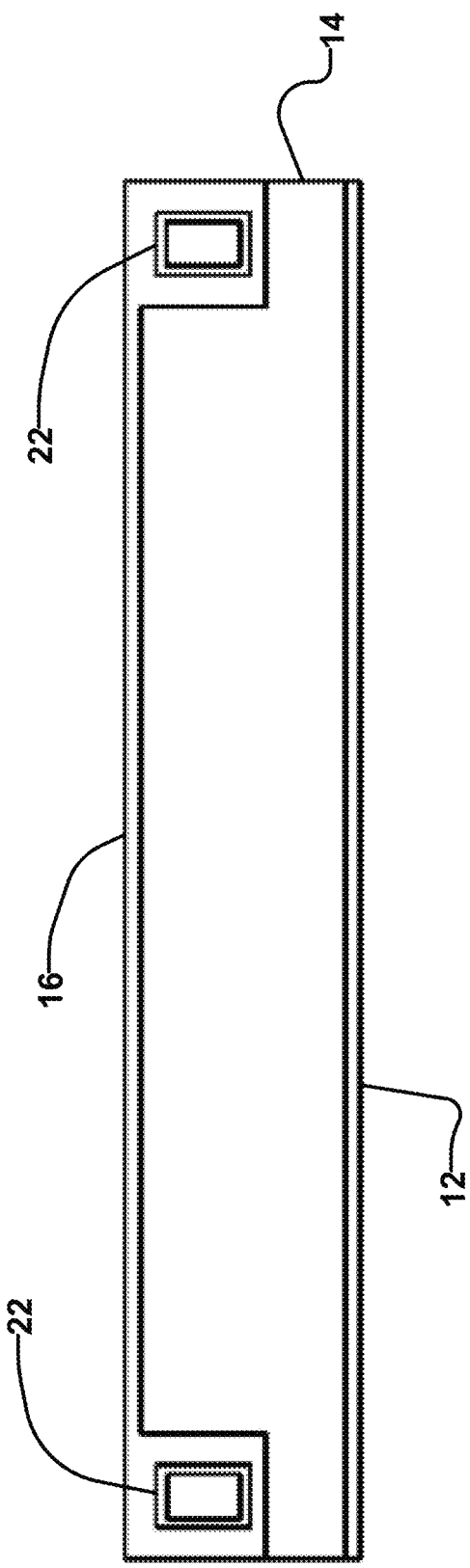
FIG. 12 is a cross-sectional view of the contracted SIP of FIG. 10A taken through the line A-A.
Figure 13:
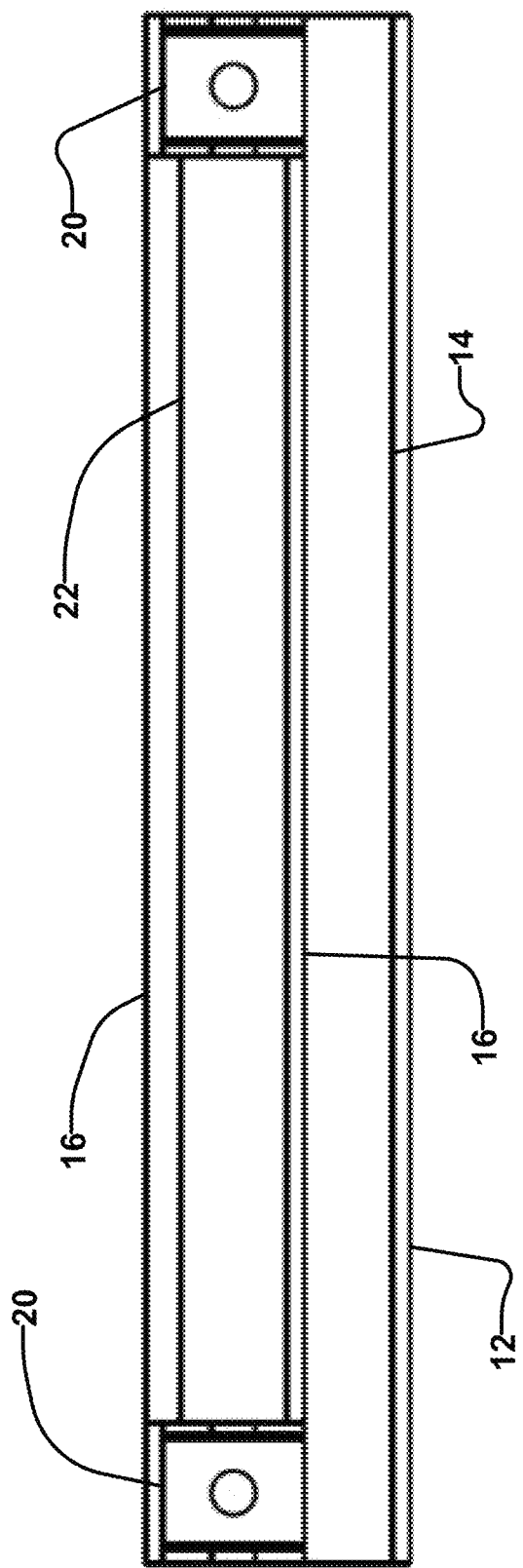
FIG. 13 is a cross-sectional view of the contracted SIP of FIG. 10A taken through the line B-B.

A suitably constructed connector 20, such as a connector with an HSS body, may add to the resilience of the panel during seismic events and other high force occurrences. Such connectors 20, in combination with a suitably constructed reinforcement structure 22, such as one also comprising HSS members bridging between connectors 20, may allow reinforcing frame 18 to contribute substantial structural strength to panel 10 to withstand axial, shear and transverse forces. In some embodiments in which reinforcement structure 22 comprise a structural steel body, reinforcement structure 22 may be welded to HSS connectors 20, as illustrated in FIGS. 8, 10A and 10B.

Connectors 20 may be used to connect adjacent panels or may be used adjacent panels in a structure and may also be used to connect panels to adjacent non-panel structures. Some possible types of connections enabled by a reinforcing frame 18 with connectors 20 may include wall panels to other wall panels, wall panels to floor panels, wall panels to roof panels, roof panels to roof panels, floor panels to floor panels, floor panels to foundation panels, floor panels to a non-panel foundation, and foundation panels to foundation panels. Reinforcing frame 18 and connectors 20 may be used with other types and sub-types of panels 10. Suitable modifications may be made to reinforcing frame 18 and connectors 20 to adapt the structure and connections to the type or sub-type of panel 10.

Figure 4:
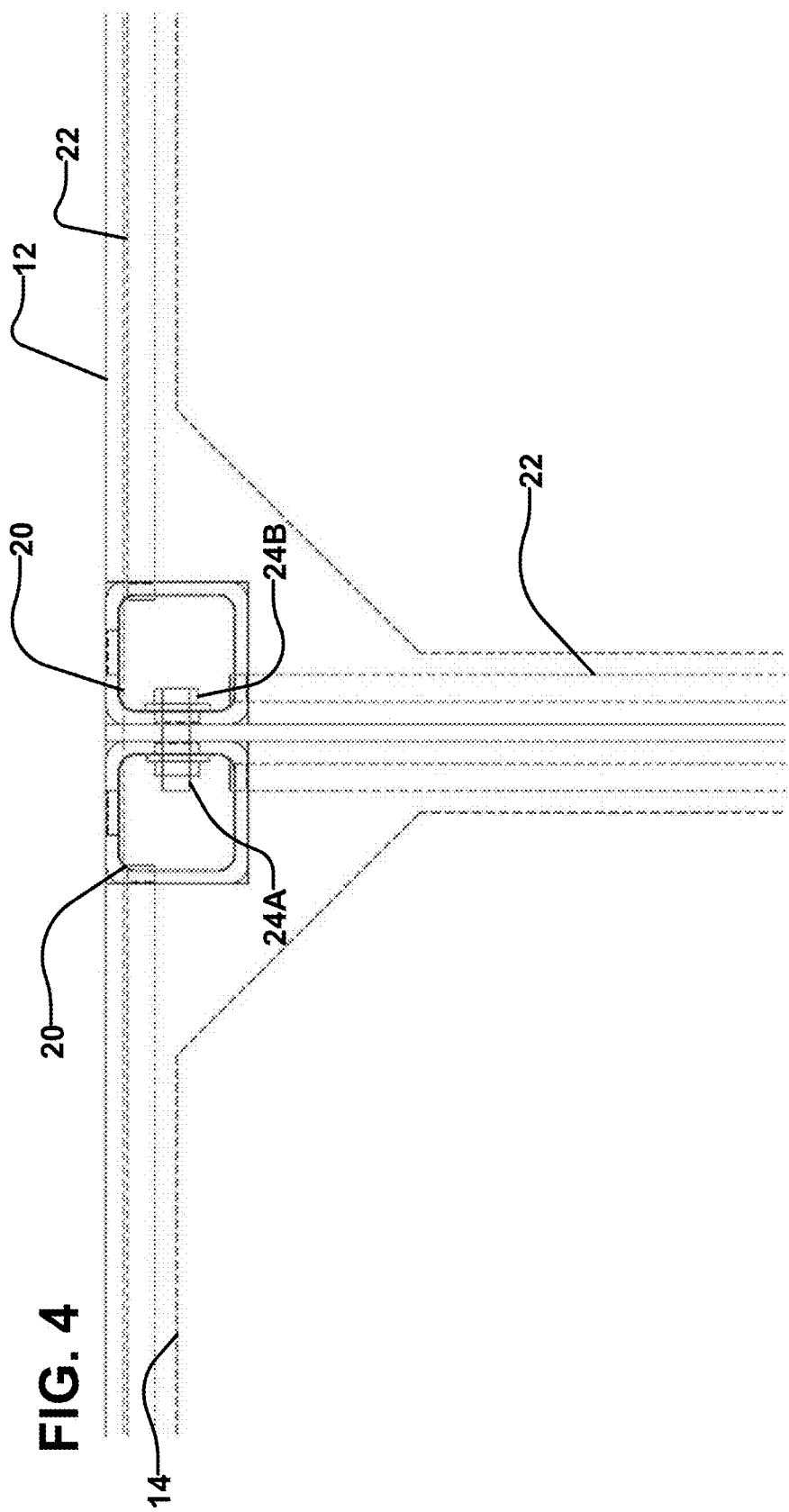
FIG. 4 is a top view of two connected panels according to the embodiment illustrated in FIG. 3B.
Figure 5A:
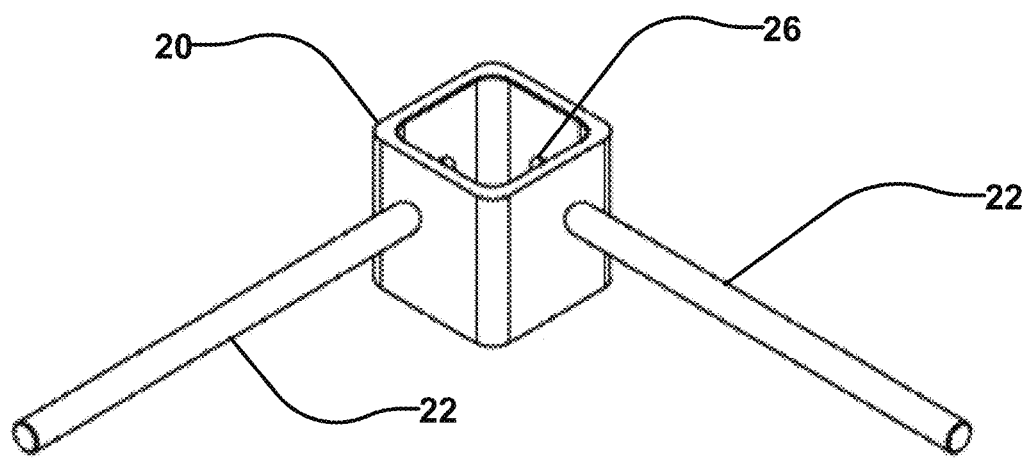
FIG. 5A is an isometric view of a connector and singular reinforcement structures according to an embodiment of the invention.
Figure 5B:
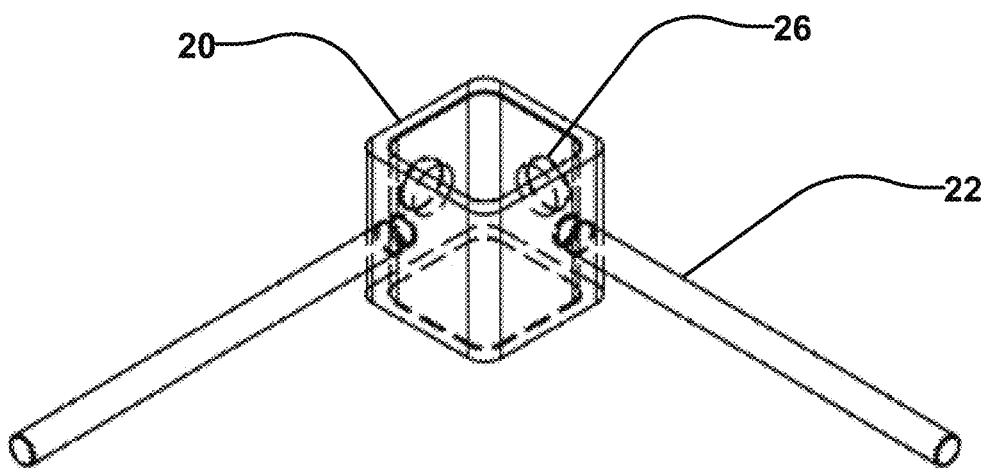
FIG. 5B is an isometric view of the connector and singular reinforcement structures of FIG. 5A in which the connector is shown partially transparent.
Figure 5C:
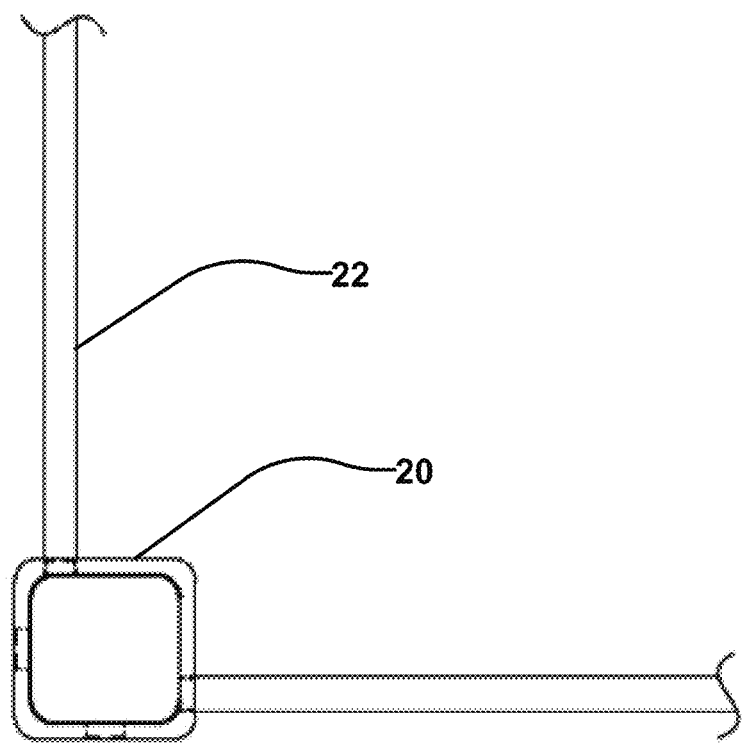
FIG. 5C is a plan view of the connector and singular reinforcement structures of FIG. 5A.
Figure 5D:
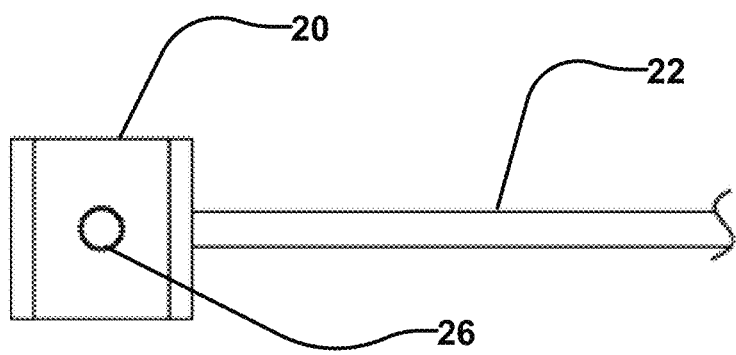
FIG. 5D is a side view of the connector and singular reinforcement structures of FIG. 5A.

Some exemplary types of connections are illustrated in various levels of detail in FIGS. 4, 8, 9A-9F, 14A through 17F, and 18B-18F. Referring to FIG. 4, a bolt 24A threads through connector 20 of a first panel into a nut 24B in a second connector 20 of a second panel. In a connection between two adjacent panels there may be multiple bolts or screws in a single connector-connector joint, and there may be multiple connectors 20. Connectors 20 may be at corners of panel 10 and distributed at other points along adjoining edges of panels 10.

Figure 9A:
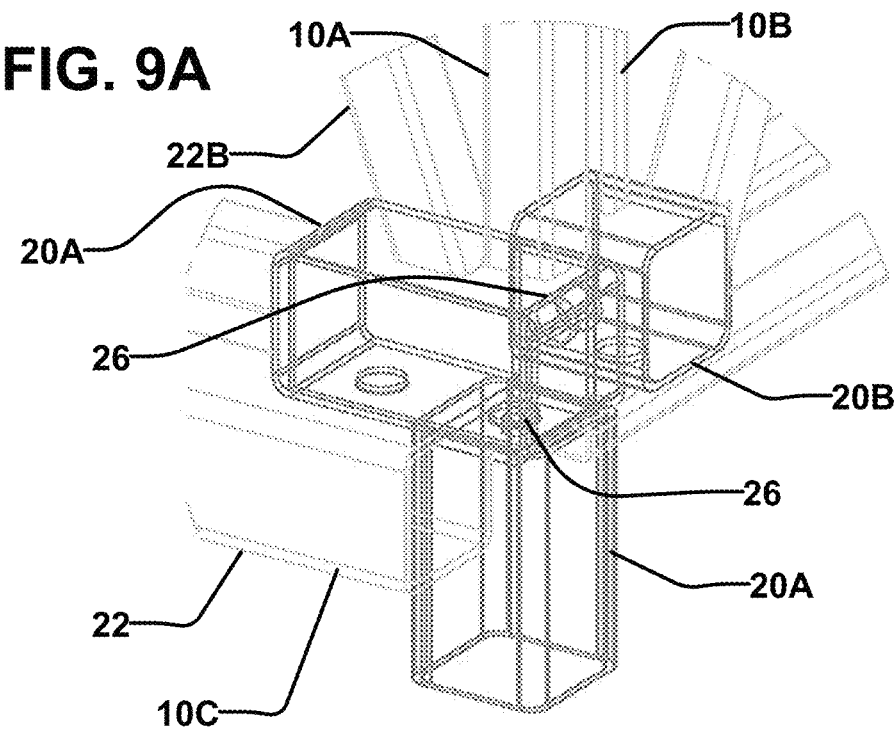
FIG. 9A is a magnified view of detail A in FIG. 8.
Figure 9B:
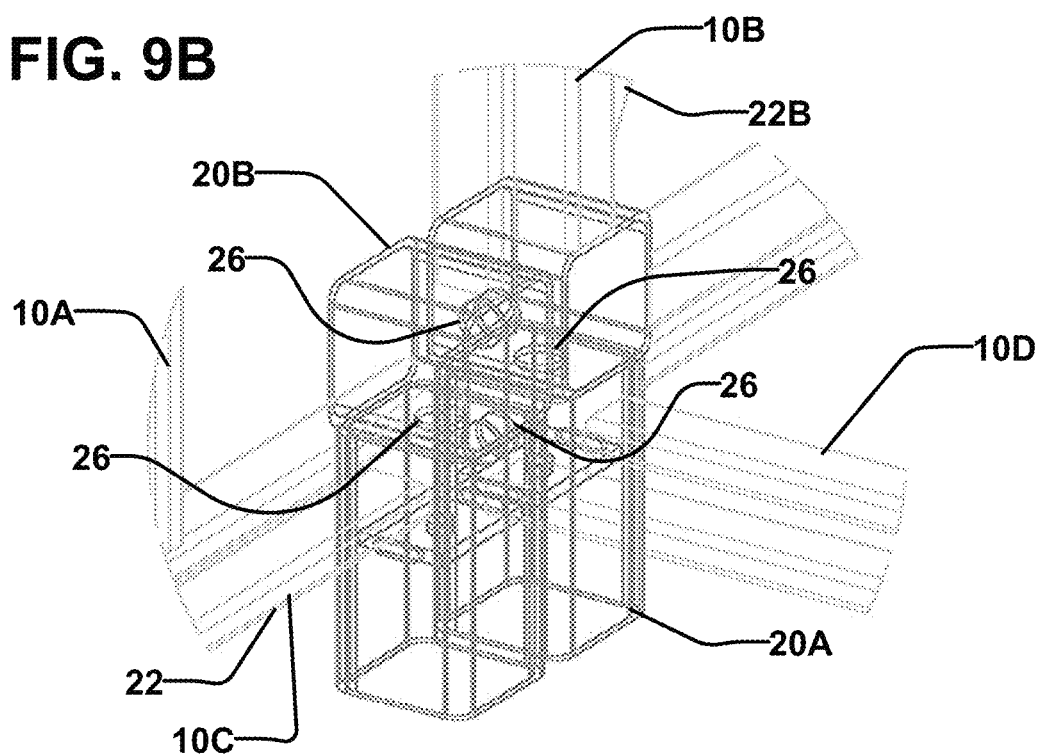
FIG. 9B is a magnified view of detail B in FIG. 8.
Figure 9C:
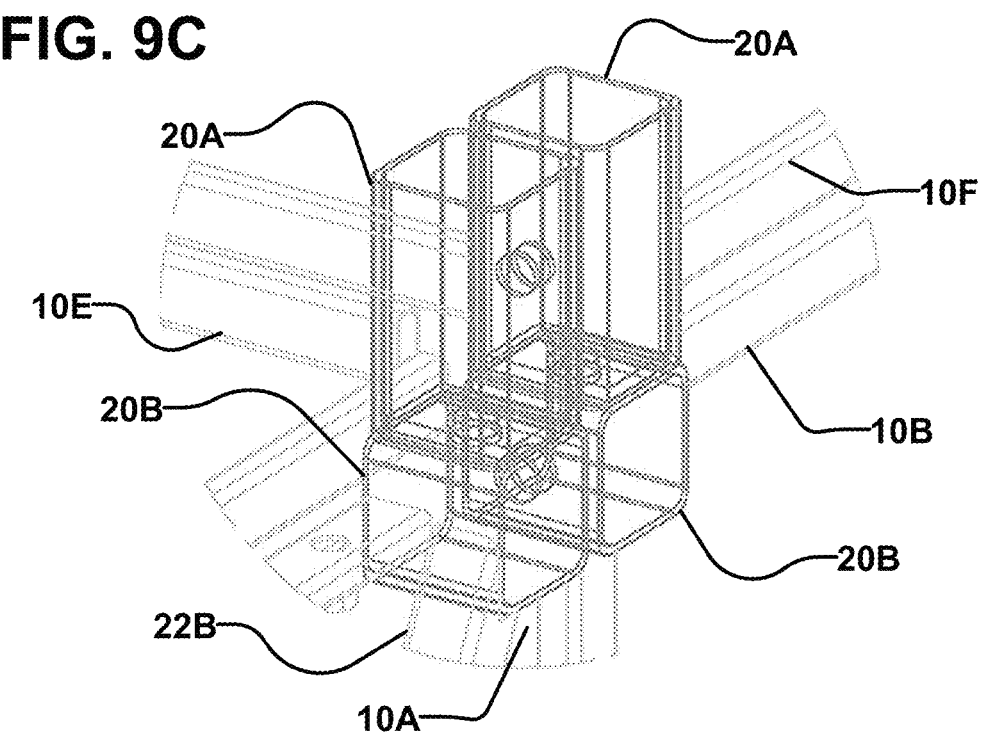
FIG. 9C is a magnified view of detail C in FIG. 8.
Figure 9D:
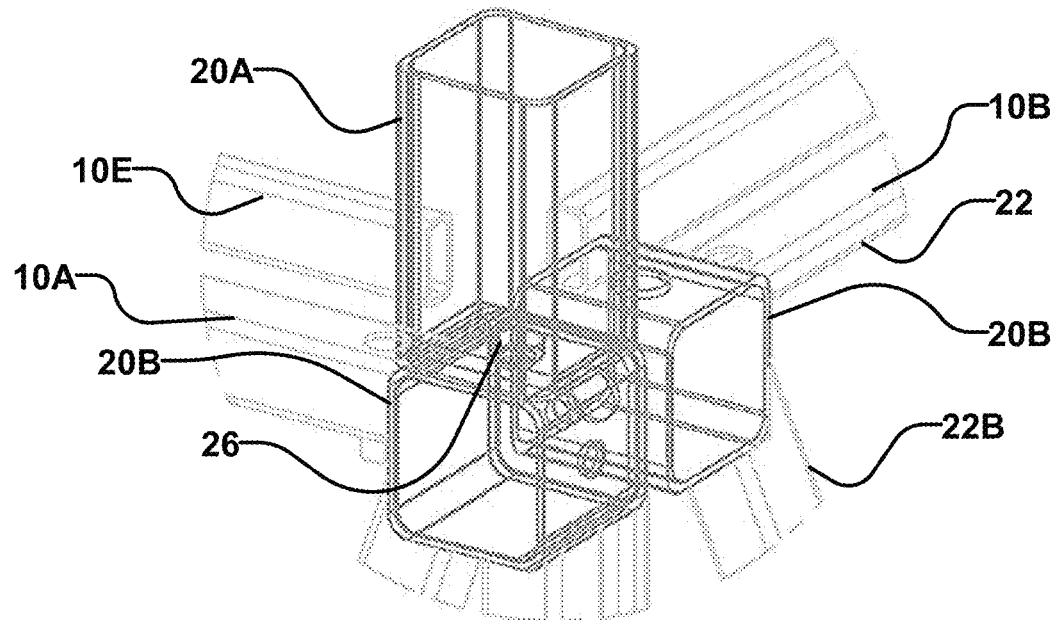
FIG. 9D is a magnified view of detail D in FIG. 8.
Figure 9E:
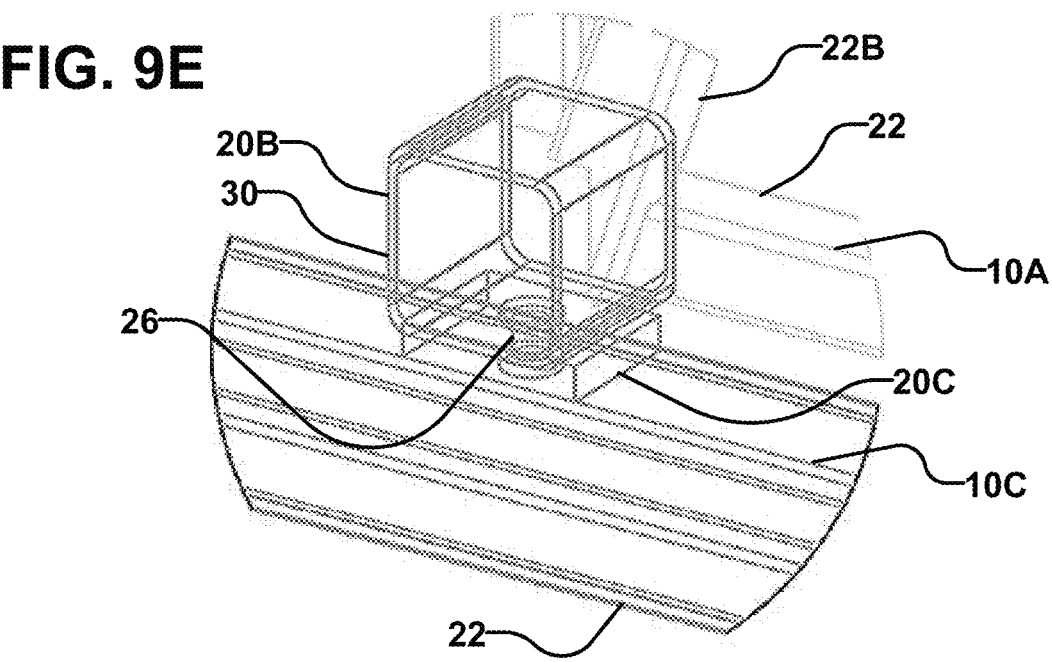
FIG. 9E is a magnified view of detail E in FIG. 8.
Figure 9F:
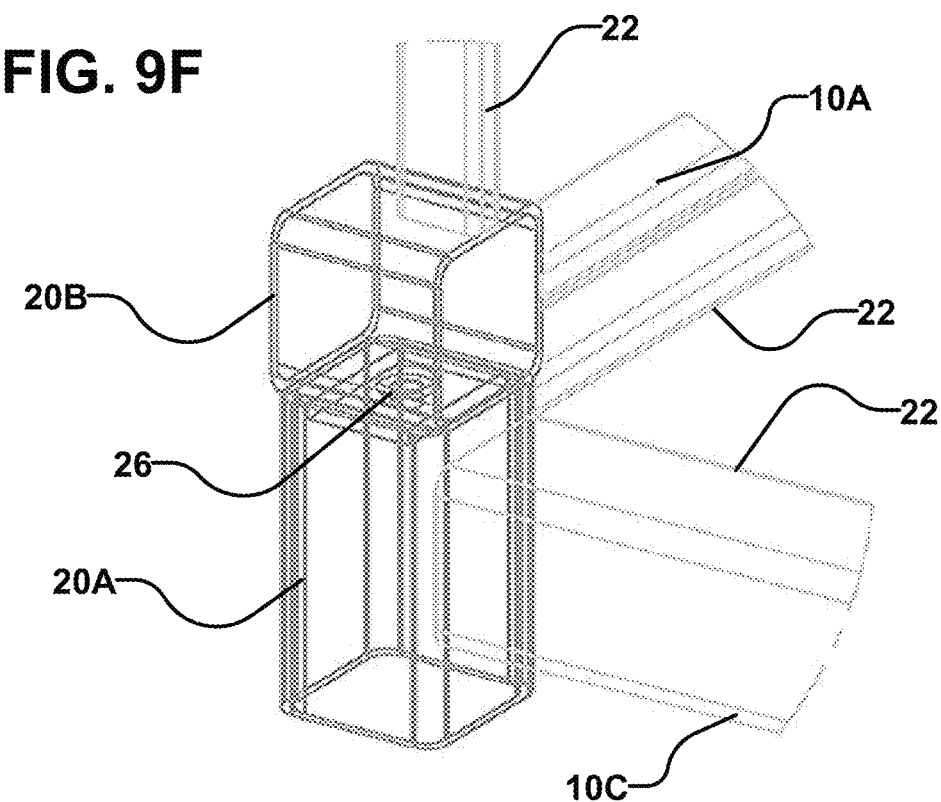
FIG. 9F is a magnified view of detail F in FIG. 8.

In FIG. 9A an example connection between two adjacent wall panels 10A, 10B and a floor panel 10C, meeting at a corner of a room or a similar space is illustrated. Holes 26 show where bolts or screws, or other suitable fasteners, may be inserted to join adjacent connectors 20. FIG. 9A also illustrates how connectors 20 of adjacent panels may be configured with different shapes or dimensions. For example, connectors 20A are longer in one of their dimensions than connector 20B. FIG. 9B illustrates a joint between two floor panels 10C, 10D and two wall panels 10A, 10B. FIG. 9C illustrates a joint between two wall panels 10A, 10B and two roof panels 10E, 10F. FIG. 9D illustrates a joint between two wall panels 10A, 10B and a roof panel 10E at a corner of a room or a similar space. FIG. 9E illustrates a joint between a single wall panel 10A and a single floor panel 10C, in which the joint occurs at a location a distance from a corner of the floor panel. In this variation, connector 20C of the floor panel is smaller and has only a limited projection out of reinforcing structure 22 of the floor panel. Access to connector 20B to install a fastener of the wall panel is available through at least one open face 30 of connector 20B. Finally, FIG. 9F illustrates a connection between a single wall panel 10A and a single floor panel 10C.

Figure 14A:
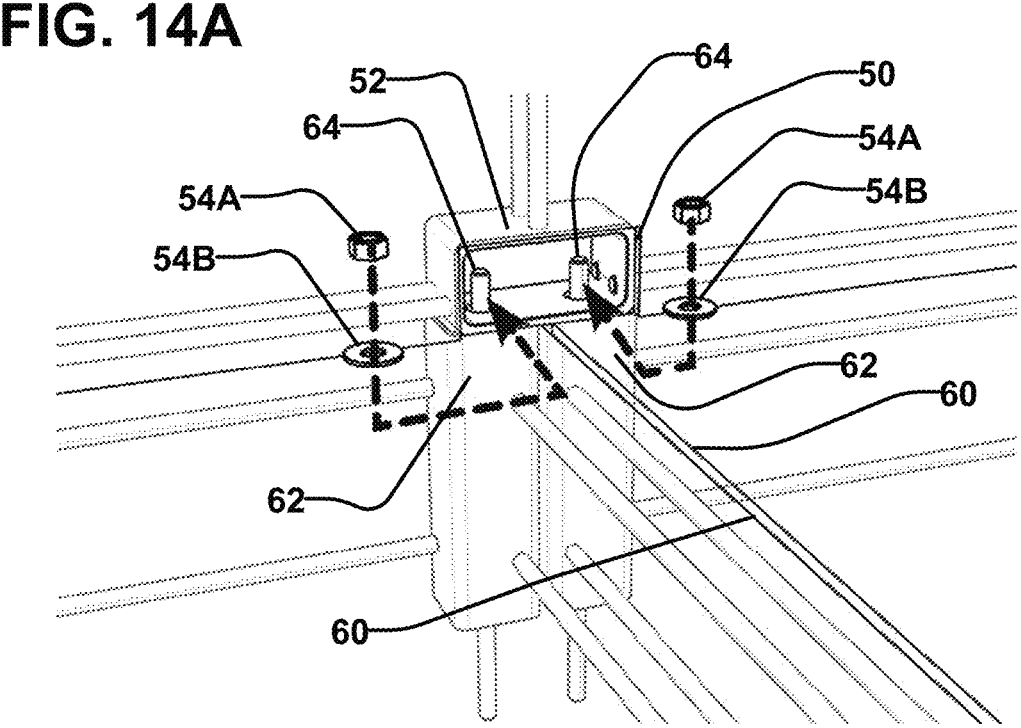
FIGS. 14A through 14J are perspective views of exemplary connections between one or more wall panels and one or more floor panels.
Figure 14B:
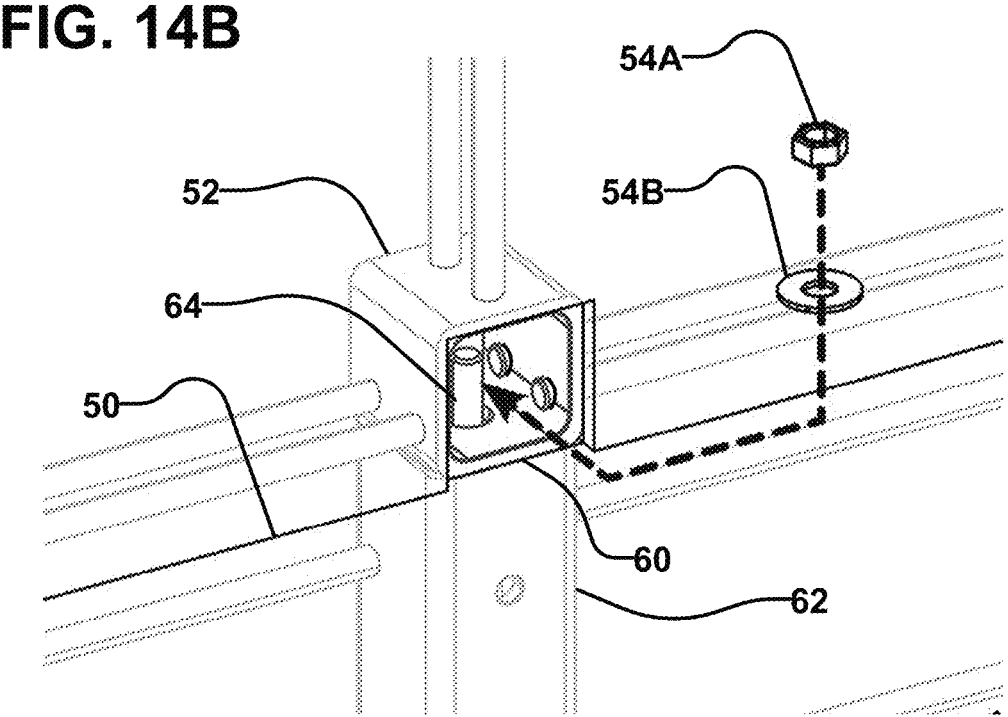

FIGS. 14A through 14J illustrate various examples of wall to floor type connections between one or more wall panels 50 and one or more floor panels 60. FIG. 14A illustrates a connection between a single wall panel 50 bridging two floor panels 60. Threaded rods 64 extending up from a pair of floor connectors 62 pass into wall connector 52. Nuts 54A and washers 54B are installed on rods 64 to mechanically attach each of floor panels 60 to wall panel 50. In FIG. 14B there is shown a connection between a single wall panel 50 and a single floor panel 60. Threaded rod 64 extends up from floor connector 62 pass into wall connector 52. Nut 54A and washer 54B are installed on threaded rod 64 to mechanically attach floor panel 60 to wall panel 50.

Figure 14C:
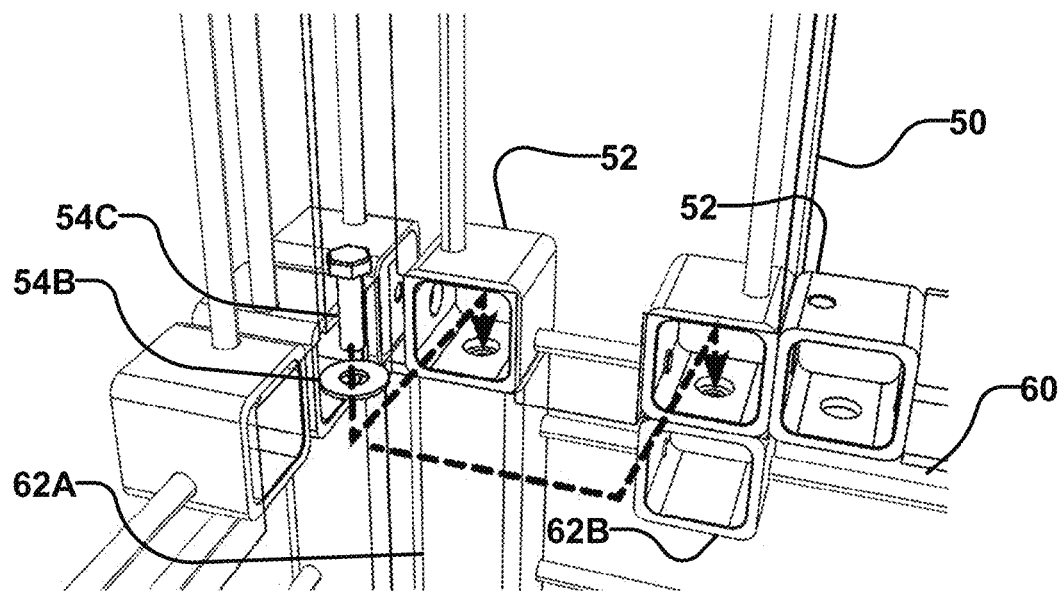
Figure 14D:
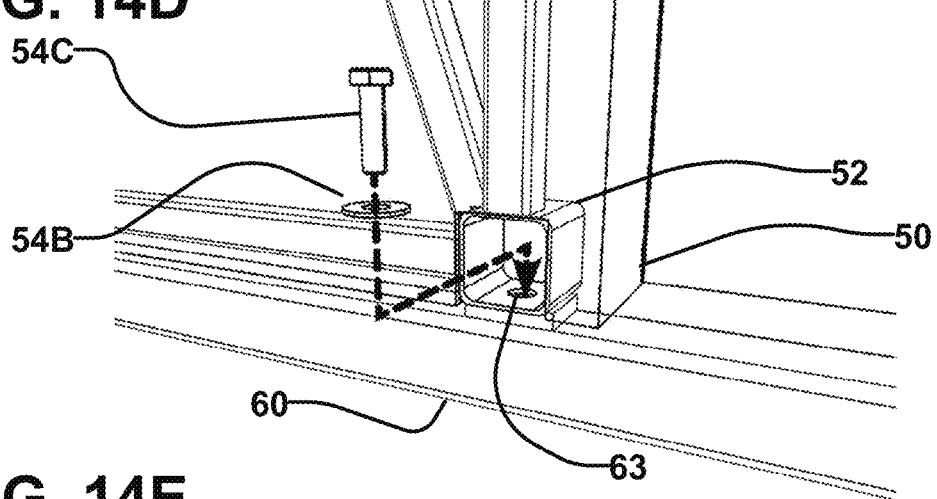
Figure 14E:
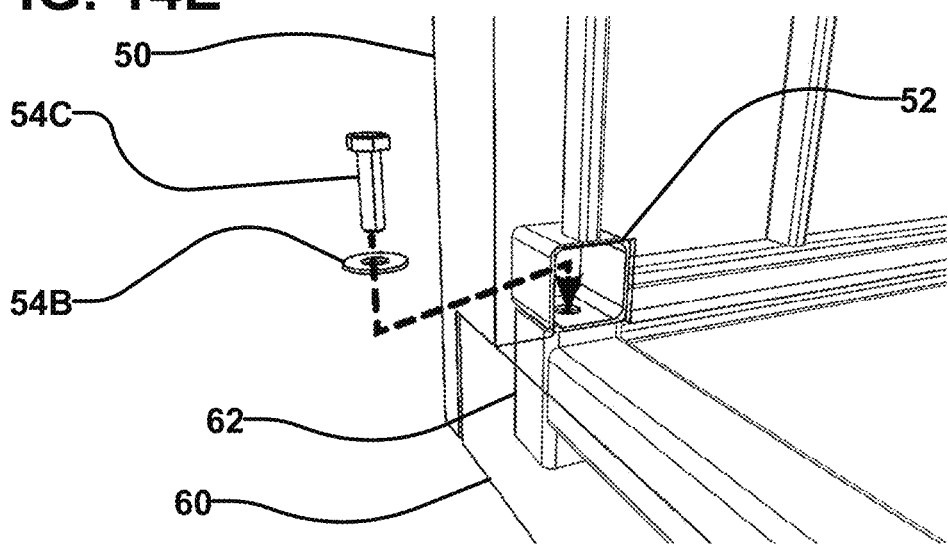

FIG. 14C illustrates a further example of a wall to floor connection near a corner. In this wall to floor connection, bolts 54C extend down through wall connectors 52 into adjacent floor connectors 62A and 62B to secure wall panel 50 to floor panel 60. In this example, it is also illustrated how one floor connector 62A may extend through a greater depth of floor panel 60 than another floor connector 62B. FIG. 14D illustrates a further wall to floor connection in which bolt 54C passes through washer 54B and extends down through wall connector 52 into floor panel 60. Hole 63 may be threaded to match a thread in bolt 54C to secure wall panel 50 to floor panel 60. FIG. 14E shows a wall to floor connection at a corner. Bolt 54C passes through washer 54B into wall connector 52 and down into floor connector 62 to connect wall panel 50 to floor panel 60.

Figure 14F:
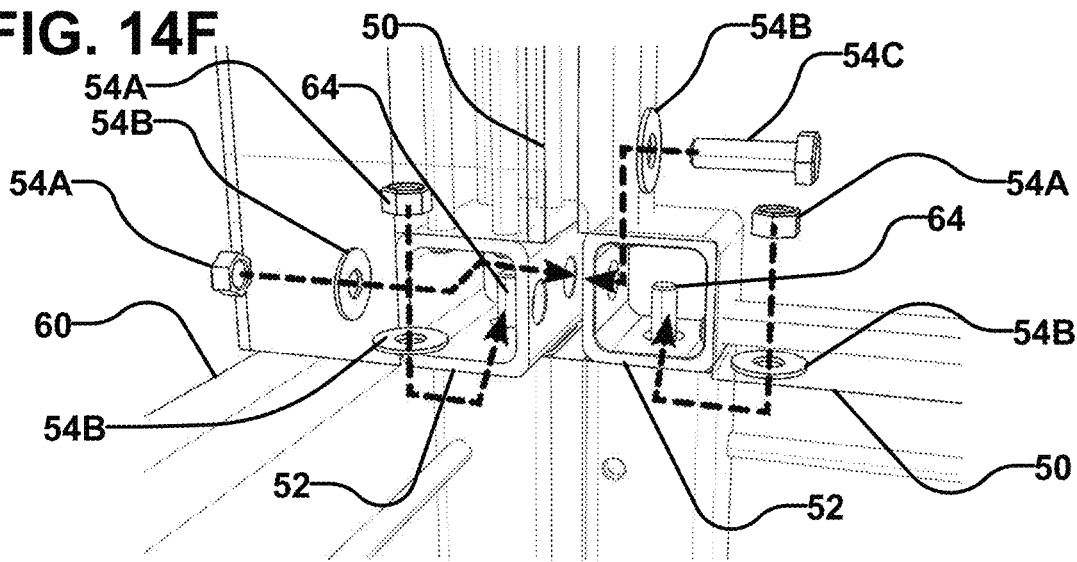
Figure 14G:
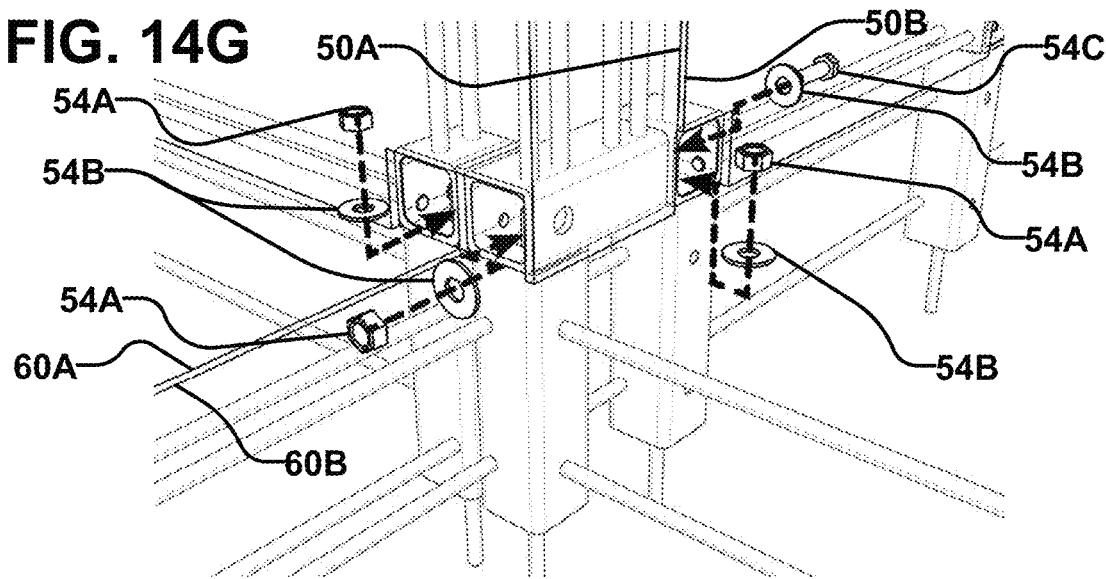
Figure 14H:
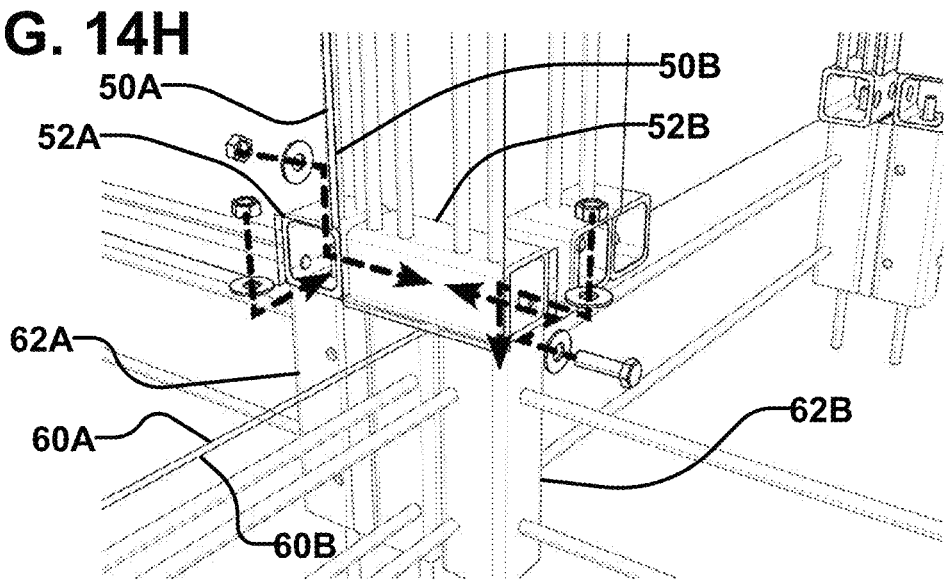

FIG. 14F illustrates an example of connections between two wall panels and one floor panel. Two bolts 64 extend up from floor panel 60 into a wall connector 52 of each wall panel 50 and are secured by nuts 54A and washers 54B. Bolt 54C, washers 54B and nut 54A connect adjacent wall connectors 52 together so that both wall panels 50 are secured together and each wall panel is secured to floor panel 60. FIG. 14G illustrates a connection at a corner between two wall panels 50A and 50B and two floor panels 60A and 60B. Wall panel 50A connects through a wall to wall connection to wall panel 50B. Wall panel 50A and wall panel 50B each secure to floor panel 60B, while only wall panel 50A connects to floor panel 60A. FIG. 14H illustrates a further connection at a corner between two wall panels 50A and 50B and two floor panels 60A and 60B. Wall panel 50A connects through a wall to wall connection to wall panel 50B. Wall panel 50A secures to floor panel 60A, and wall panel 50B connects to floor panel 60B.

Figure 14I:
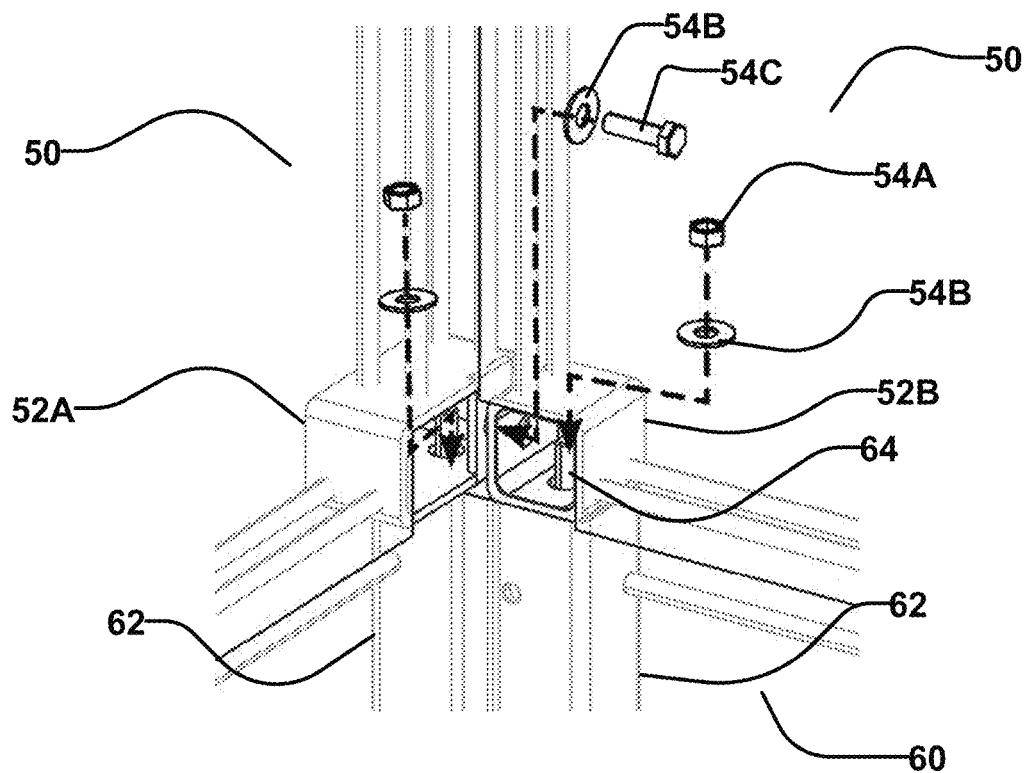
Figure 14J:
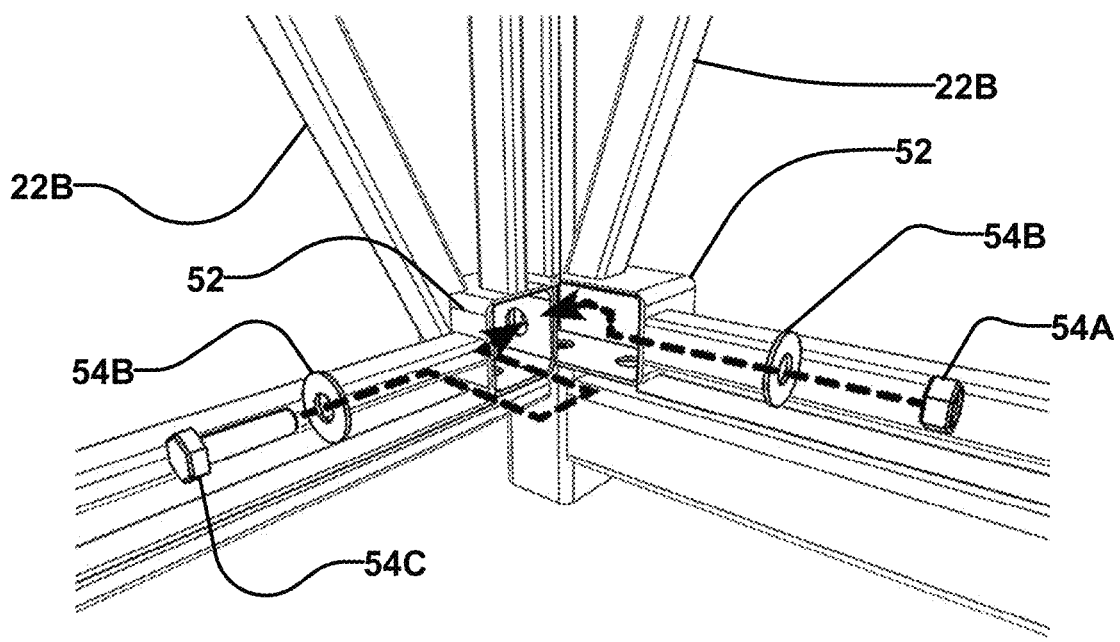

In FIG. 14I there is shown a wall-wall connection and wall-floor connection at a corner. Threaded bolts or rods 64 extend up from a pair of floor connectors 62 and nuts and washers 54 are installed on rods 64 to mechanically attach each of wall panels 50 to floor panel 60. Additionally, bolt 54C and washer 54B are inserted through wall-wall connectors 52A and 52B. An additional nut 54A and washer 54B (not shown) may be installed to secure bolt 54C. Alternatively, the hole in wall connector 52A may be threaded to secure bolt 54C. Such a hole may be drilled or tapped so that a bolt can be threaded into wall-wall connector without requiring a further washer 54B and bolt 54C to be inserted into wall connector 52A. FIG. 14J shows a wall panel to wall panel connection at a floor corner. In FIG. 14J both wall panels exhibit cross-bracing 22B.

Figure 15A:
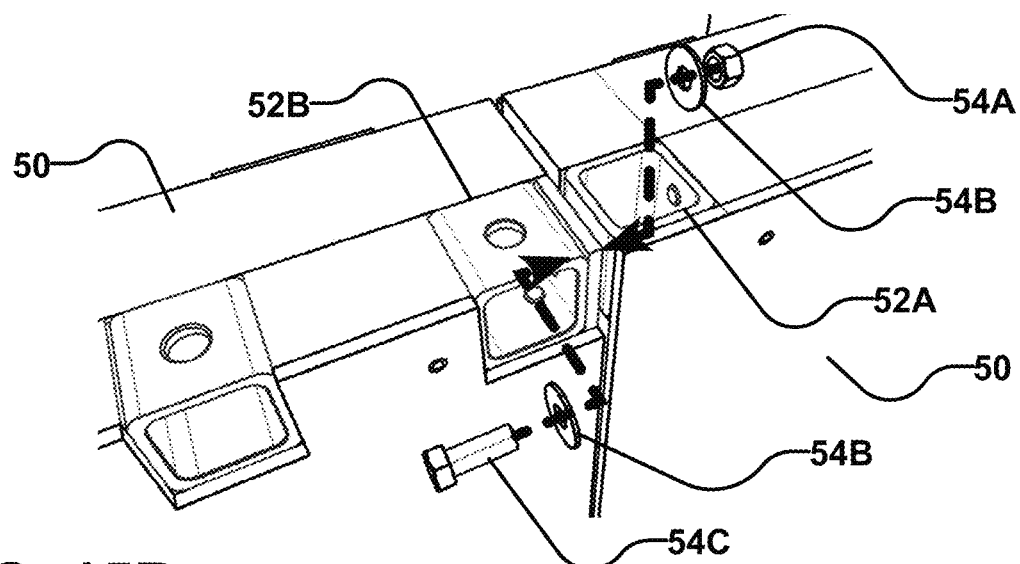
FIGS. 15A through 15E are perspective views of exemplary connections between wall panels.
Figure 15B:
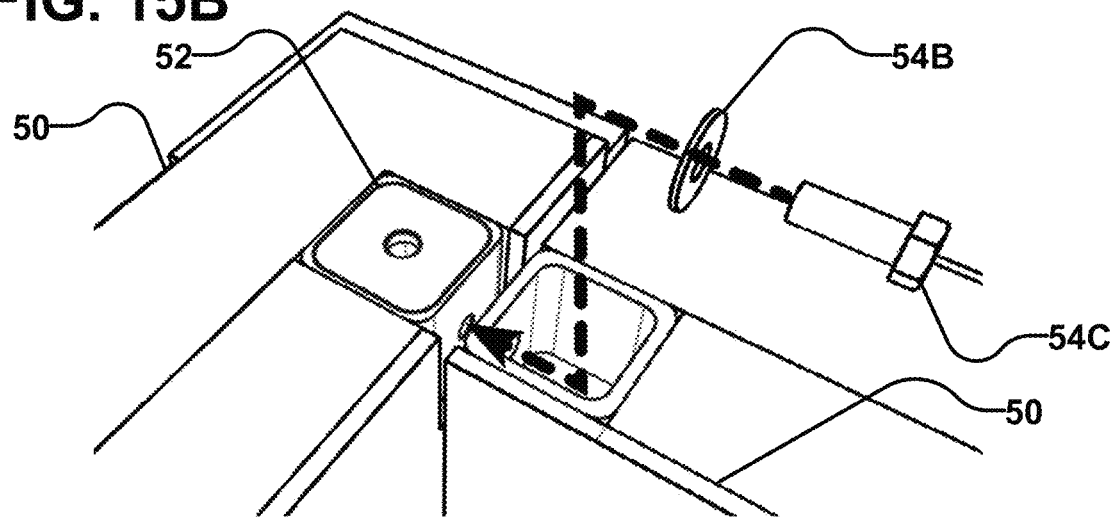
Figure 15C:
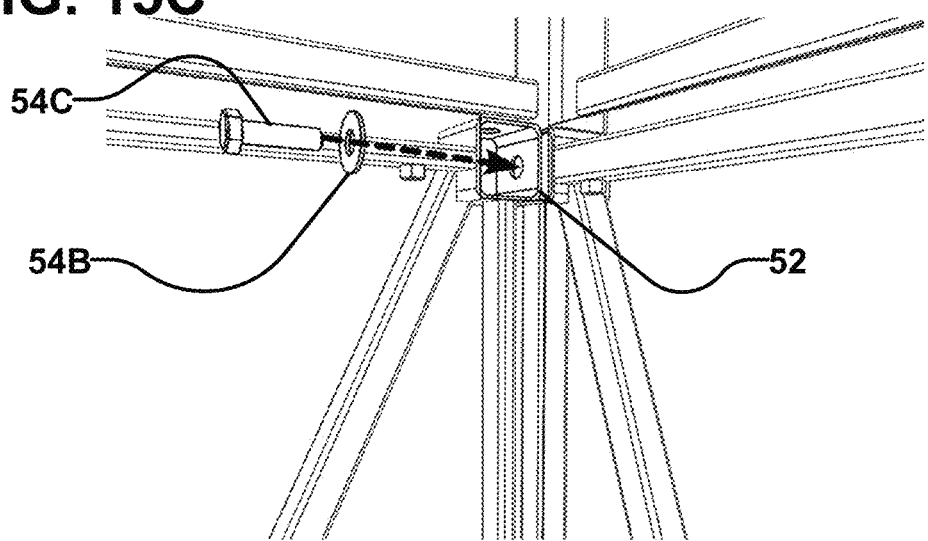

FIGS. 15A through 15C illustrate various wall to wall connections. FIG. 15A illustrates a connection between two wall panels along the tops of the panels. During a constructions process wall panels may be secured together prior to placing further panels, such as roof panels 70, on top. By so doing, it may be possible to access connectors 52A, 52B along the top edge of wall panels 50, as illustrated in FIGS. 15A and 15B. FIG. 15B illustrates a connection along a top edge between two wall panels at a corner. FIG. 15C illustrates a connection between two wall panels at a corner with a roof panel placed on top of the wall panels. In this example, the two wall panels may be secured together through an inward facing open face of connectors 52, as compared to the upward facing open faces of the connectors in FIGS. 15A and 15B.

Figure 15D:
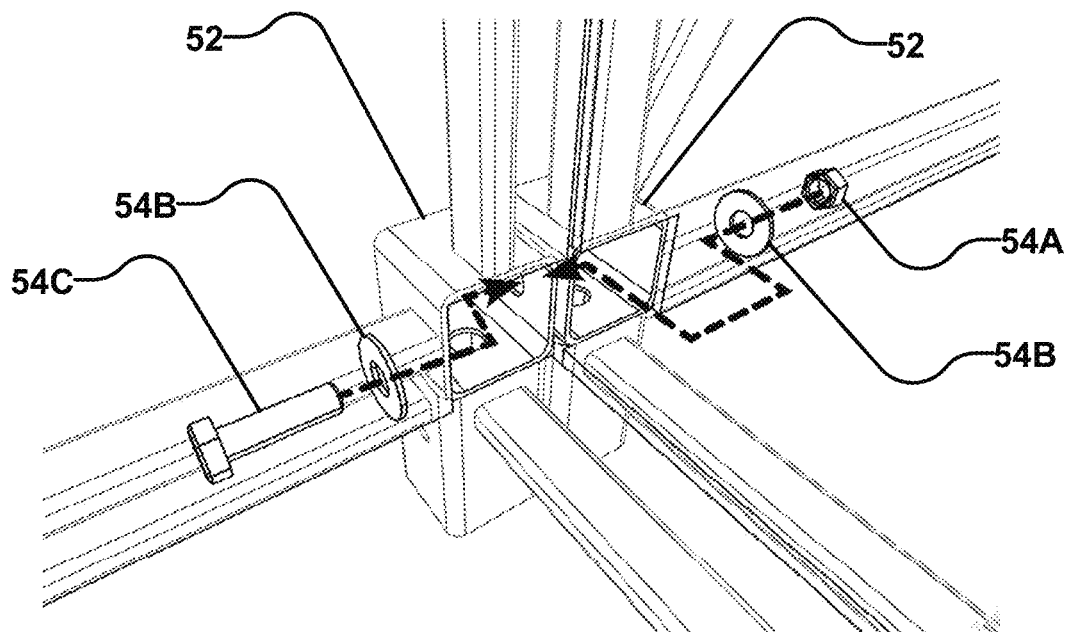
Figure 15E:
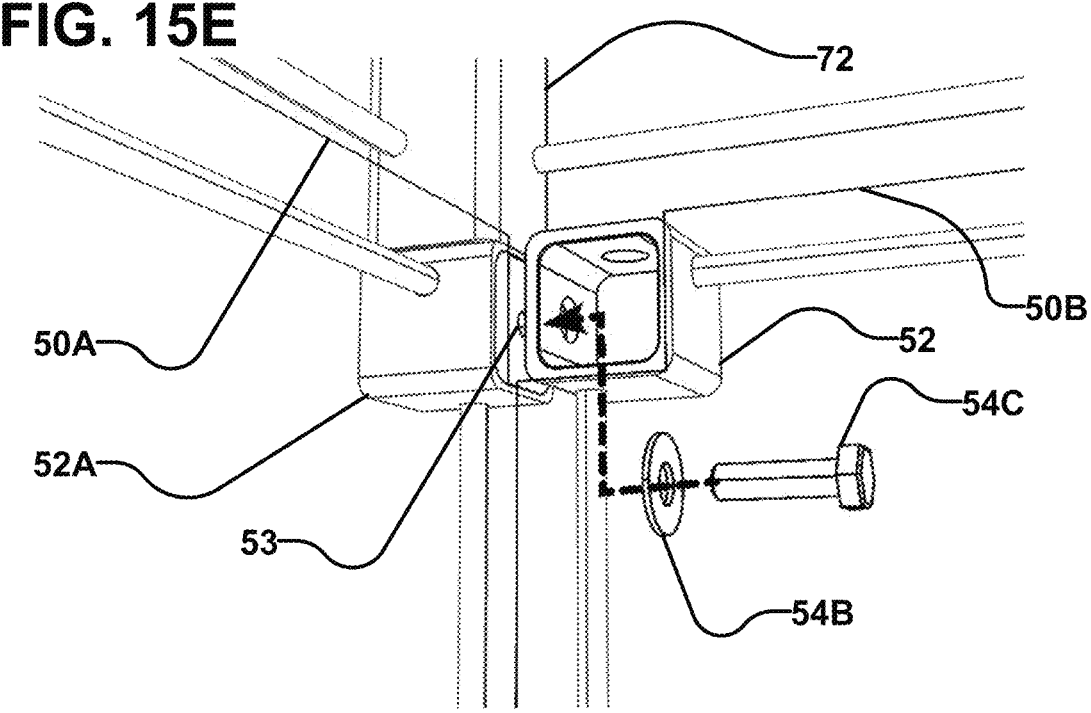

FIG. 15D illustrates a wall to wall connection between two wall panels over two adjoining floor panels. While the wall to floor connections are not illustrated in this figure, each wall panel may be secured to the subjacent floor panel. In FIG. 15E there is illustrated a wall to wall connection at an upper corner between two wall panels. Wall connector 52 is shown here without an open face. Instead, connector hole 53 may be threaded to engage a thread in bolt 54C to secure bolt 54C in connector 52A.

Figure 16A:
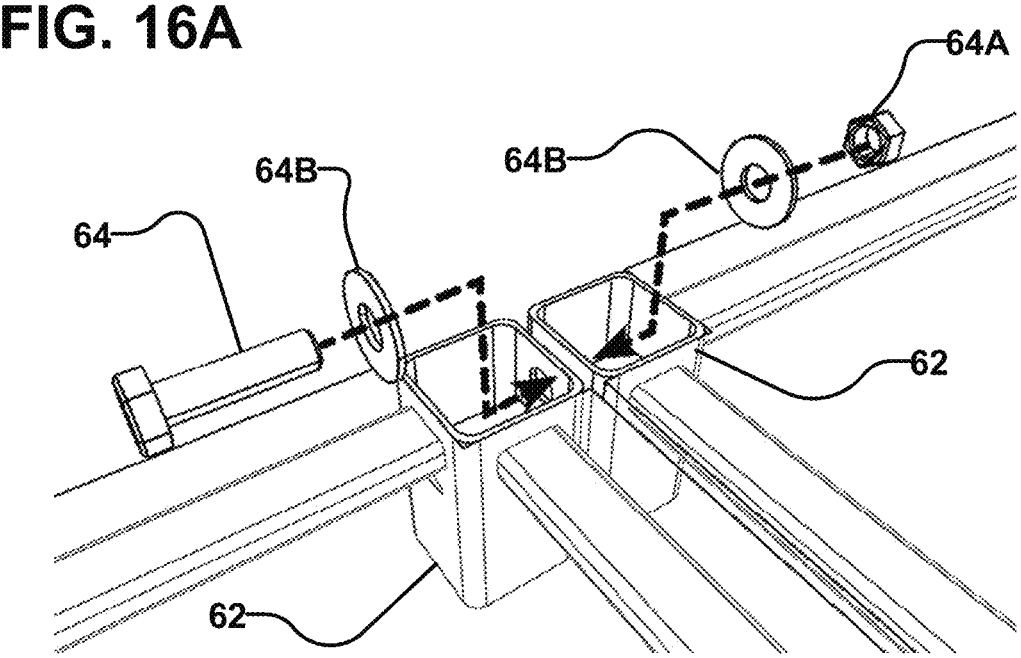
FIGS. 16A through 16D are perspective views of exemplary connections between floor panels and floor panels and between floor panels and foundation components.
Figure 16B:
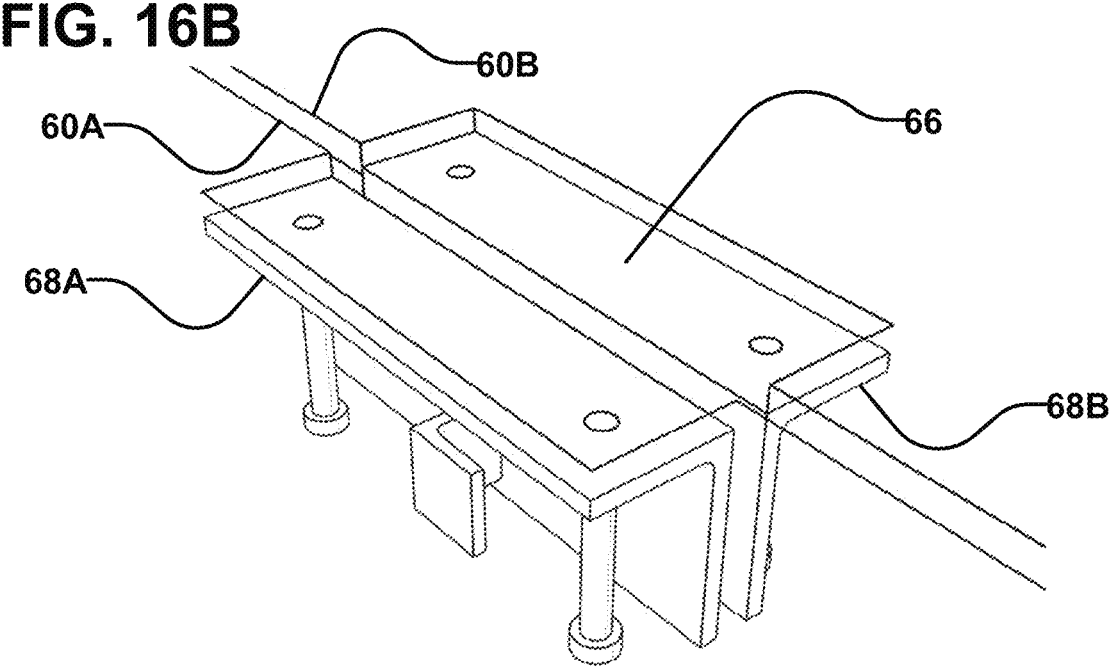

FIGS. 16A through 16D illustrate examples of connection as between floor panels and floor panels and as between floor panels and foundation elements such as stem walls. FIG. 16A illustrates a floor to floor connection along a wall of a structure. FIG. 16B illustrates a welded connection between two adjacent floor panels. A weld plate 66 may be used to connect two adjacent floor panels, 60A, 60B. Weld plate 66 is welded onto weld plate-receiving elements 68A, 68B. Weld plate-receiving elements 68A, 68B may be connected to or continuous with a reinforcing frame of each of floor panels 60A and 60B. In some embodiments, each weld plate-receiving element may be embedded into cementitious material of their corresponding panel, with or without attachment to a reinforcing frame of that panel. Weld plate 66 may be utilized, for example, where a connection is desired between two adjacent floor panels at a point distant from the panel corners. Weld plates may be used similarly between two adjacent roof panels.

Figure 16C:
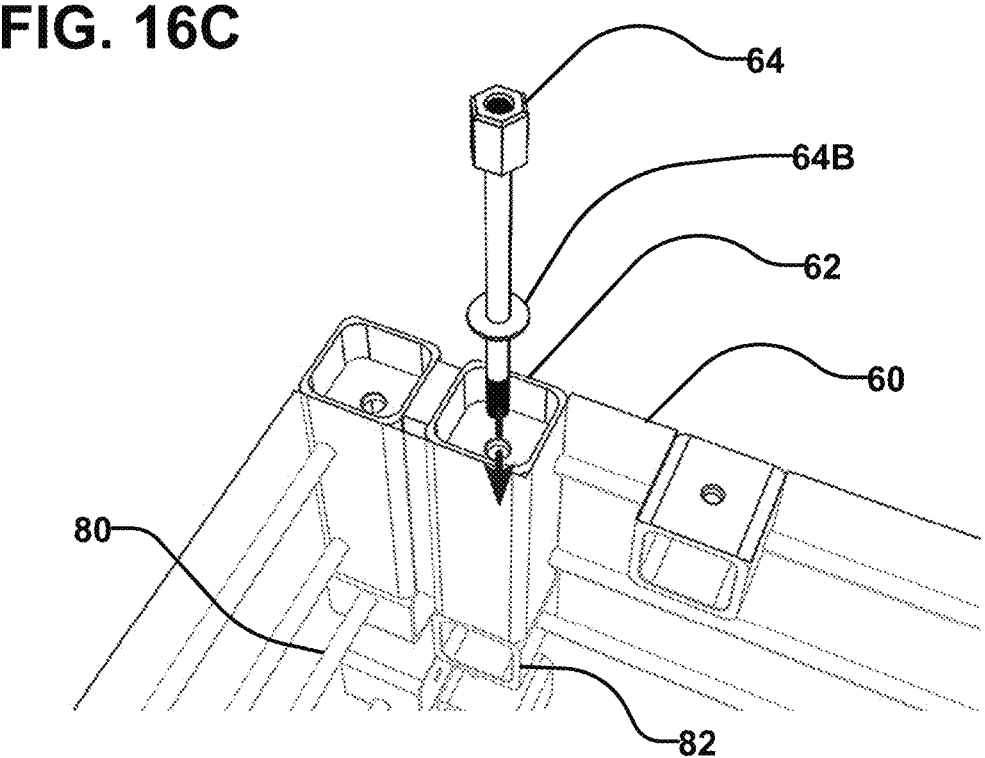
Figure 16D:
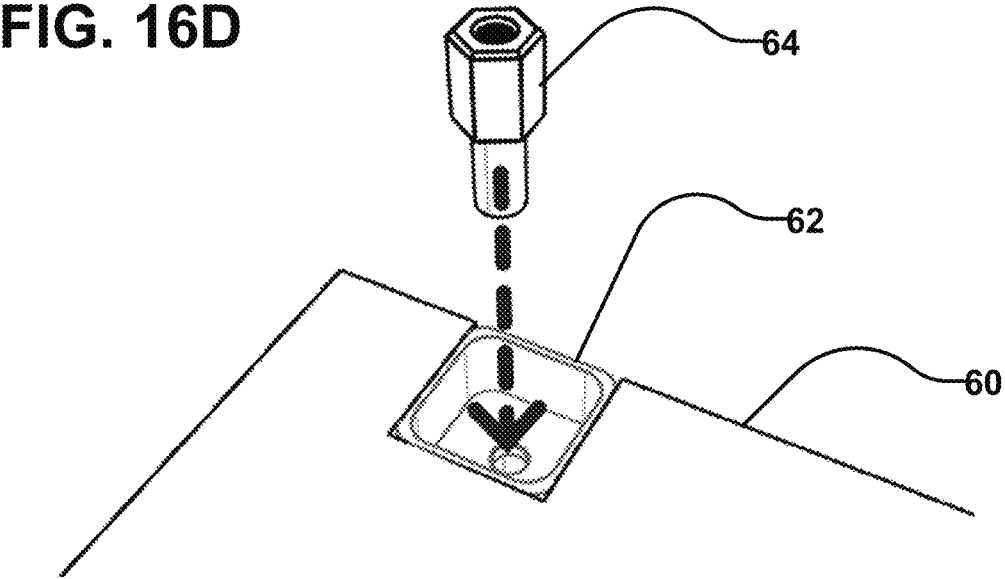

FIGS. 16C and 16D illustrate floor connections into subjacent structural elements. In FIG. 16C extended bolt 64 passes through floor connector 62 into stemwall connector 82. Stemwall connector may be a component of a stemwall panel 80 forming part of a foundation of the structure. Stemwall connector 82 may have a threaded hole (not shown) to receive a threaded end of extended bolt 64. FIG. 16D illustrates a shorter floor to foundation connection which may be used, for example, where a floor panel depth is substantially shorter.

Figure 17A:
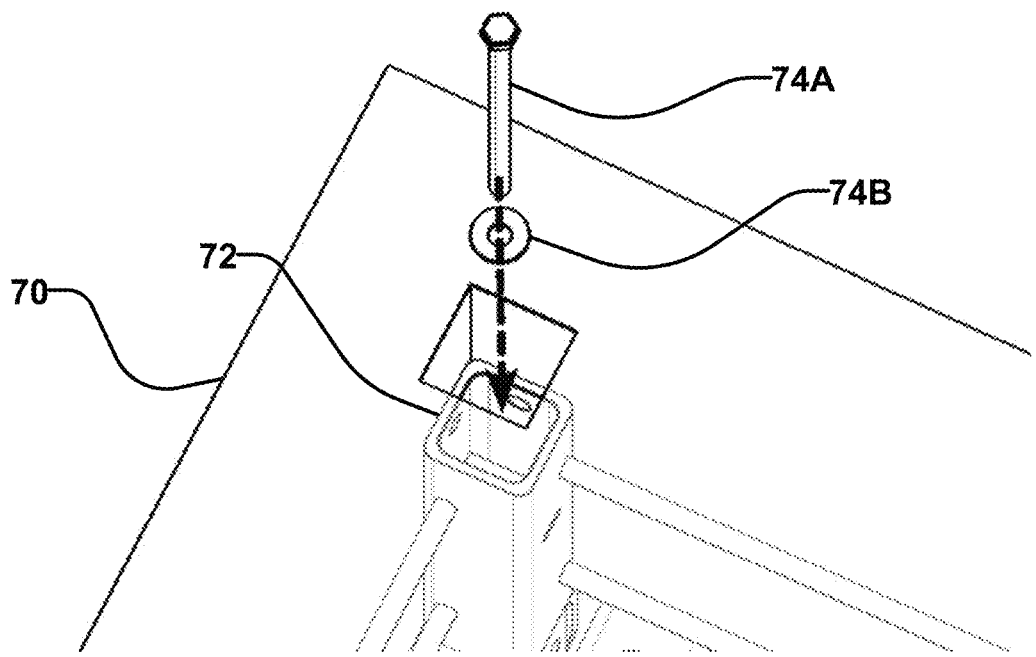
FIGS. 17A through 17F are perspective views of exemplary connections between roof panels and roof panels and between roof panels and wall panels
Figure 17B:
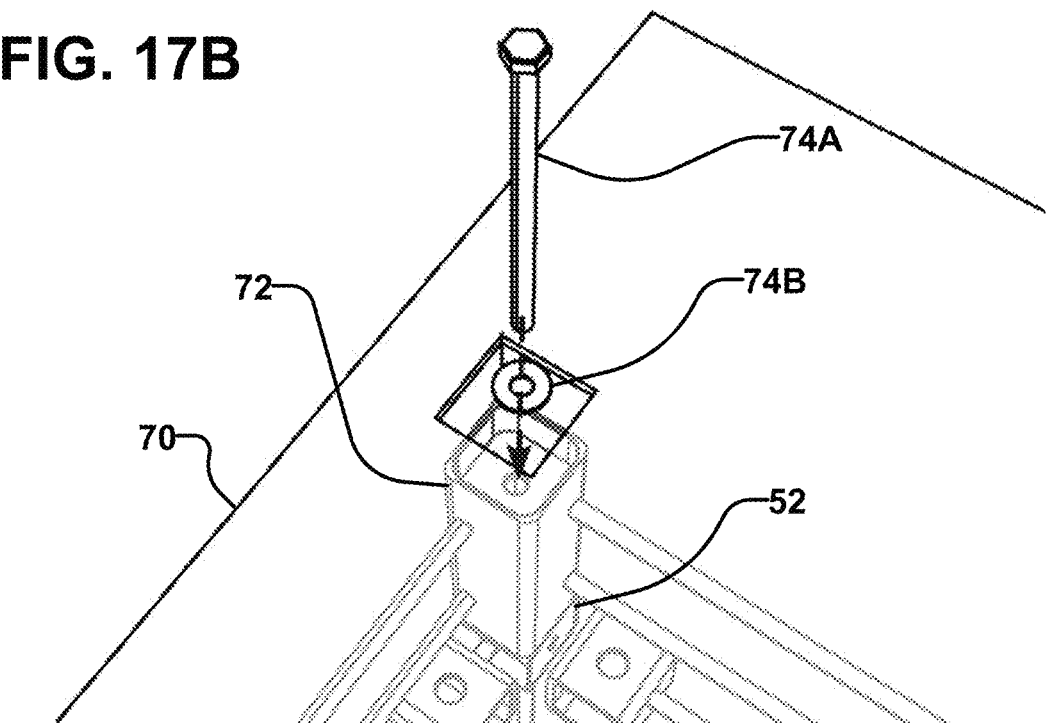

FIGS. 17A and 17B illustrate roof to wall connections at or near a corner of a structure. Roof panel 70 comprises a roof panel connector 72 into which a bolt 74A and washer 74B are inserted. Bolt 74A is secured at its lower end in a subjacent connector, such as wall connector 52 shown in FIG. 17B.

Figure 17C:
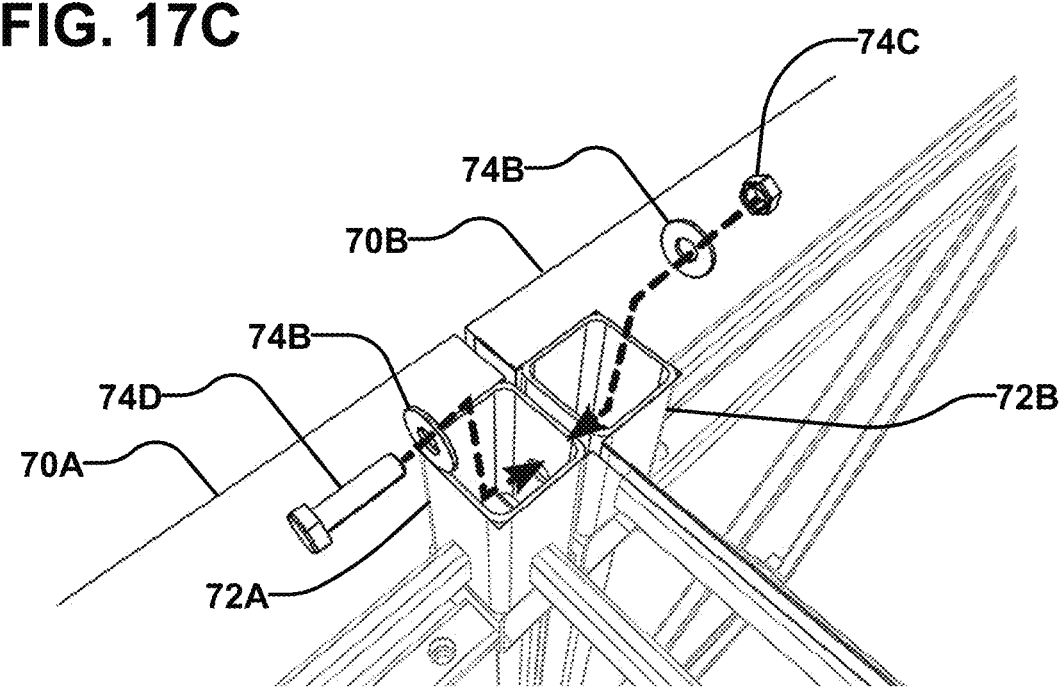
Figure 17D:
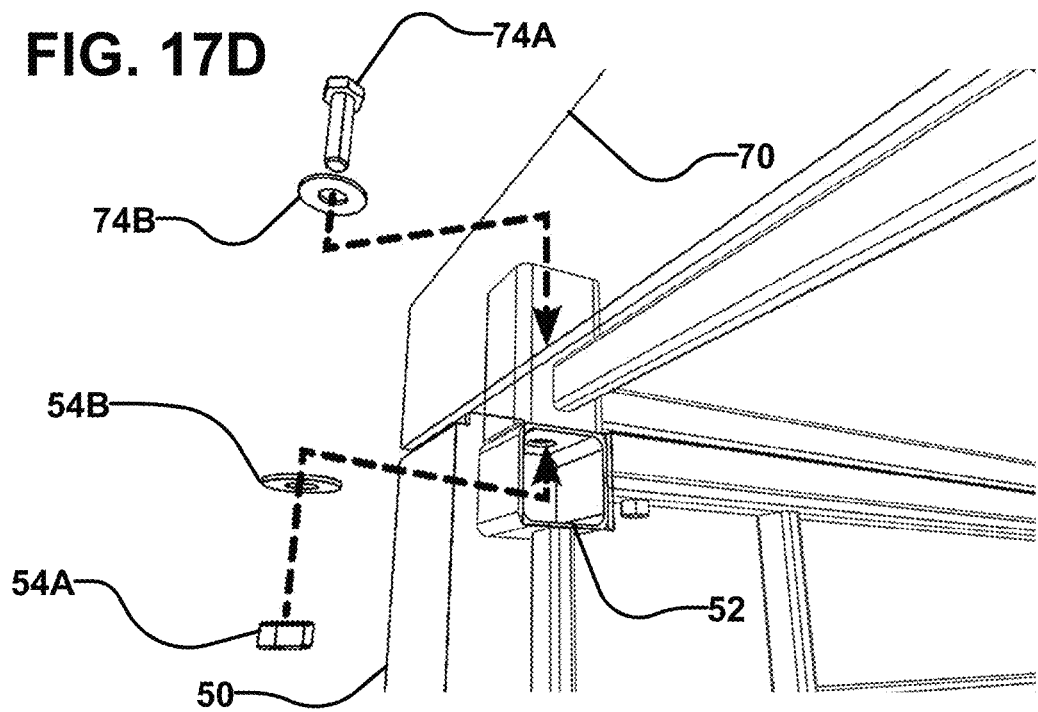

FIG. 17C illustrates a roof to roof connection. A roof to roof connector bolt 74D passes through washer 74B and connects through a hole in connector 72A and into a hole in connector 72B. Bolt 74D is secured in connector 72B by washer 74B and nut 74C to mechanically connect roof panel 70A to roof panel 70B. FIG. 17D illustrates a roof to wall connection, showing how bolt 74A may be secured at its lower end by a nut 54A and washer 54B in wall connector 52.

Figure 17E:
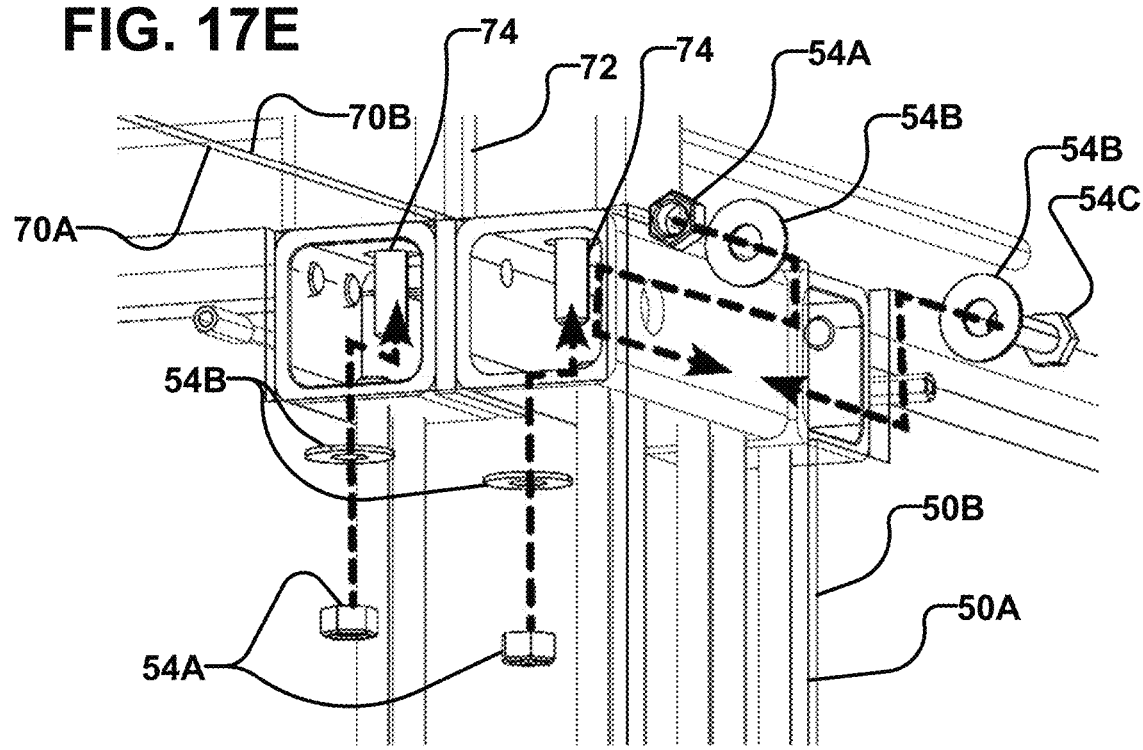
Figure 17F:
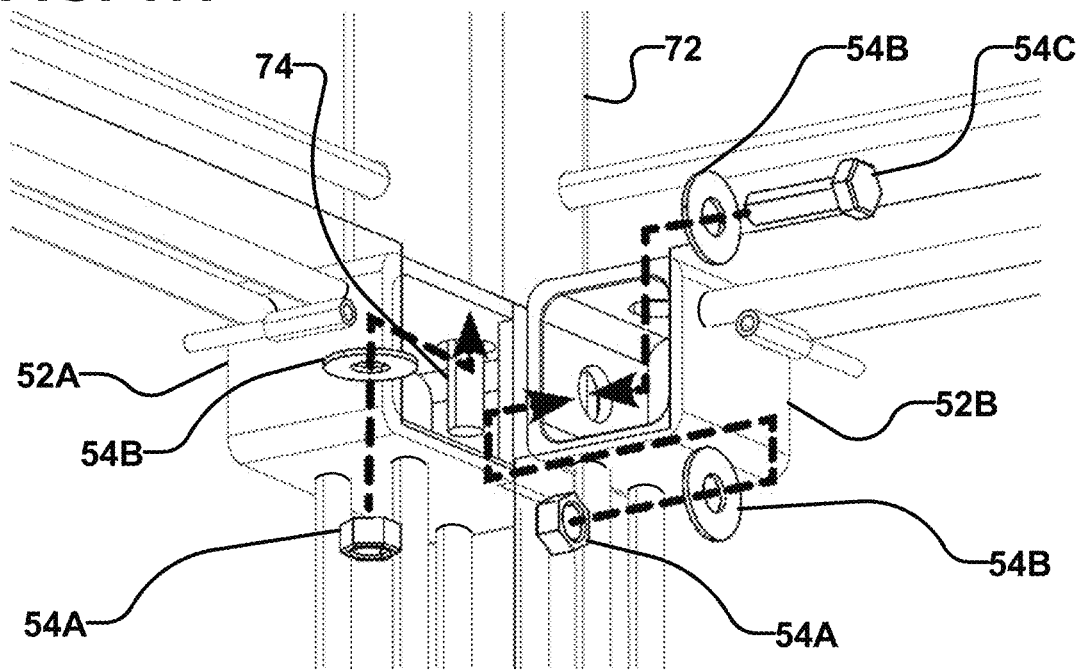

FIG. 17E shows a wall to wall and wall to roof connection at a ceiling corner. In this example, two wall panels 50A, 50B connect through a wall to wall connection while two roof panels 70A, 70B connect to wall panel 50A, thereby mechanically securing together all four roof and wall panels. FIG. 17F shows a wall to wall and wall to roof connection where two wall panels and a roof panel are connected at a ceiling corner. In the wall to roof connection, nut 54A and washer 54B receive roof connector bolt 74 extending through roof connector 72, thus completing a mechanical connection between roof panel 70 and wall panel 50.

The positioning of connectors 20 on reinforcing frame 18 or of connectors 20 with respect to other parts or layers of panel 10 may be modified or adapted for a given panel 10 so that connectors may be accessible during installation of panels 10 and construction of the associated structure. After installation, connectors may be hidden, for example by a thin layer of sealant or an appropriate covering. If a covering is applied, it may be chosen so that connectors 20 are readily accessible later in the life of the structure. Coverings may be chosen to meet fire rating requirements and suitable covering materials may include heat resistant cementitious materials and gypsum board. A covering may also include the application of mud and tape to hide the connector and present a seamless wall surface. Where connectors are suitably accessible it may be possible to disconnect panels as desired later in the life of the structure, permitting the addition or subtraction of panels. This may allow panels to be disassembled and replaced or modified and permit expedient renovations or upgrades to a structure.

When designing the overall structure produced by the assembly of a collection of panels 10, the locations, variations and arrangements of connectors 20 and reinforcing frames 18 may be considered and modified when modelling the structure. Building information modelling ("BIM") may be used to determine in advance how each panel should connect and determine the locations and modification required for reinforcing frames 18 and connectors 20 of each panel in the structure. Panels may then be prefabricated with appropriate modifications based on the BIM design.

In embodiments in which panel 10 comprises a SIP with cementitious layers, reinforcing frame 18 may be set within panel 10 during or after the setting of the cementitious material of first structural layer 12 in some cases. Insulative core 14 may be shaped so that reinforcing frame 18 substantially envelops insulative core 14. Reinforcing frame 18 may not extend the entire distance between first and second structural layers but sit against and around insulative core 14 and may be held away from first structural layer 12 by the rigidity of insulative core 14, as illustrated in FIGS. 10A, 10B, 11A, 11B, 12 and 13. A gap may be desired between reinforcing frame 18 and at least one of first structural layer 12 and second structural layer 16 so that reinforcing frame 18 does not complete a thermal bridge from first structural layer 12 through second layer 16. After inserting insulative core 14 and reinforcing frame 18, a second structural layer 16 may be cast over reinforcing frame 18 and insulative core 14, completing the fabrication of a panel 10 according to one embodiment of the invention.

Figure 18A:
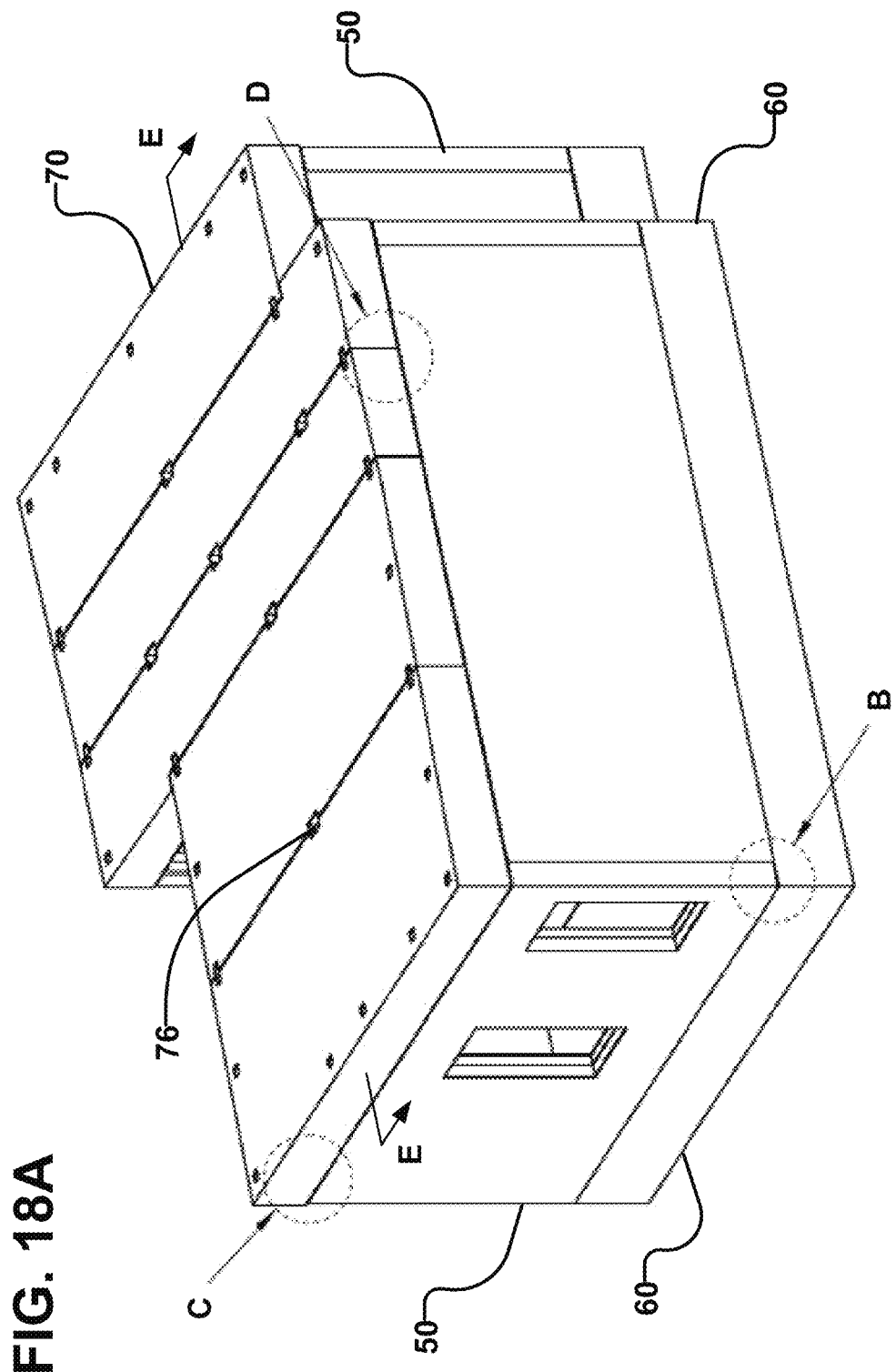
FIG. 18A is an isometric view of a structure built with wall panels, roof panels and floor panels according to an embodiment of the invention.
Figure 18B:
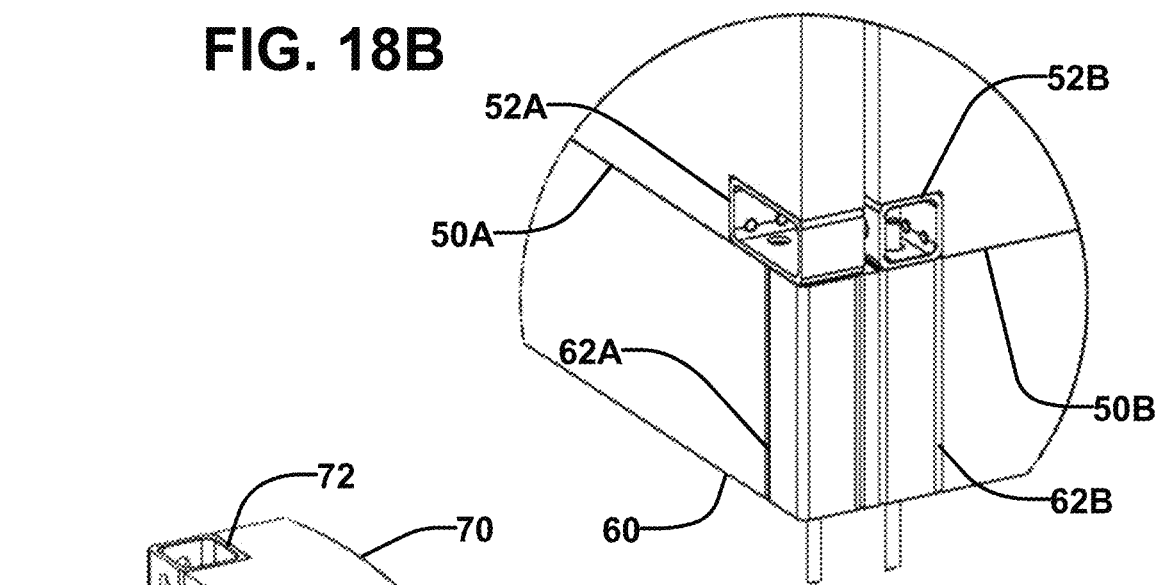
FIG. 18B is a magnified view of detail B in FIG. 18A.
Figure 18C:
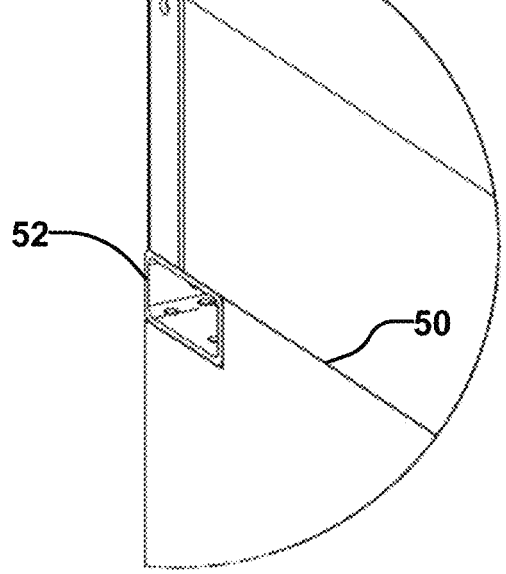
FIG. 18C is a magnified view of detail C in FIG. 18A.
Figure 18D:
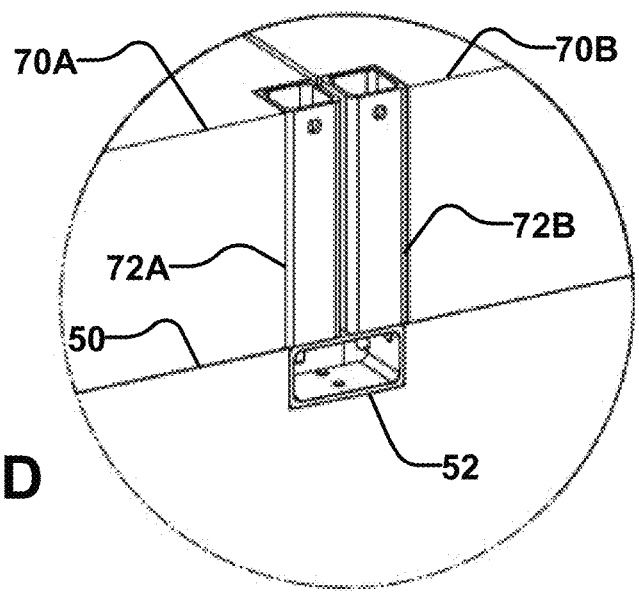
FIG. 18D is a magnified view of detail D in FIG. 18A.

FIG. 18A illustrates a structure built according to an embodiment of the invention using wall panels, floor panels and roof panels and connections as described above. For example, a connection at detail B in FIG. 18A may be as illustrated in FIG. 18B. This connection may substantively correspond to the connections as illustrated in and described in relation to FIG. 14H. The connection at detail C in FIG. 18A may be as illustrated in FIG. 18C and may substantively correspond to the connections illustrated in FIG. 15C. The connection at detail D in FIG. 18A may be as illustrated in FIG. 18D and may with respect to the roof panels substantively correspond to the connections illustrated in FIG. 17C.

Figure 18E:
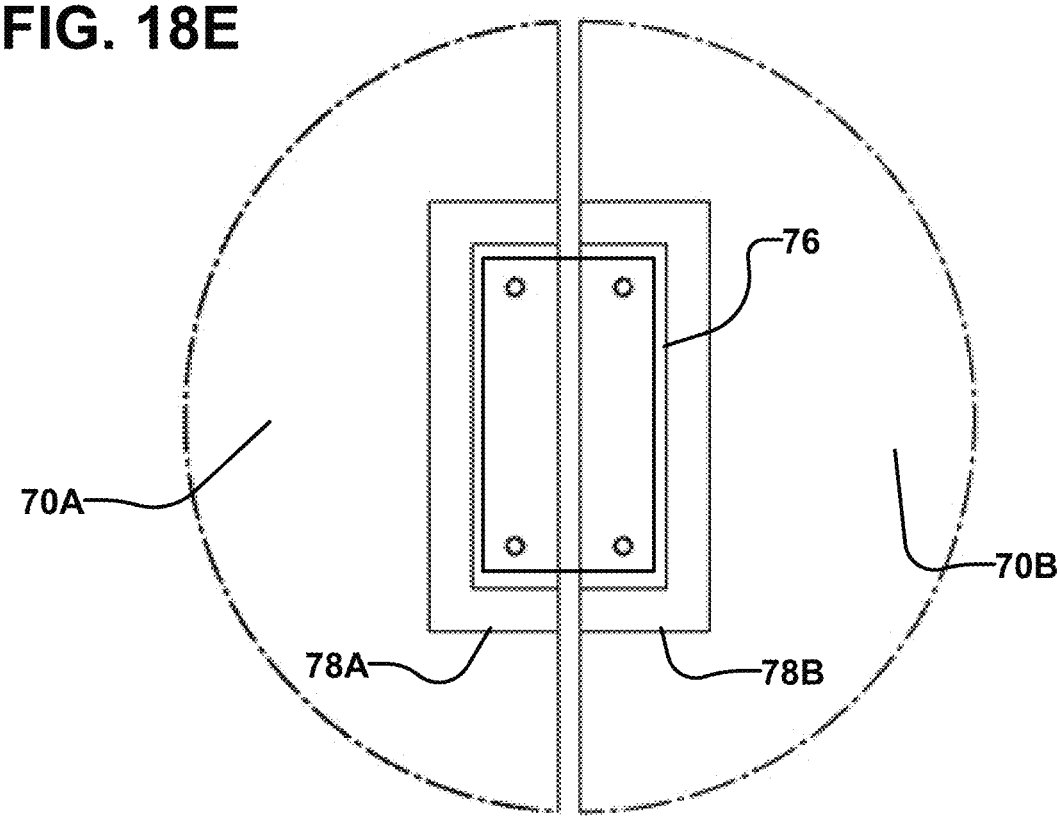
FIG. 18E is a top view of a weld plate of FIG. 18A.
Figure 18F:
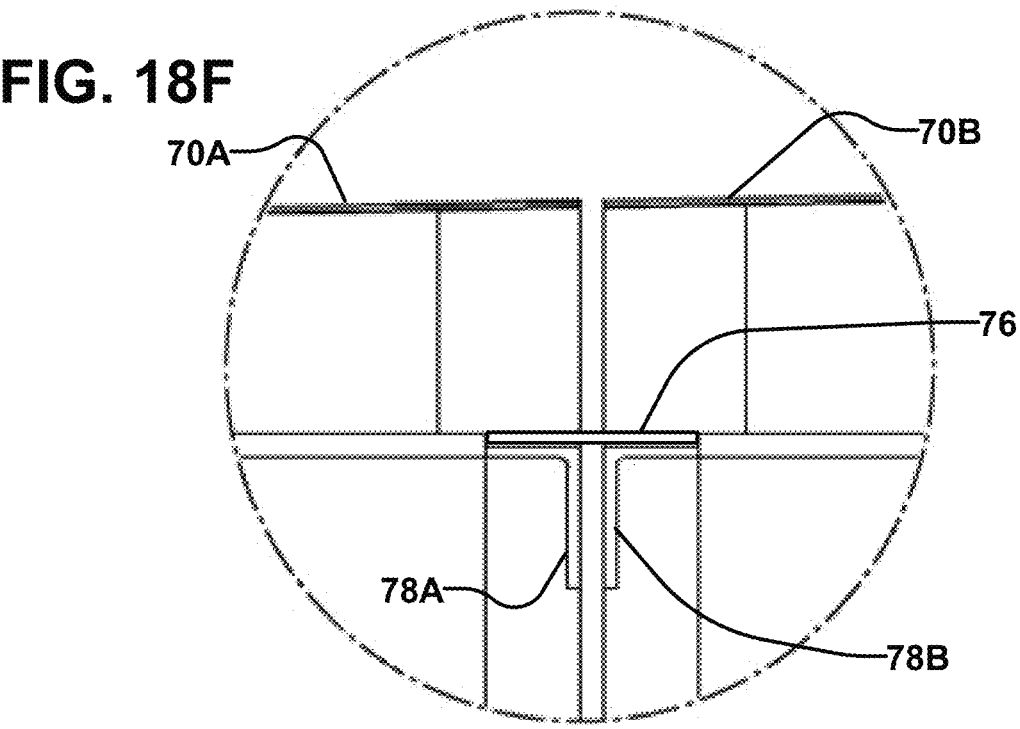
FIG. 18F is a cross-sectional view of a weld plate of FIG. 18A taken through the line E-E.

FIGS. 18E and 18F illustrate a roof panel weld plate 76. Similar to weld plate 66 illustrated in FIG. 16B weld plate 76 may be used to connect two adjacent roof panels, 70A, 70B. Weld plate 76 is welded onto weld plate-receiving elements 78A, 78B. Weld plate-receiving elements 78A, 78B may be connected to or be continuous with a reinforcing frame of each of roof panels 70A and 70B. In some embodiments, each weld plate-receiving element may be embedded into cementitious material of their corresponding panel, with or without attachment to a reinforcing frame of that panel. Weld plate 76 may be utilized, for example, where a connection is desired between two adjacent roof panels at a point distant from the panel corners.

Figure 19:
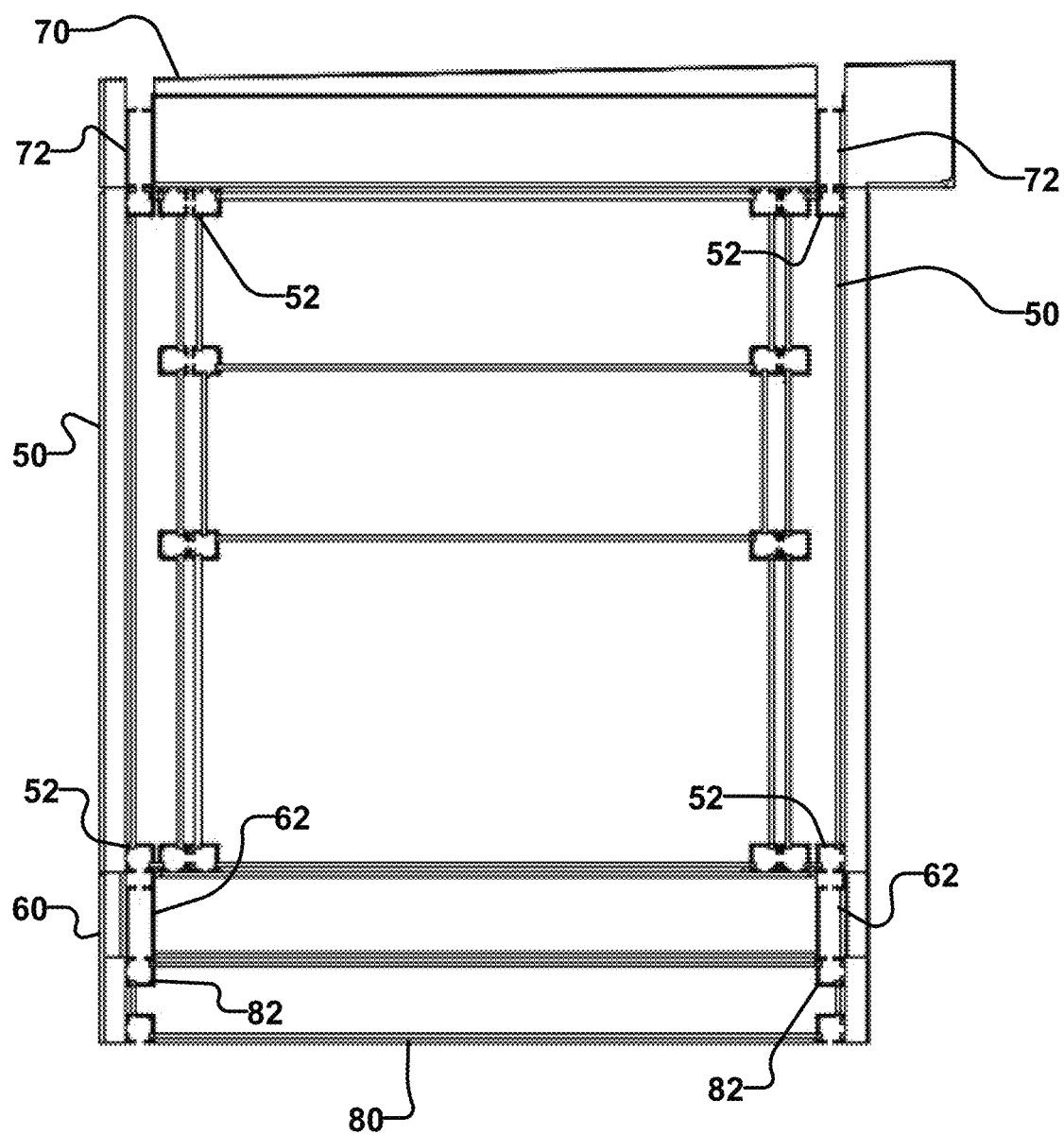
FIG. 19 is a cross-section taken through a wall panel of a structure built with wall panels, roof panels, floor panels and stem wall panels according to an embodiment of the invention.

FIG. 19 illustrates a cross-section of a structure built with connectors and frames according to an embodiment of the invention. Roof panel 70 connects to wall panel 50 through connections at roof connectors 72 and wall connectors 52. Wall panel 50 connects to floor panel 60 at connections between wall connectors 52 and floor connectors 62. Floor panel 60 connects to stem wall panel 80 at connections between floor connectors 62 and stem wall connectors 82.

Figure 20A:
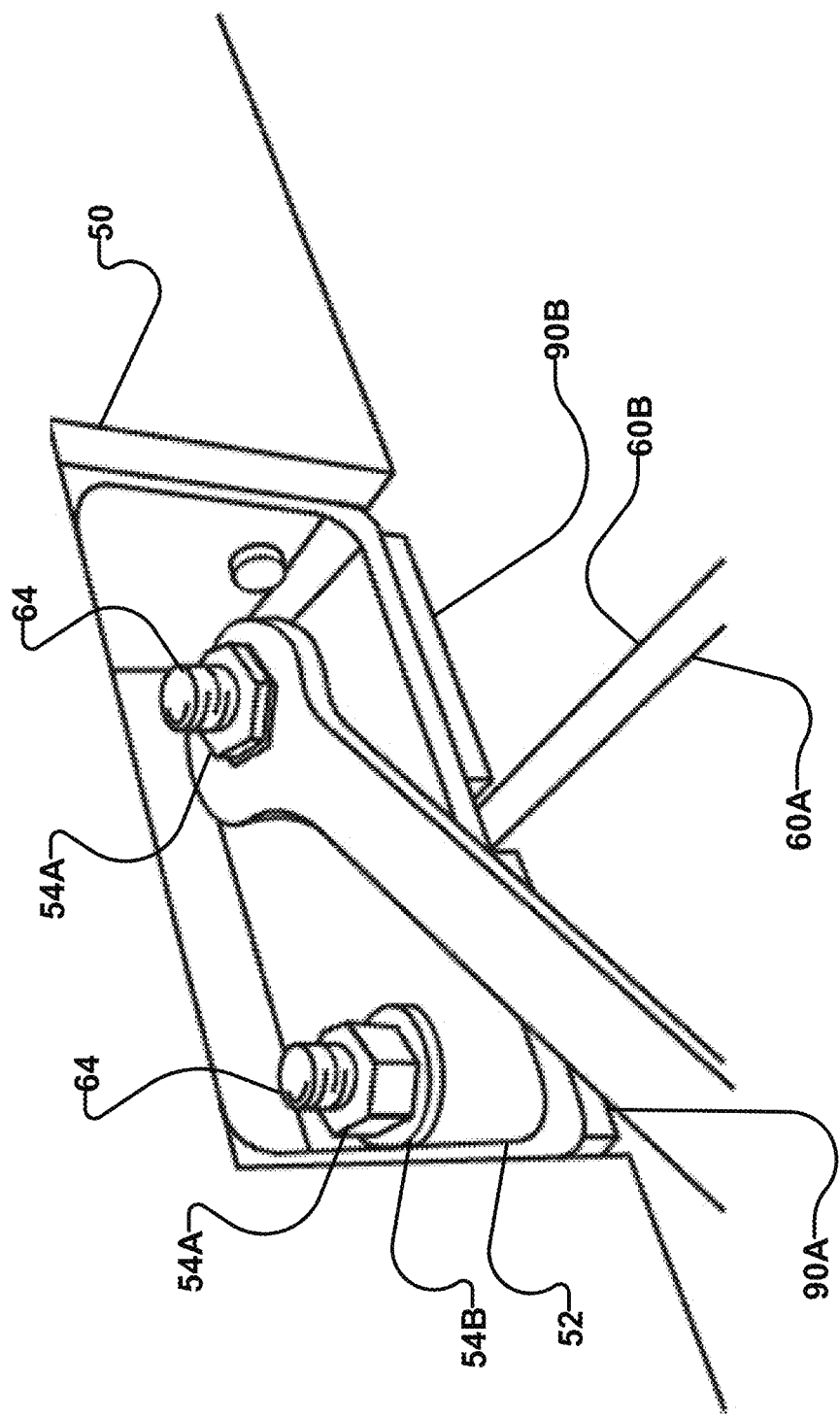
FIG. 20A is a perspective view of connections being installed between two adjacent floor panels and a wall panel.
Figure 20B:
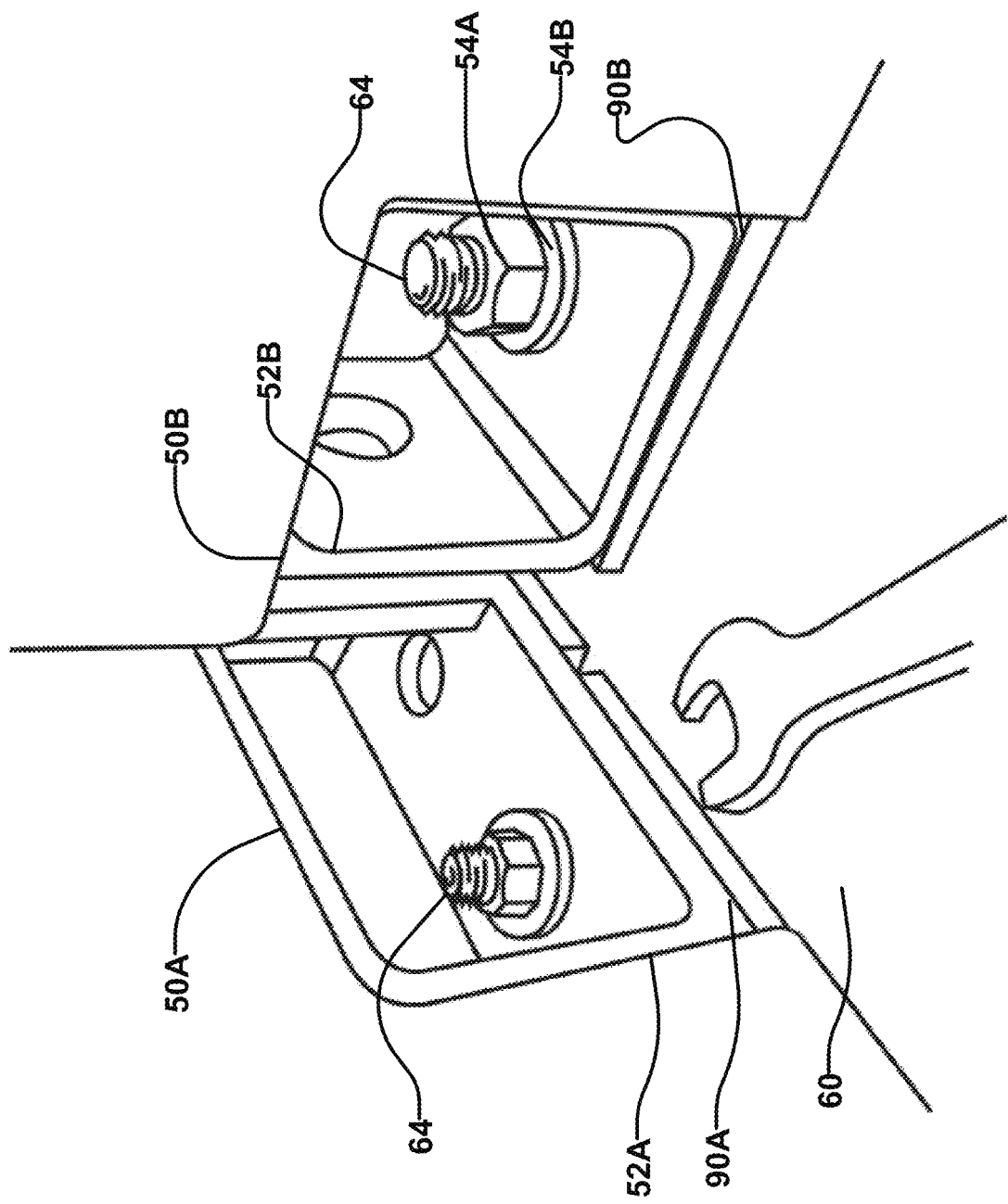
FIG. 20B is a perspective view of connections being installed between two adjacent wall panels and a floor panel at a corner.
Figure 20C:
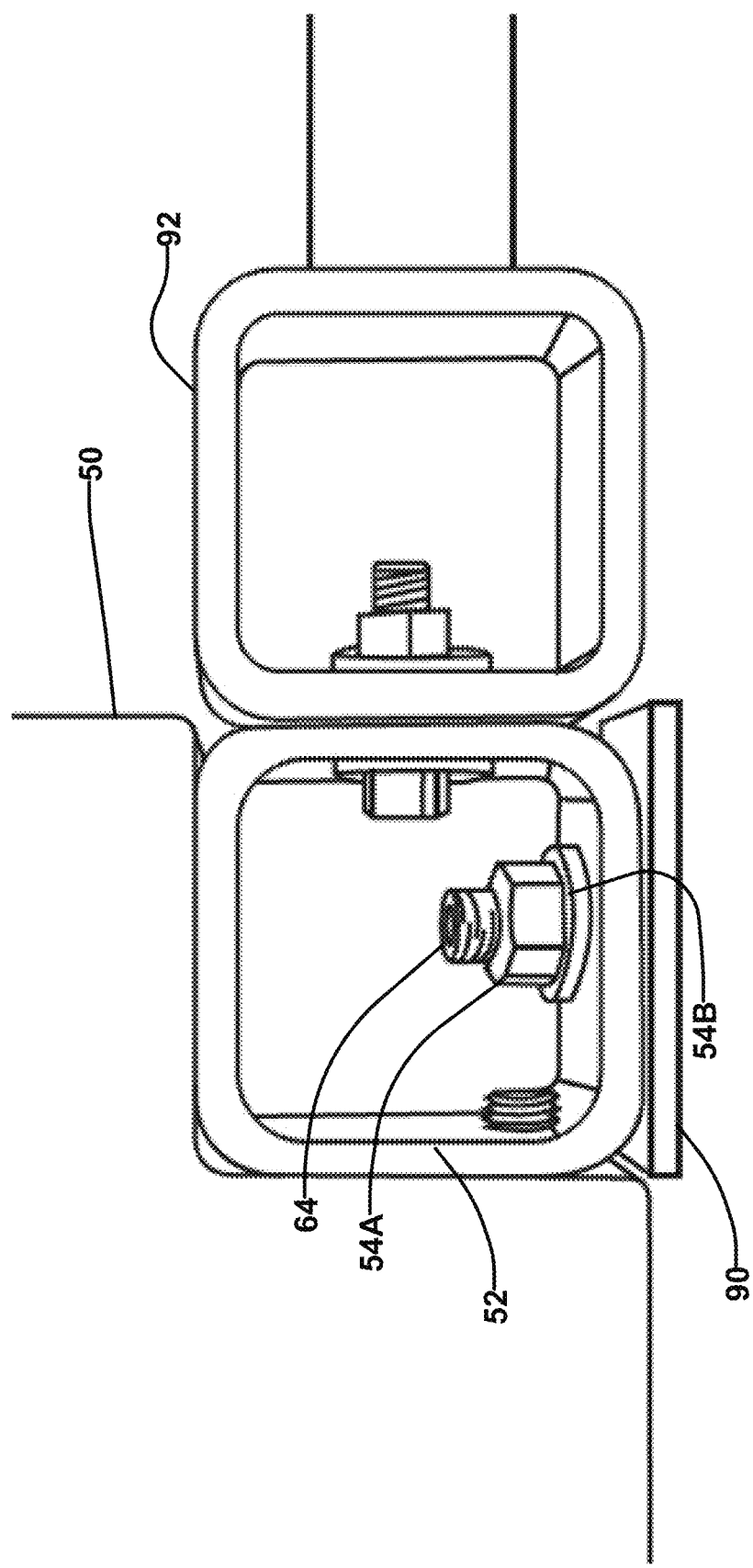
FIG. 20C is a perspective view of a wall panel connector connected to a brace structure.
Figure 20D:
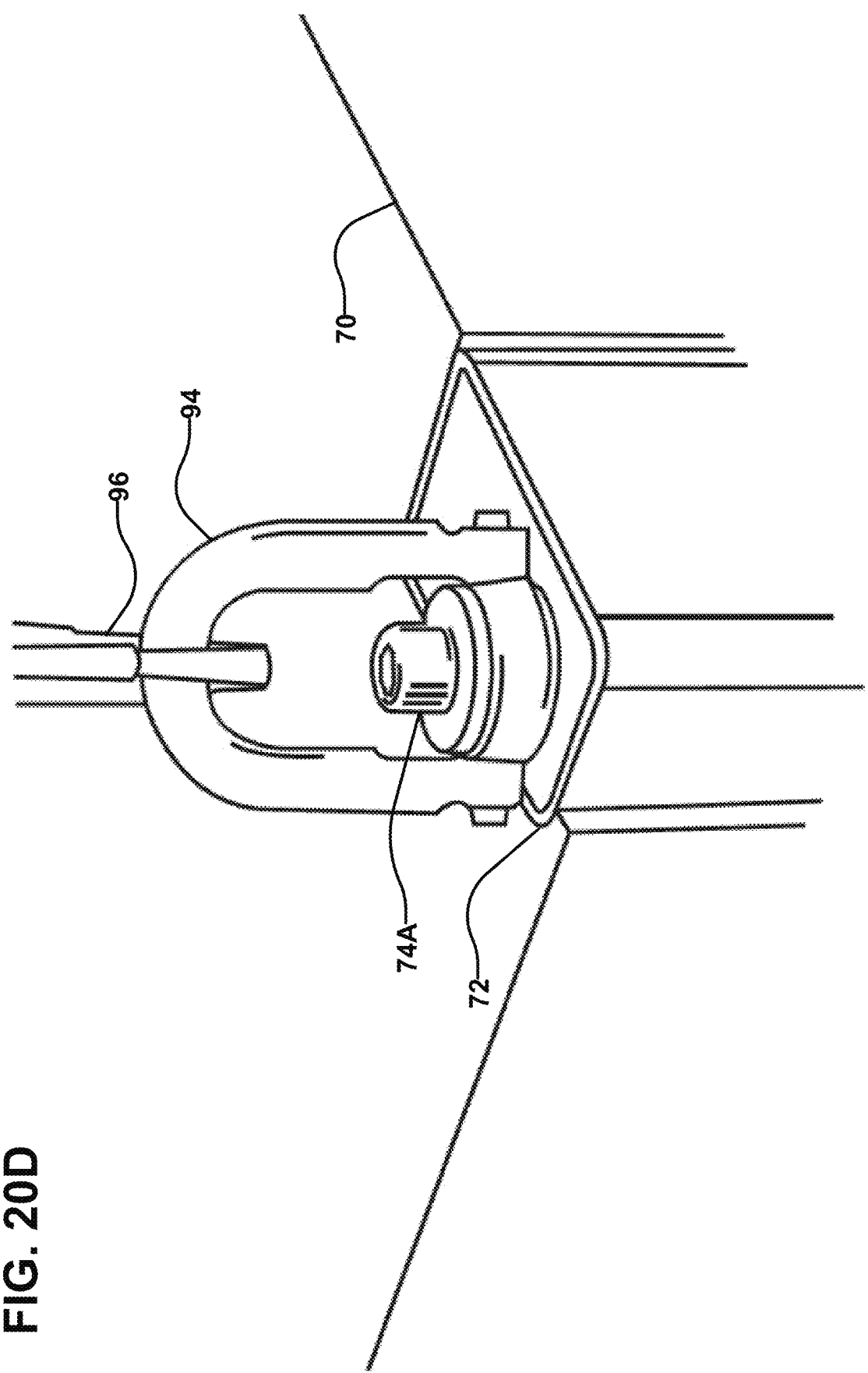
FIG. 20D is a perspective view of a shackle attached to a roof bolt secured in a corner connector of a roof panel.

FIGS. 20A and 20B illustrate the installation of connections according to some embodiments. One or more open faces in connectors may permit a person to manipulate connector elements to secure the connections between panels. FIG. 20C illustrates a steel brace 92 that may be secured to a connector such as wall connector 52. Steel brace 92 may be secured to a connector when a panel is being lifted. When a panel is being lifted, shackles 94 and chains 96 may be secured to connectors of the panel, with the connectors serving as anchors, as illustrated for example in FIGS. 20D, 22A and 22B. Steel brace 92 may assist in maintaining the structural integrity of the panel during the lifting process. Shackles 94 and chains 96 may be secured to connectors through the same connector elements as may be used in the connections between panels. For example, FIG. 20D illustrates the anchoring of chain 96 and shackle 94 to roof connector 72 through roof bolt 74A.

Figure 21A:
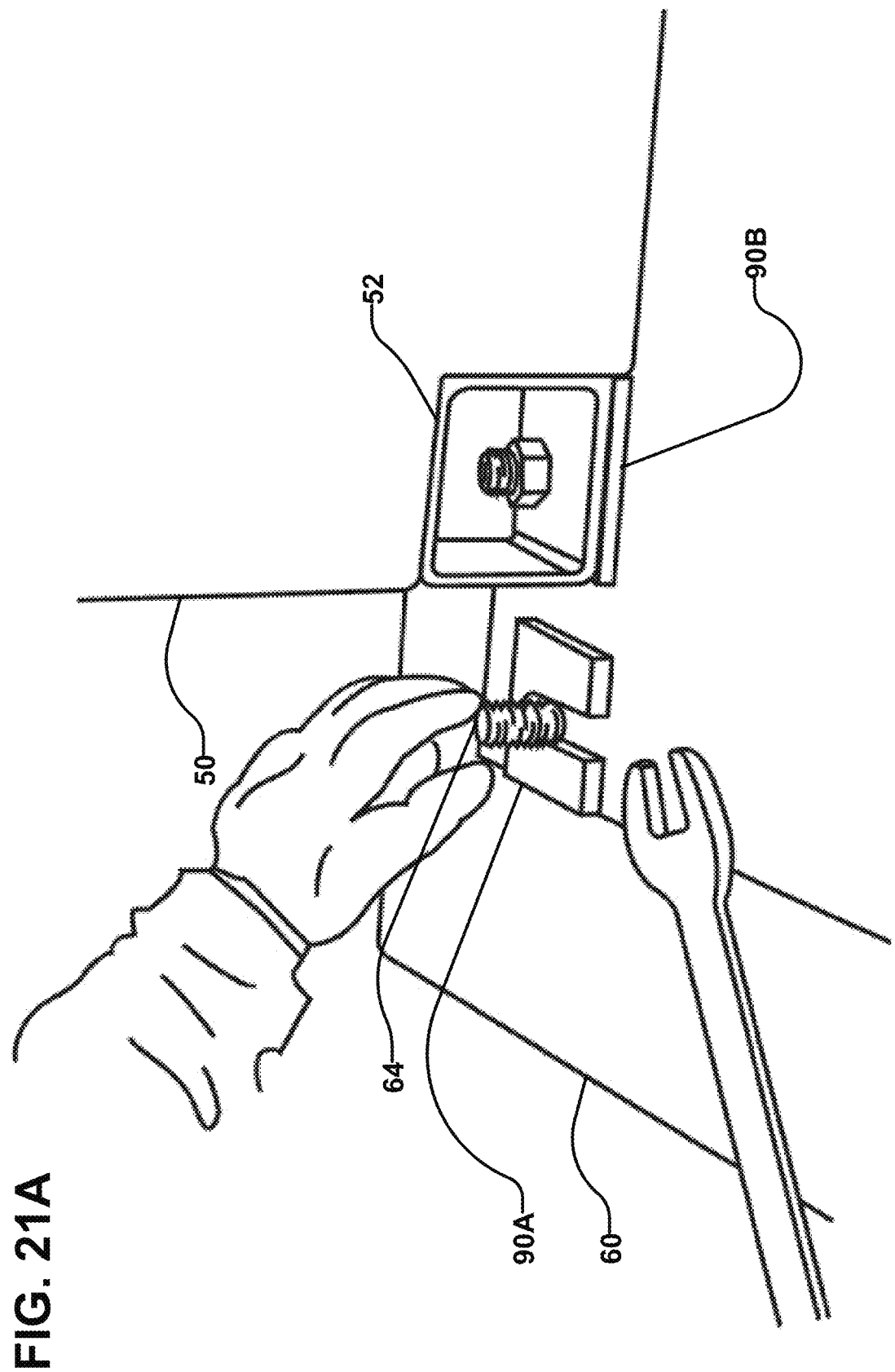
FIG. 21A is a perspective view of a neoprene insert around a floor connector bolt and on a floor connector of a floor panel.
Figure 21B:
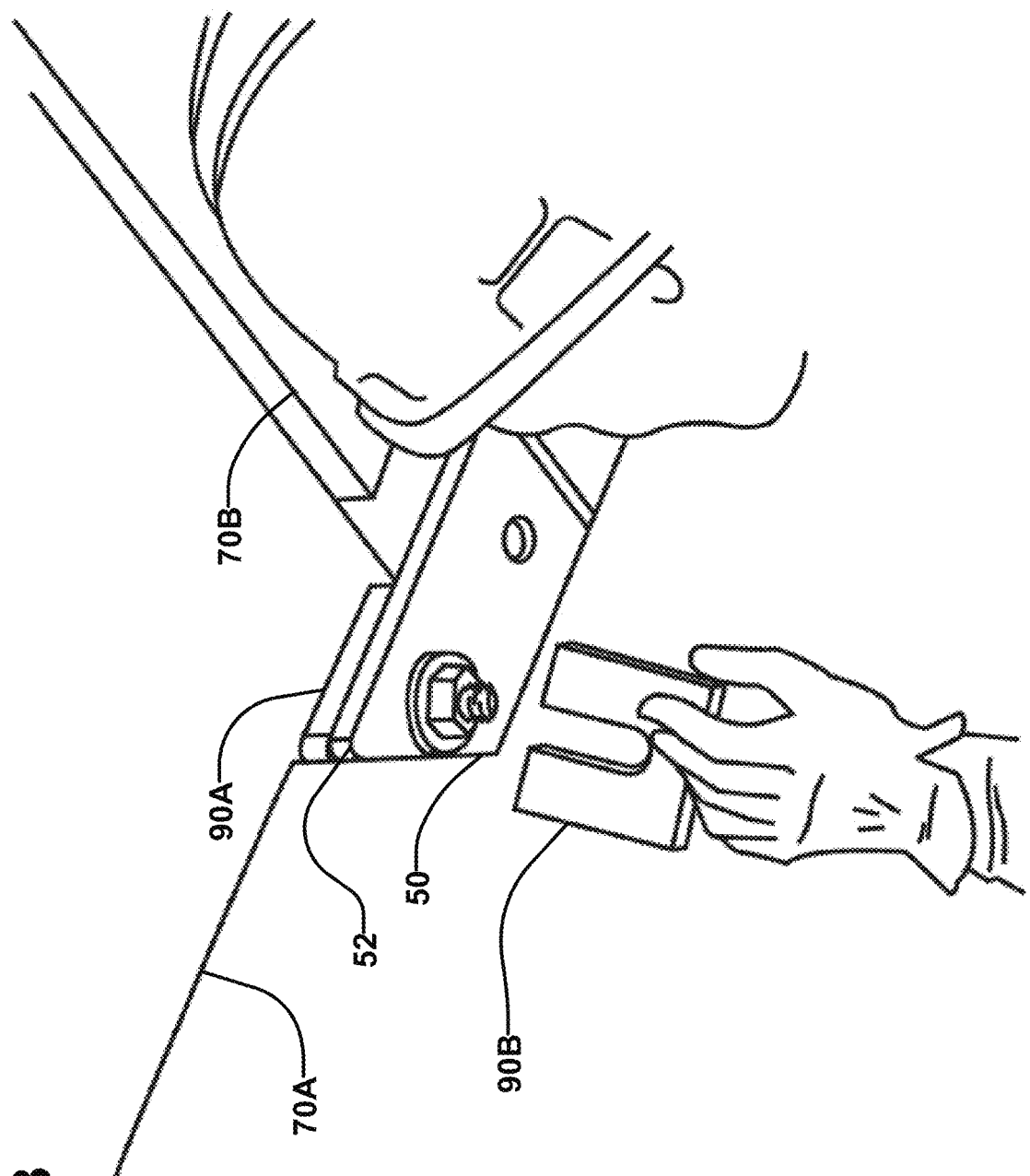
FIG. 21B is a perspective view of a neoprene insert being installed at a joint between a roof connector and a wall connector.

In some connections between panels, inserts 90 (e.g. inserts 90A, 90B) may be installed between adjacent connectors, as illustrated in FIGS. 21A and 21B. Inserts 90 may provide a cushion between connectors to prevent or reduce damage and may assist in providing a water-resistant and thermally insulating seal at the connections between panels.

Inserts 90 may comprise neoprene or other suitable materials. Inserts 90 may have a horseshoe shape to accommodate bolts or other mechanical attachments between connectors and to allow for easier adjustment of the position of the insert around the bolt and relative to the connectors.

Interpretation of Terms

Unless the context clearly requires otherwise, throughout the description and the
- "comprise", "comprising", and the like are to be construed in an inclusive sense, as opposed to an exclusive or exhaustive sense; that is to say, in the sense of "including, but not limited to";
- "connected", "coupled", or any variant thereof, means any connection or coupling, either direct or indirect, between two or more elements; the coupling or connection between the elements can be physical, logical, or a combination thereof;
- "herein", "above", "below", and words of similar import, when used to describe this specification, shall refer to this specification as a whole, and not to any particular portions of this specification;
- "or", in reference to a list of two or more items, covers all of the following interpretations of the word: any of the items in the list, all of the items in the list, and any combination of the items in the list;
- the singular forms "a", "an", and "the" also include the meaning of any appropriate plural forms.

Words that indicate directions such as "vertical", "transverse", "horizontal", "upward", "downward", "forward", "backward", "inward", "outward", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

In addition, while elements are at times shown as being performed sequentially, they may instead be performed simultaneously or in different sequences. It is therefore intended that the following claims are interpreted to include all such variations as are within their intended scope.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

Various features are described herein as being present in "some embodiments". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

The invention claimed is:

1. A building panel comprising:
    an insulative core;
    opposing first and second longitudinal faces;
    opposing first and second lateral faces, each of the first and second lateral faces intersecting each of the first and second longitudinal faces at a corner of the panel;
    a reinforcing frame extending around the longitudinal faces and the lateral faces, the reinforcing frame comprising:
        a plurality of connectors, a plurality of the corners of the panel occupied by at least one of the connectors; and
        a reinforcing structure extending between the plurality of connectors, the reinforcing structure at least partially embedded within a cementitious material; and
        a reinforcing mesh, the reinforcing mesh embedded within the cementitious material and shaped to at least partially surround the reinforcing structure of the reinforcing frame; and
    a front cementitious layer and a rear cementitious layer, the front and rear cementitious layers bonded to the insulative core, wherein the front and rear cementitious layers are spaced-apart on opposite surfaces of the insulative core and not connected by cementitious material within an interior of the building panel.

2. The building panel of claim 1 wherein the reinforcing mesh comprises a curved first portion and a second portion extending from the curved first portion, the curved first portion configured to at least partially wrap around the reinforcing structure.

3. The building panel of claim 2 wherein the second portion is substantially planar.

4. The building panel of claim 2 wherein the reinforcing mesh further comprises a third portion, the third portion extending laterally from the second portion.

5. The building panel of claim 4 wherein the third portion of the reinforcing mesh is embedded within a structural cementitious layer of the panel.

6. The building panel of claim 5 wherein the structural cementitious layer comprises a mesh embedded within the structural cementitious layer and the embedded mesh is coupled to the reinforcing mesh.

7. The building panel of claim 4 wherein the third portion extends substantially perpendicularly from the second portion.

8. The building panel of claim 2 wherein the reinforcing mesh has a cross-section that is generally J-shaped.

9. The building panel of claim 1 wherein the reinforcing mesh comprises one or more of wire welded mesh (WWM), fiberglass mesh, carbon fiber mesh, basalt mesh and polyester mesh.

10. The building panel of claim 1 wherein the reinforcing mesh increases the compressive, shear or tensile strength of the panel.

11. A building panel comprising:
    an insulative core;
    a reinforcing frame extending around one or more peripheral edges of the insulative core or embedded within the insulative core, the reinforcing frame comprising one or more elements of a reinforcing structure, the one or more elements of the reinforcing structure at least partially embedded within a cementitious material; and
    a reinforcing mesh, the reinforcing mesh embedded within the cementitious material and shaped to at least partially wrap around at least one element of the reinforcing structure of the frame, wherein the reinforcing mesh comprises a generally J-shaped cross-section.

12. A building panel, comprising:
an insulative core of unitary construction and including a front face, a rear face, opposing first and second longitudinal faces and opposing first and second lateral faces, each of the lateral faces intersecting each of the first and second longitudinal faces at a corner of the panel;
a reinforcing frame configured to mechanically embed within and substantially envelop the insulative core, the reinforcing frame including:
  a plurality of connectors configured to mechanically interface with a corresponding plurality of corners of the insulative core; and
  a reinforcing structure extending between each of the plurality of connectors, the reinforcing structure at least partially embedded within a cementitious material; and
a front cementitious layer bonded to the front face of the insulative core and a rear cementitious layer spaced relative to the front cementitious layer and bonded to the rear face of the insulative core, the rigidity of the insulative core separating the front cementitious layer and the rear cementitious layer without additional structural support therein, and
wherein at least one of the plurality of connectors is adapted to remain accessible during installation of additional building panels and after installation.

13. The building panel of claim 12, wherein the reinforcing structure includes hollow steel sections.

14. The building panel of claim 12, wherein the reinforcing structure includes threaded bars.

15. The building panel of claim 12, wherein the reinforcing structure includes a thickened layer of cementitious material.

16. The building panel of claim 12, wherein one or more of the plurality of connectors includes a hollow connector block wherein one or more walls of the connector block each define a threaded hole for receiving a threaded end of a reinforcing rod.

17. The building panel of claim 16, wherein one or more of the walls of the connector block each defines an aperture for connecting the connector block to an adjoining panel.

18. The building panel of claim 12, wherein the reinforcing frame is held spaced relative to the front cementitious layer and the rear cementitious layer by the rigidity of the insulative core.

19. The building panel of claim 12, further comprising a plurality of inserts disposed between the corresponding plurality of connectors of the reinforcing frame to prevent or reduce damage to the plurality of connectors or to provide a thermally insulating seal at the connectors between the adjacent building panels.

20. A building panel for use in constructing a building structure, comprising:
an insulative core of unitary construction and including a front face, a rear face, opposing first and second longitudinal faces and opposing first and second lateral faces, each of the lateral faces intersecting each of the first and second longitudinal faces at a corner of the panel; and
a reinforcing frame configured to mechanically embed within and substantially envelop the insulative core, the reinforcing frame including:
  a plurality of connectors configured to mechanically interface with a corresponding plurality of corners of the insulative core;
  a reinforcing structure extending between each of the plurality of connectors, the reinforcing structure at least partially embedded within a cementitious material; and
a first cementitious layer bonded to the front face of the insulative core and bonded to the rear face of the insulative core, the rigidity of the insulative core separating the first cementitious layers on the front and rear faces of the insulative core without additional structural support therein and a second cementitious layer bonded to the first and second lateral faces of the insulative core, the second cementitious layer being different than the first cementitious layer, and
wherein the plurality of connectors is adapted to remain accessible during installation of additional building panels and readily accessible after installation of the building structure.

21. The building panel of claim 20, wherein the reinforcing frame is at least partially embedded within the first or second cementitious layers to reinforce one or more peripheral edges of the panel to provide further structural support to the panel within a building.

22. A building panel comprising:
an insulative core of unitary construction and including a front face, a rear face, opposing first and second longitudinal faces and opposing first and second lateral faces, each of the first and second lateral faces intersecting each of the first and second longitudinal faces at a corner of the panel;
a reinforcing frame configured to mechanically embed within and substantially envelop the insulative core, the reinforcing frame including:
  a plurality of connectors configured to mechanically interface with a corresponding plurality of corners of the insulative core;
  a reinforcing structure extending between the plurality of connectors, the reinforcing structure at least partially embedded within a cementitious material; and
a reinforcing mesh, the reinforcing mesh embedded within the cementitious material and shaped to at least partially surround the reinforcing structure of the reinforcing frame.

23. The building panel of claim 22, wherein a front cementitious layer is bonded to the front face of the insulative core and a rear cementitious layer spaced relative to the front cementitious layer and bonded to the rear face of the insulative core, the rigidity of the insulative core separating the front cementitious layer and the rear cementitious layer without additional structural support therein.

24. The building panel of claim 22, wherein the reinforcing mesh has a cross-section that is generally J-shaped.

25. The building panel of claim 22, wherein the reinforcing mesh includes at least one of wire welded mesh (WWM), fiberglass mesh, carbon fiber mesh, basalt mesh or polyester mesh.

26. The building panel of claim 22, wherein the reinforcing mesh increases the compressive, shear or tensile strength of the panel.

* * * * *